United States Patent
Takayama et al.

[11] Patent Number: 5,982,294
[45] Date of Patent: Nov. 9, 1999

[54] PAGING RECEIVER WHICH PERFORMS DATA COMMUNICATION PROTOCOL ANALYSIS THROUGH EXECUTION OF CONTROL PROGRAM

[75] Inventors: Hisashi Takayama; Noriko Tanaka; Hiroshi Uranaka; Akio Uesugi, all of Tokyo, Japan

[73] Assignee: Matsushita Electric Industrial Co., Ltd., Osaka, Japan

[21] Appl. No.: 08/774,836

[22] Filed: Dec. 27, 1996

[30] Foreign Application Priority Data

Dec. 27, 1995 [JP] Japan .................................. 7-351244

[51] Int. Cl.[6] .......................... G08B 5/22; H03M 13/00
[52] U.S. Cl. ............................... 340/825.44; 714/782
[58] Field of Search .................................. 370/338, 522, 370/401, 428, 337, 349, 311, 314; 455/343, 32.1, 38.1; 371/37.08; 340/825.44, 825.21, 825.52, 825.22, 825.47

[56] References Cited

U.S. PATENT DOCUMENTS

| | | | |
|---|---|---|---|
| 4,668,949 | 5/1987 | Akahori et al. | 340/825.44 |
| 4,713,808 | 12/1987 | Gaskill et al. | 340/825.52 |
| 5,237,320 | 8/1993 | Sato et al. | 340/825.44 |
| 5,311,516 | 5/1994 | Kuznicki et al. | 370/314 |

*Primary Examiner*—Michael Horabik
*Assistant Examiner*—Kevin C. Harper
*Attorney, Agent, or Firm*—Lowe Hauptman Gopstein Gilman & Berner

[57] ABSTRACT

In a paging receive for use in a radio paging system which employs a sophisticated data communication protocol, all protocol analysis operations such as de-interleaving and error correction processing are performed by a CPU which executes a control program, with the analysis being performed only on those received data frames which contain messages addressed to that paging receiver, and with the protocol analysis being performed first for the address field of such a frame, to obtain information specifying the position within a message field of that frame of requisite specific message data which are addressed to the paging receiver, then being performed only for these specific message data, within that message field. The control program is executed as two separate processes, each of which can be interrupted in response to interrupt signals supplied to the CPU and subsequently restarted, with one process performing protocol analysis and the other process performing operations which are requested through function switch actuations, so that such operations requests can be registered while protocol analysis is in progress, enabling rapid response to the requests.

25 Claims, 26 Drawing Sheets

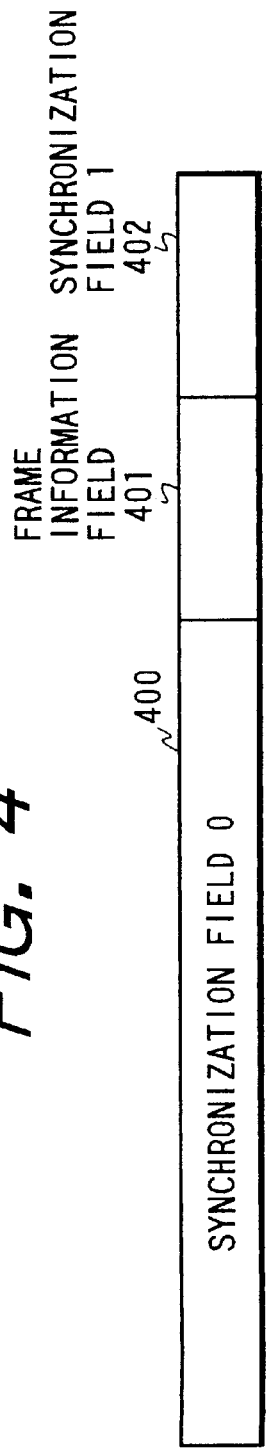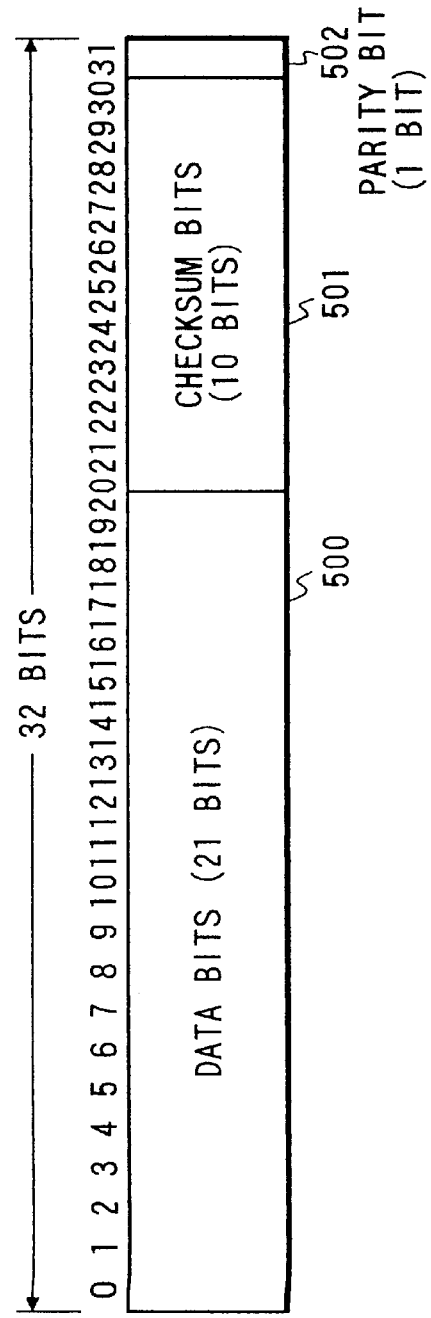

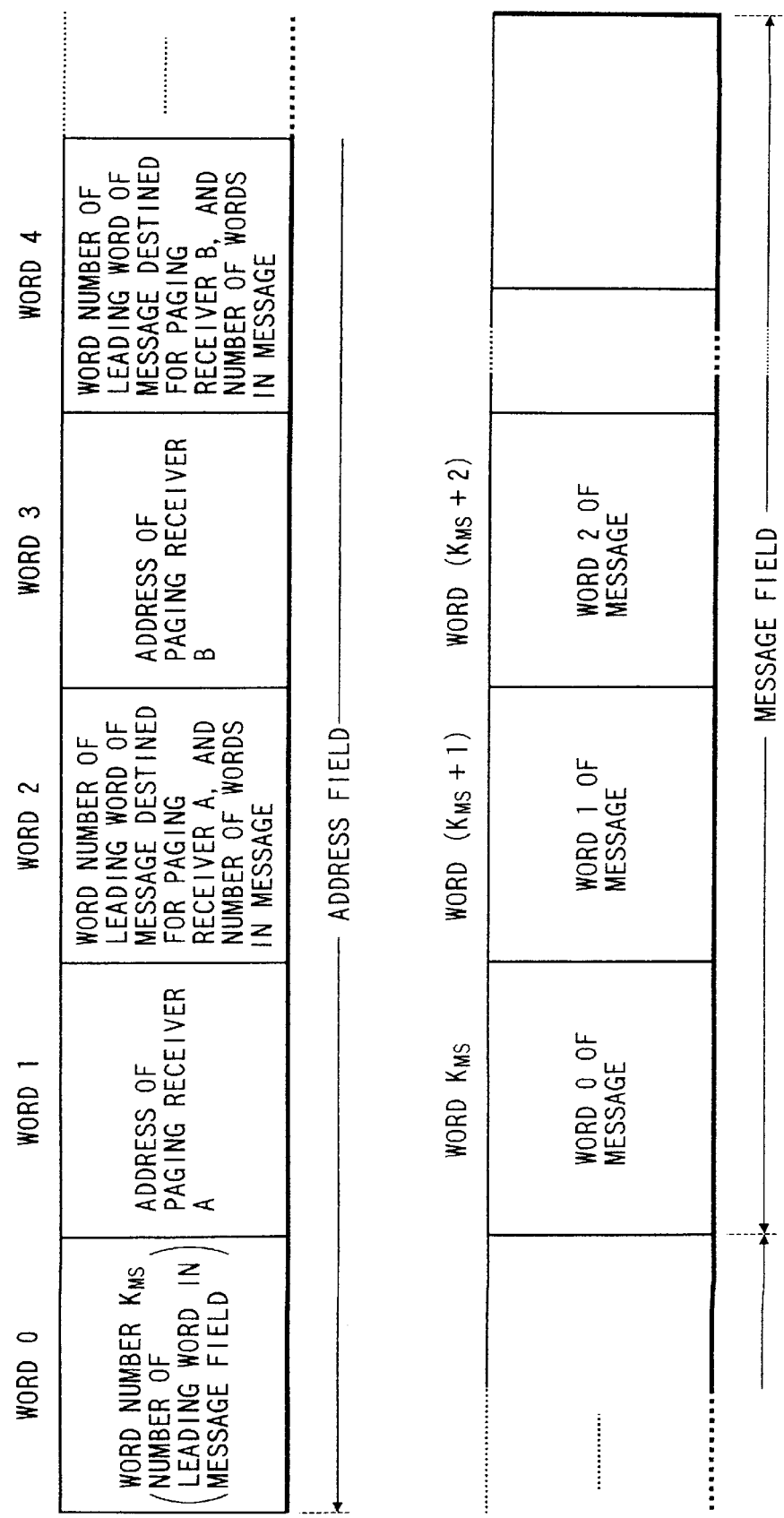

FIG. 7(A)

| CODE WORD | 0 | 1 | 2 | 3 | 4 | 5 | ...... | 15 | 16 | 17 | 18 | 19 | 20 | 21 | 22 | 23 | ...... | 28 | 29 | 30 | 31 |
|---|---|---|---|---|---|---|---|---|---|---|---|---|---|---|---|---|---|---|---|---|---|
| WORD 0 | 1 | 1 | 1 | 1 | 1 | 1 | | 1 | 1 | 1 | 1 | 1 | 1 | p | p | p | | p | p | p | p |
| WORD 1 | 1 | 1 | 1 | 1 | 1 | 1 | | 1 | 1 | 1 | 1 | 1 | 1 | p | p | p | | p | p | p | p |
| WORD 2 | 1 | 1 | 1 | 1 | 1 | 1 | | 1 | 1 | 1 | 1 | 1 | 1 | p | p | p | | p | p | p | p |
| WORD 3 | 1 | 1 | 1 | 1 | 1 | 1 | | 1 | 1 | 1 | 1 | 1 | 1 | p | p | p | | p | p | p | p |
| WORD 4 | 1 | 1 | 1 | 1 | 1 | 1 | | 1 | 1 | 1 | 1 | 1 | 1 | p | p | p | | p | p | p | p |
| WORD 5 | 1 | 1 | 1 | 1 | 1 | 1 | | 1 | 1 | 1 | 1 | 1 | 1 | p | p | p | | p | p | p | p |
| WORD 6 | 1 | 1 | 1 | 1 | 1 | 1 | | 1 | 1 | 1 | 1 | 1 | 1 | p | p | p | | p | p | p | p |
| WORD 7 | 1 | 1 | 1 | 1 | 1 | 1 | | 1 | 1 | 1 | 1 | 1 | 1 | p | p | p | | p | p | p | p |

FIG. 7(B)

| CODE WORD | 0 | 1 | 2 | 3 | 4 | 5 | ...... | 15 | 16 | 17 | 18 | 19 | 20 | 21 | 22 | 23 | ...... | 28 | 29 | 30 | 31 |
|---|---|---|---|---|---|---|---|---|---|---|---|---|---|---|---|---|---|---|---|---|---|
| WORD 0 | 1 | 1 | 1 | 1 | 1 | 1 | | 1 | 1 | 1 | 1 | 1 | 1 | p | p | p | | p | p | p | p |
| WORD 1 | 1 | 1 | 1 | 1 | 1 | 1 | | 1 | 1 | 1 | 1 | 1 | 1 | p | p | p | | p | p | p | p |
| WORD 2 | 1 | 1 | 1 | 1 | 1 | 1 | | 1 | 1 | 1 | 1 | 1 | 1 | p | p | p | | p | p | p | p |
| ⋮ | | | | | | | | | | | | | | | | | | | | | |
| WORD 13 | 1 | 1 | 1 | 1 | 1 | 1 | | 1 | 1 | 1 | 1 | 1 | 1 | p | p | p | | p | p | p | p |
| WORD 14 | 1 | 1 | 1 | 1 | 1 | 1 | | 1 | 1 | 1 | 1 | 1 | 1 | p | p | p | | p | p | p | p |
| WORD 15 | 1 | 1 | 1 | 1 | 1 | 1 | | 1 | 1 | 1 | 1 | 1 | 1 | p | p | p | | p | p | p | p |

FIG. 7(C)

| CODE WORD | 0 | 1 | 2 | 3 | 4 | 5 | ...... | 15 | 16 | 17 | 18 | 19 | 20 | 21 | 22 | 23 | ...... | 28 | 29 | 30 | 31 |
|---|---|---|---|---|---|---|---|---|---|---|---|---|---|---|---|---|---|---|---|---|---|
| WORD 0 | 1 | 1 | 1 | 1 | 1 | 1 | | 1 | 1 | 1 | 1 | 1 | 1 | p | p | p | | p | p | p | p |
| WORD 1 | 1 | 1 | 1 | 1 | 1 | 1 | | 1 | 1 | 1 | 1 | 1 | 1 | p | p | p | | p | p | p | p |
| WORD 2 | 1 | 1 | 1 | 1 | 1 | 1 | | 1 | 1 | 1 | 1 | 1 | 1 | p | p | p | | p | p | p | p |
| ⋮ | | | | | | | | | | | | | | | | | | | | | |
| WORD 29 | 1 | 1 | 1 | 1 | 1 | 1 | | 1 | 1 | 1 | 1 | 1 | 1 | p | p | p | | p | p | p | p |
| WORD 30 | 1 | 1 | 1 | 1 | 1 | 1 | | 1 | 1 | 1 | 1 | 1 | 1 | p | p | p | | p | p | p | p |
| WORD 31 | 1 | 1 | 1 | 1 | 1 | 1 | | 1 | 1 | 1 | 1 | 1 | 1 | p | p | p | | p | p | p | p |

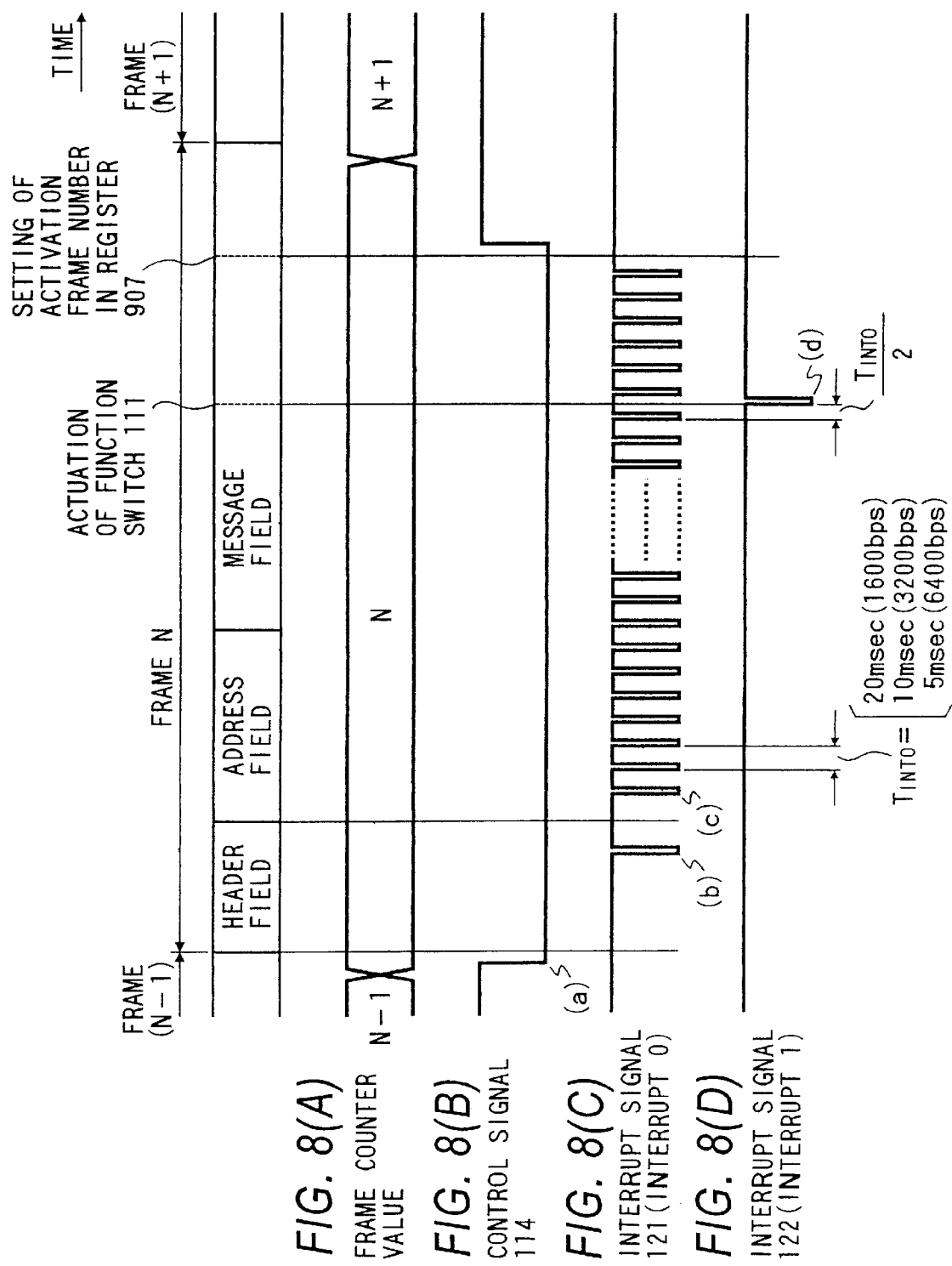

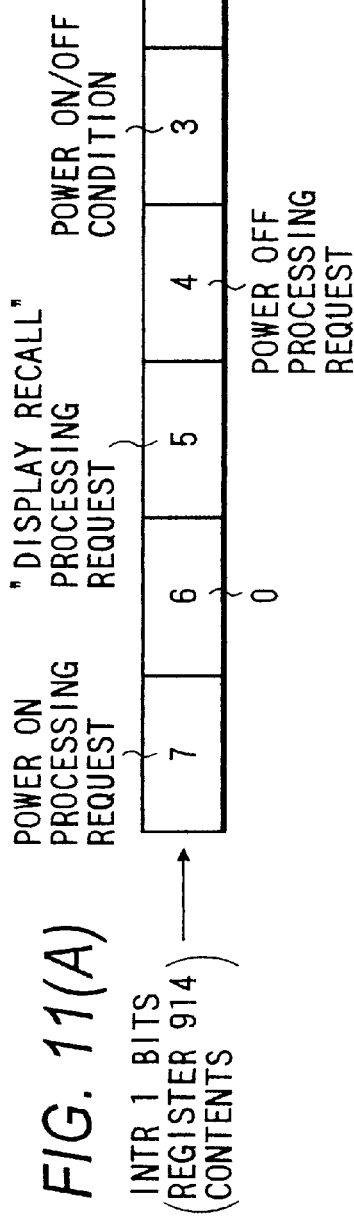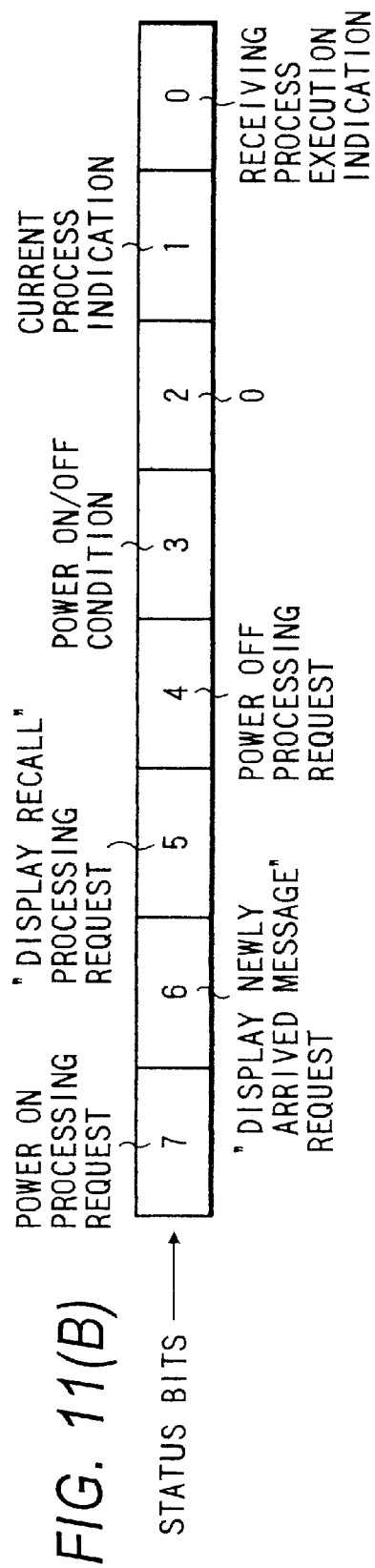
FIG. 11(A)
FIG. 11(B)

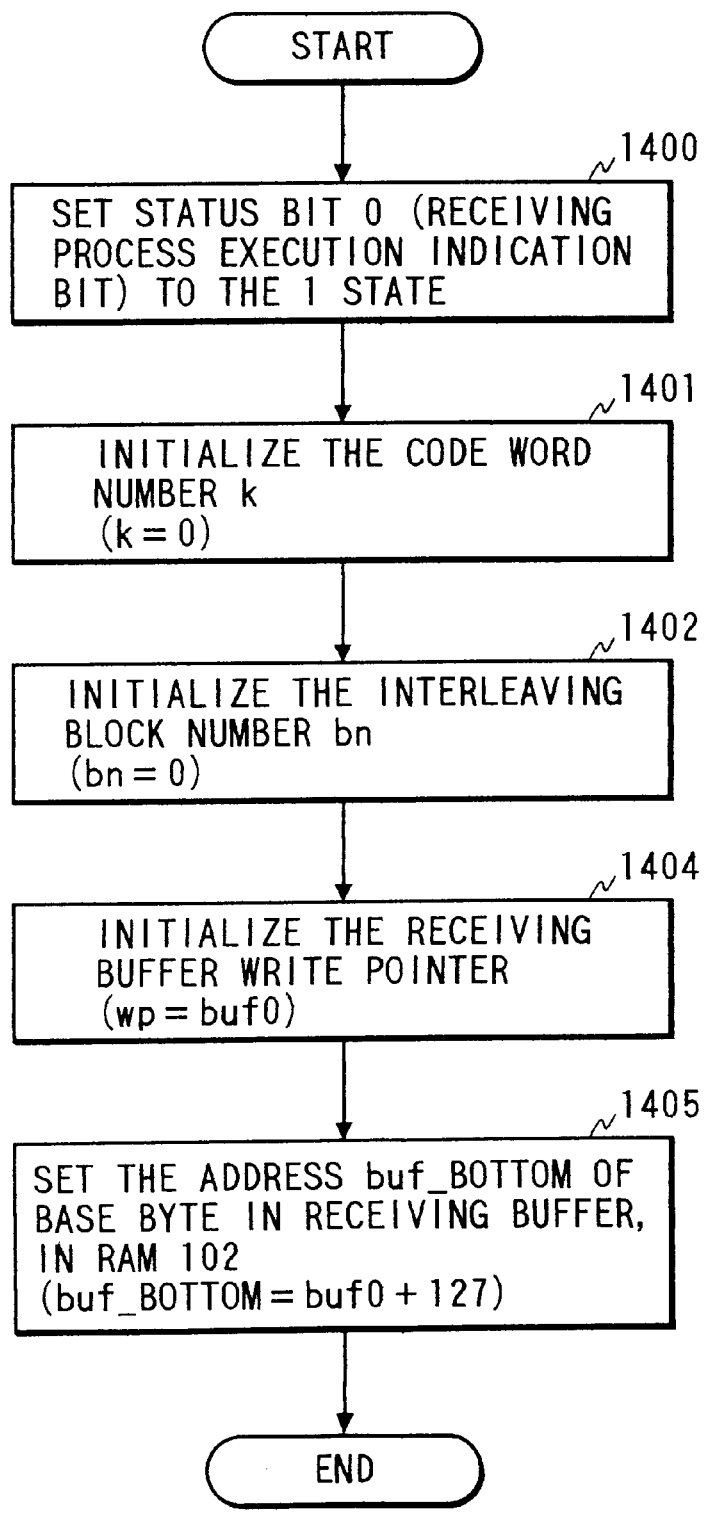

PAGING RECEIVER WHICH PERFORMS DATA COMMUNICATION PROTOCOL ANALYSIS THROUGH EXECUTION OF CONTROL PROGRAM

BACKGROUND OF THE INVENTION

1. Field of the Invention

The present invention relates to a radio receiving apparatus for receiving radio-transmitted digital data, and in particular to a paging receiver which provides digital data receiving and display functions, with the receiver having a data communication protocol analysis function.

2. Description of the Prior Art

By comparison with wired (i.e. cable-connected) digital data transmission, radio transmission of digital data is highly susceptible to externally induced noise. Because of this, and also because in general the effective data transmission rate is relatively low, radio data transmission has hitherto been used for transferring only small amounts of data at a time. In particular in the case of a radio paging system, since each paging receiver is extremely small in size, the receivers have been generally limited to displaying an array of approximately twenty to thirty numerals or characters. However due to changes which have occurred in recent years with regard to increased efficiency of modulation techniques and the development of communication protocols which are highly effective against the effects of noise, it has become feasible to transfer digital data at a high transmission rate via radio. Thus for example in the case of a paging system, it has become technically possible to transmit large sections of text, or images, etc., which are expressed by large amounts of data.

In the case of a communication protocol which makes possible such high-speed transmission of data by radio, the protocol itself is extremely complex, and as a result the paging receiver must incorporate a function for analyzing the protocol. For example with one method, to reduce the effects of induced noise, the transmitted digital data are encoded using a BCH (Bose Chaudhuri Hocquenghem) code, with the resultant data being interleaved and transmitted. In that case, the paging receiver must incorporate a function for analyzing the interleaved encoded data, and executing decoding of the BCH code to achieve error correction. The BCH code error correction method is also known as the "polynomial code" method, or "cyclic redundancy code (CRC)" method.

There are two possible approaches for implementing such a function. With one approach, dedicated hardware is provided in the paging receiver. With the other method, a software implementation is used, i.e. a suitable program is executed by the paging receiver for analyzing the communication protocol. Use of the first of these two possible approaches, with a prior art paging receiver, will first be described. FIG. 27 is a general system block diagram of an example of such a prior art paging receiver. In FIG. 27, a ROM (Read-only Memory) 2601 stores a program that is executed by a CPU 2600, while a RAM (Random Access Memory) 2602 stores received data. The CPU 2600 processes the received data in accordance with a program that is stored in the ROM 2601. A radio receiving section 2608 obtains a received radio signal from the antenna 2607, and demodulates the radio signal to obtain a digital signal. A bit synchronization section 2603 achieves bit synchronization between the data conveyed by that digital signal and a reference clock signal, and uses that clock signal to sample the digital signal and recover the originally transmitted digital data. A de-interleaving section 2604 analyzes the received digital data, to convert the data back to de-interleaved form, and an address verification section 2605 examines data of successive received addresses contained in the digital data, to detect coincidence with an address which has been assigned to the paging receiver and is held in the ROM 2601. A data decoding section 2606 executes decoding of the BCH code of the de-interleaved received data, to effect error correction. A LCD driver 2609, in response to output signals from the CPU 2600, drives a LCD (liquid crystal display device) 2610, while an audio driver 2611 drives a loudspeaker (i.e. an electro-acoustic transducer device) 2612.

The operation of this paging receiver example is as follows. The antenna 2607 receives radio waves transmitted from a base station of the paging system, and converts these to an analog signal. The receiver section 2608 demodulates this analog signal to obtain a digital signal, which is supplied to the bit synchronization section 2603. The bit synchronization section 2603 establishes synchronization between a reference clock signal and the digital signal from the receiver section 2608, converts the received digital signal to the original digital data stream, which is supplied to the de-interleaving section 2604. The de-interleaving section 2604 executes de-interleaving processing of the received digital data, and supplies the resultant digital data to the address verification section 2605 and data decoding section 2606. The address verification section 2605 compares address portions within the received data with the address that has been assigned to that paging receiver, and when address coincidence is detected, the data decoding section 2606 executes decoding of the BCH code of the received digital data portion corresponding to that received address, to thereby perform error correction processing of that digital data portion and recover corrected data as a received message. The received message is then supplied to the CPU 2600.

The CPU 2600 first temporarily stores successive parts of the received message within the RAM 2602. When storing of the received message has been completed, it is supplied via the LCD driver section 2609 to be displayed by the LCD 2610. In addition, an indication signal is transferred via the audio driver section 2611 to activate the loudspeaker 2612 and generate an audible indication to the user that a message has been received.

It can thus be understood that with such a prior art type of paging receiver, it is necessary to utilize dedicated hardware apparatus units (i.e. the data decoding section 2606, address verification section 2605, and de-interleaving section 2604) to provide a de-interleaving function and a BCH decoding function for processing the received digital data. Patents relating to such a prior art method are for example U.S. Pat. No. 5,311,516 and Japanese Patent SHO 63-87031.

The most attractive features of a paging receiver, for the general user, are that the paging receiver be highly portable, have low utilization costs, and above all, that the paging receiver have a low purchase price. However if such prior art technology is used, it becomes necessary to incorporate special dedicated hardware for use in protocol analysis, i.e. de-interleaving and error correction processing. Furthermore, if the communication protocol is complex, then the hardware that is required for analyzing the protocol will become accordingly complex, with a resultant increase in the manufacturing cost of the paging receiver.

With the second approach on the other hand, i.e. the "software approach", it has been necessary in the prior art for the CPU to execute complex processing to analyze the communication protocol, so that this again will result in the need to utilize a sophisticated design for the CPU, resulting in a corresponding increase in the manufacturing cost of the paging receiver. Specifically, if the CPU must execute de-interleaving of the received digital data, followed by BCH decoding processing, then if for example BCH (31, 21) decoding processing must be executed, 31 bits of BCH code must be operated on by an 11-bit value which represents the set of coefficients of a predetermined polynomial, used to generate the BCH code. Specifically, modulo-2 division of the 31 BCH code bits by the 11-bit set of coefficients of the polynomial (generally referred to as the generator polynomial) is performed, i.e. a long-division operation in which a succession of exclusive-OR operations is performed to obtain respective intermediate values, and finally obtain a remainder, i.e. the error syndrome. However a practical type of paging receiver is in general limited to using an 8 bit CPU, i.e. a CPU which operates with a word length of 8 bits, and the processing performance is not very high. Moreover in order to reduce power consumption and to minimize radio interference, the CPU is limited to operating at a low value of clock frequency, i.e. only a low frequency of performing processing operations can be achieved. In particular, executing BCH decoding processing would place an excessive burden on such an 8-bit CPU. It would of course be possible to instead use a CPU which operates at a high clock rate, however this would result in an increase in radio interference that is generated by the CPU operation, causing a resultant lowering of the receiver sensitivity, so that this would result in other problems.

Moreover with such a "software approach", due to the load imposed on the CPU becoming excessive, the performance of the paging receiver will deteriorate. Specifically, while the paging receiver is executing receiving processing, the response to actuations of switches of the paging receiver by the user will become extremely slow. This is due to the fact that it is difficult to execute the various types of processing that are required in response to switch actuations concurrently with executing the processing that is necessary for communication protocol analysis.

It can thus be understood that in the prior art there are severe problems with regard to providing a paging receiver which can receive large amounts of data at a time, i.e. can receive data which are sent at a substantially higher transmission rate than has been possible with prior art types of paging receiver. These problems basically result from the difficulty of using a simple and inexpensive type of CPU (in general, an 8-bit CPU) which must be operated at a low clock frequency, for analyzing a data transfer protocol which employs interleaving and a complex error-correction encoding technique such as BCH encoding.

SUMMARY OF THE INVENTION

It is an objective of the present invention to overcome the problems of the prior art set out hereinabove, by providing an improved paging receiver for a radio paging system whereby the paging receiver can be manufactured at low cost but which can analyze a communication protocol which employs a sophisticated error correction technique and so is suitable for high-speed transfer of digital data, and whereby such a capability can be achieved without increasing in the clock frequency of the CPU of the paging receiver by comparison with that of a conventional paging receiver and which can utilize a simple type of CPU which operates with a short word length, such as an 8-bit CPU.

To achieve the above objectives, a paging receiver according to the present invention performs all protocol analysis operations through CPU processing, with very little additional circuits being necessary. Two basic features of the invention whereby this is achieved are as follows.

Firstly, rather than executing each modulo-2 division operation to obtain the error syndrome of a BCH code word, most of the intermediate values which are required are obtained by table look-up operations, i.e. by reading out appropriate values held in a table which has been prepared beforehand and stored in memory. In essence, most of the calculation processing that is required for such modulo-2 division has already been executed, with the requisite values being available from the aforementioned table, so that the amount of processing which must be executed by the CPU to perform BCH error correction is substantially reduced, by comparison with prior art methods. Hence, it becomes possible to perform complex BCH error correction processing using a simple type of CPU, operating at a normal value of clock frequency, i.e. a value which will not result in radio interference being generated.

Secondly, the CPU executes two sections of the control program as respective separate processes, which are assigned respective stack regions in memory (i.e. as if these were separate programs). Thus, if an interrupt signal is supplied to the CPU while one of the processes is being executed, the items necessary for restarting that process upon return from executing interrupt processing (in particular, the current value of the program counter of the CPU) are set on the stack which is assigned to that process, the interrupt is serviced, then the process is restarted. one process, referred to as the main process, is used to handle operating requests which are input by the user as function switch actuations. The other process, referred to as the receiving process, performs de-interleaving and error correction processing of the received digital data.

While the receiving process is in progress, the stream of received digital data are successively accumulated in external registers, and transferred to the CPU at periodic intervals in small blocks (e.g. 4 bytes at a time), to be stored in memory and then processed. If a function switch actuation occurs during execution of the receiving process, then an interrupt signal is generated by an external circuit and supplied to the CPU, whereby the receiving process is interrupted, interrupt processing is performed, whereby the type of processing that is requested by the switch actuation is recorded, to be executed at a later time, i.e. after a subsequent return to the main process, and then the receiving process is restarted. This is made possible by the above-mentioned provision of separate stack regions for the main process and receiving process.

In that way, even if a simple type of CPU operating at a low value of clock frequency is utilized, satisfactory protocol analysis of the received digital data can be achieved, together with immediate response to any actuations of a function switch may which occur while data are being received and analyzed by the paging receiver. Thirdly, protocol analysis (i.e. de-interleaving and error correction) processing is applied only to those parts of the received digital data stream which are actually required by the paging receiver. Specifically, each frame of the received digital data contains an address field and a message field, with the address field containing a plurality of combinations of an address value and message position information. In each such combination, the message position information specifies the position (within the succeeding message field) of message data which are destined for the paging receiver to which the address value is assigned. With the present invention, protocol analysis of each address field is performed, with the address values conveyed by the resultant data being successively compared with the address value that has been assigned to the local paging receiver, to thereby detect the message position information corresponding to that paging receiver. However thereafter, rather than applying protocol analysis to the entire subsequent message field, only that portion of that subsequent message field that is indicated by the message position information is selected to be subjected to protocol analysis, to thereby derive only the required message data. IN that way, the invention enables the overall amount of data processing to be substantially reduced, since protocol analysis is applied only to those parts of the received digital data which are actually necessary.

Essentially, a radio receiver is provided for receiving a radio signal modulated with a digital data stream formed as successive interleaved data words, the digital data stream containing periodically occurring message portions which are addressed to the radio receiver, with the radio receiver comprising:

means for demodulating the received radio signal to recover the digital data stream, means for detecting respective starting time points of portions of the recovered digital data stream which correspond to the message portions addressed to the radio receiver, and for generating a corresponding signal indicative of each the starting time point, a central processing unit coupled to receive the recovered digital data stream, and data storage means having stored therein a control program which is executed by the central processing unit to perform at least de-interleaving processing of the recovered digital data stream;

wherein the central processing unit, through execution of the control program, periodically derives from the recovered digital data stream information indicative of the starting position within the recovered digital data stream of a portion of the digital data stream which constitutes a message portion that is addressed to the radio receiver, thereafter begins de-interleaving processing of that specific message portion at the starting time point, subsequently detects completion of that message portion, and terminates the de-interleaving processing when the completion is detected.

More specifically, the digital data stream contains periodically occurring combinations of an address field and a corresponding message field, the address filed containing a plurality of address data portions each comprising an address value and a data position portion expressing a position, within the corresponding message field, of a message data portion associated with the corresponding address value, wherein the central processing unit, through execution of the control program:

performs de-interleaving of each the address filed of the recovered digital data stream to obtain de-leaved address field data, compares successive parts of the de-interleaved address field data with a predetermined address vale which has been assigned to the radio receiver, when coincidence is detected between an address value in the de-interleaved address filed data and the predetermined address value, obtains message data position information from a data position portion that is associated with the address value for which coincidence is detected, and uses the message data position information to determine the starting position of the message portion (within the succeeding message field) which is addressed to that radio receiver.

The present invention further provides a radio receiver for receiving a radio signal modulated with an encoded data stream which has been generated by subjecting a digital data stream to Bose Chaudhuri Hocquenghem (BCH) encoding to obtain successive fixed-length BCH code words and subjecting the code words to interleaving processing, the digital data stream containing periodically occurring frames containing an address field and a message field, the address field containing a specific address portion which conveys position information for specific message data addressed to the radio receiver, the specific message data being located in the message field, the radio receiver comprising:

means for demodulating the received radio signal to recover the encoded data stream, means for detecting respective occurrences of the specific address portions of the recovered encoded data stream, and for generating corresponding a signal indicative of each the occurrence, at least one switch which is actuatable for generating a switch signal to specify at least one type of processing request, a central processing unit coupled to receive the recovered encoded data stream, and data storage means having stored therein a a control program which is executed by the central processing unit, and a division table containing a plurality of predetermined table values for use in modulo-2 division operations, wherein the control program includes a first portion corresponding to a main process for performing processing to detect each occurrence of the switch signal and processing in accordance with a processing request indicated by the switch signal, and a second portion corresponding to a receiving process for performing, in succession, de-interleaving processing and BCH decoding processing of selected portions of the recovered encoded data stream, wherein the central processing unit, while executing the main process is responsive to the generation of the signal indicative of the occurrence of an encoded data portion corresponding to a specific address portion for switching to execution of the receiving process, wherein the central processing unit, while executing the receiving process, detects completion of recovering the specific message from the encoded data stream, and responds to the detection by switching to execution of the main process, wherein modulo-2 division operations which are executed in the receiving process to decode respective BCH code words are performed by reading out and utilizing specific ones of the table values as intermediate calculation values, and wherein in the receiving process, when an occurrence of the specific address portion in a frame is detected, the position information is obtained from the specific address portion, thereafter de-interleaving processing of the message field is performed until a position indicated by the position information is reached, and de-interleaving and BCH decoding processing are then applied to a specific portion of of the encoded data stream, which contains the specific message data, to thereby recover the specific message data, More specifically, the present invention provides a radio receiver for receiving digital data transmitted as a modulated radio frequency signal by a base station of a radio paging system, the digital data being configured as a data stream formed of sequentially numbered frames which occur in fixed-duration frame intervals within each of successive fixed-duration cycle periods, each the frame beginning with a header field containing a corresponding frame number, with a specific frame which occurs at a specific fixed position within the cycle period having an address field which includes specific address data predetermined as corresponding to the radio receiver and having a message field containing specific message data which are destined for the radio receiver, with the specific address data containing a local address value which has been assigned to the radio receiver and information indicating a position of the specific message data within the message field of the specific frame, and with respective data of the address field and the message field of each of the frames having been converted to interleaved digital data, by interleaving in units of fixed-size data blocks prior to transmission by the base station, using a predetermined interleaving factor, wherein the radio receiver comprises radio signal receiving means for receiving the modulated radio frequency signal as an antenna signal and demodulating the antenna signal to obtain a digital signal, bit synchronization means for executing bit synchronization processing of the digital signal to recover the digital data stream, a central processing unit, coupled to receive the recovered digital data stream, first data storage means for storing data which are processed by the central processing unit, second data storage means coupled to the central processing unit, having fixedly stored therein a control program which is executed by the central processing unit based on instruction address values supplied from the central processing unit, third data storage means for storing the local address value and the frame number of the specific frame, data display means coupled to the central processing unit, for providing visual display of processing results which are generated by the central processing unit;

wherein, de-interleaving of the interleaved address field data of the specific frame is executed, to recover de-interleaved address field data, the contents of the de-interleaved address field data are successively compared with the local address value, to detect address coincidence and thereby obtain from the de-interleaved address field data the specific address data corresponding to the radio receiver, information indicating the position of the specific message data within the message field are obtained from the specific address data, the occurrence of the interleaved message field of the specific frame is detected, de-interleaving of the interleaved message data is executed, to recover de-interleaved message data, the information indicating the position of the specific message data within the message field is utilized to detect the occurrence of the specific message data within the message field, and thereby extract the specific de-interleaved message data from the interleaved message field data, the specific message data are stored in the first data storage means, and the specific message data are supplied to the data display means, for thereby displaying the contents of the message data.

In addition, de-interleaving of the interleaved address field data of the specific frame is performed by reserving a plurality of regions, each of identical size to the fixed-size data blocks, as respective receiving buffers in the first data storage means, writing the data of the interleaved address field sequentially into the receiving buffers such as to cyclically fill successive ones of the receiving buffers with data, and sequentially reading out the data of the interleaved address data from respective memory addresses of each of the receiving buffers in a predetermined sequence which is determined in accordance with the interleaving factor, to recover corresponding de-interleaved data of the address field, and wherein de-interleaving of the interleaved message field data of the specific frame is performed by writing the data of the interleaved message field sequentially into the receiving buffers such as to cyclically fill successive ones of the receiving buffers with data, and sequentially reading out the interleaved message data from respective memory addresses of each of the receiving buffers in the predetermined sequence which is determined in accordance with the interleaving factor, to recover corresponding de-interleaved message field data.

According to another aspect, a radio receiver according to the present invention further comprises a division table which is held fixedly stored in the second data storage means, with the table values being respective results of modulo-2 multiplication of various binary numbers by the set of bits constituting the coefficients of a BCH code-generating polynomial, and with intermediate values which are required in each of respective modulo-2 division operations for decoding BCH code words being derived based upon values obtained from the division table.

According to another aspect, such a radio receiver comprises control logic circuit means for receiving the recovered digital data stream and periodically supplying the digital data to the central processing unit in successive fixed-size transfer data units and for detecting each occurrence of the specific frame, the control logic circuit means comprising frame number comparator means including a frame number register for holding the frame number of the specific frame, a frame counter, means for periodically incrementing the frame counter with a period which is identical to the frame interval, and means for detecting coincidence between the contents of the frame counter and the frame number register and for starting to assert a receiving control signal for enabling transfer of the digital signal from the radio signal receiving means to the bit synchronization means when the coincidence is detected, and received data storage means comprising data register means having a data storage capacity identical to the data transfer unit size, the received data storage means being coupled via data bus means to the central processing unit, and including means for sending to the central processing unit a first type of interrupt signal to request a transfer of the contents of the data register means to the central processing unit through execution of a data acquisition operation by the central processing unit, the received data storage means including means for repetitively executing a sequence of operations for successively storing data of the recovered digital data stream in the data register means until the data register means is filled, then generating the first type of interrupt signal and supplying the contents of the data register means via the data bus means to the central processing unit during the data acquisition operation.

In such a radio receiver, the data register means preferably comprises a plurality of data registers each having an identical value of storage capacity which is an integral number of 8-bit bytes, with respective contents of the plurality of data registers being successively transferred to the central processing unit by each the data acquisition operation.

In general, such a radio receiver is provided with at least one function switch which is actuatable for generating a function switch signal indicating a processing request, and each of the frames begins with a header field containing non-interleaved data expressing the frame number. With the present invention, wherein the control logic circuit means includes means for extracting the frame number data from the header field, storing the frame number data in the data register means, then executing an initial production of the first type of interrupt signal, and includes means for generating a second type of interrupt signal in response to the function switch signal.

The central processing unit includes a program counter which holds the address in the second data storage means of an instruction of the control program which is to be executed next by the central processing unit. With a radio receiver according to the present invention, the control program comprises respective portions which correspond to a main process and a receiving process, a first interrupt processing routine for servicing the first type of interrupt signal by transferring the contents of the data register means to be stored in the first data storage means, and a second interrupt processing routine for servicing the second type of interrupt signal. The central processing unit, through execution of the control program, reserves a first region of the first data storage means as a first stack region for use by the main process, and a second region of the first data storage means as a second stack region for use by the receiving process, and reserves at least one bit within the first data storage means as a status bit, and, while executing the main process, is responsive to each production of the second type of interrupt signal for storing the current value of the program counter of the central processing unit in the first stack region, executing the second processing routine to set the status bit in accordance with the function switch signal, then reading out the program counter value stored in the first stack region and setting the value in the program counter of the central processing unit, returning to the main process, subsequently checking the condition of the status bit, and executing predetermined processing in accordance with the condition of the status bit.

Also, while executing the main process, the central processing unit is responsive to the initial production of the first interrupt signal in each the specific frame for storing the current value of the program counter in the first stack region, executing the first interrupt processing routine to store the frame number data from the data register means into the first data storage means, setting the program counter to a predetermined initial value and commencing execution of the receiving process, subsequently, during execution of the receiving process, is responsive to each production of the first type of interrupt signal for storing the current value of the program counter of the central processing unit in the second stack region, executing the first interrupt processing routine to thereby store the contents of the data register means in the first data storage means, reading out the program counter value stored in the second stack region, setting the program counter value in the program counter of the central processing unit, and returning to execution of the receiving process, and during execution of the receiving process, is responsive to generation of the second type of interrupt signal for storing the current value of the program counter of the central processing unit in the second stack region, executing the second interrupt processing routine to set the status bit in accordance with the function switch signal, then reading out the program counter value stored in the second stack region, and setting the value in the program counter of the central processing unit.

In addition, the control program contains a portion whereby the central processing unit, after storing the frame number data in the first data storage means, executes processing to compare the frame number expressed by the received frame number data with the frame number which is stored in the third data storage means, and when frame number non-coincidence is detected by the comparison processing, sets the frame number expressed by the frame number data as the count value of the frame counter, and terminates the receiving process by reading out the program counter value stored in the first stack region, setting the value in the program counter of the central processing unit, and starting continuous execution of the main process.

BRIEF DESCRIPTION OF THE DRAWINGS

In the appended drawings:

FIG. 4 shows the configuration of a header field of a frame of the transmitted data;

FIG. 5 shows the configuration of a code word, of the transmitted data;

FIG. 6 shows the configuration or an address field and a message field, in a frame of the transmitted data;

FIG. 7 shows respective sequences of scanning a block of code words to perform data interleaving, for three different values of interleaving factor, prior to data transmission;

FIG. 8 is a timing diagram for use in describing a relationship between a received frame of digital data and executions of interrupt operations whereby operation of a CPU of the preferred embodiment is repetitively switched between a main process and a receiving process.

FIG. 11 shows respective significances of bits which are held in an interrupt source register within the control logic section of FIG. 9 and of status bits which are held in a RAM, in the preferred embodiment;

FIG. 15 is a flow diagram showing the operating sequence of initializating processing for the receiving process, executed by the CPU of the preferred embodiment;

DESCRIPTION OF PREFERRED EMBODIMENTS

Figure 1:
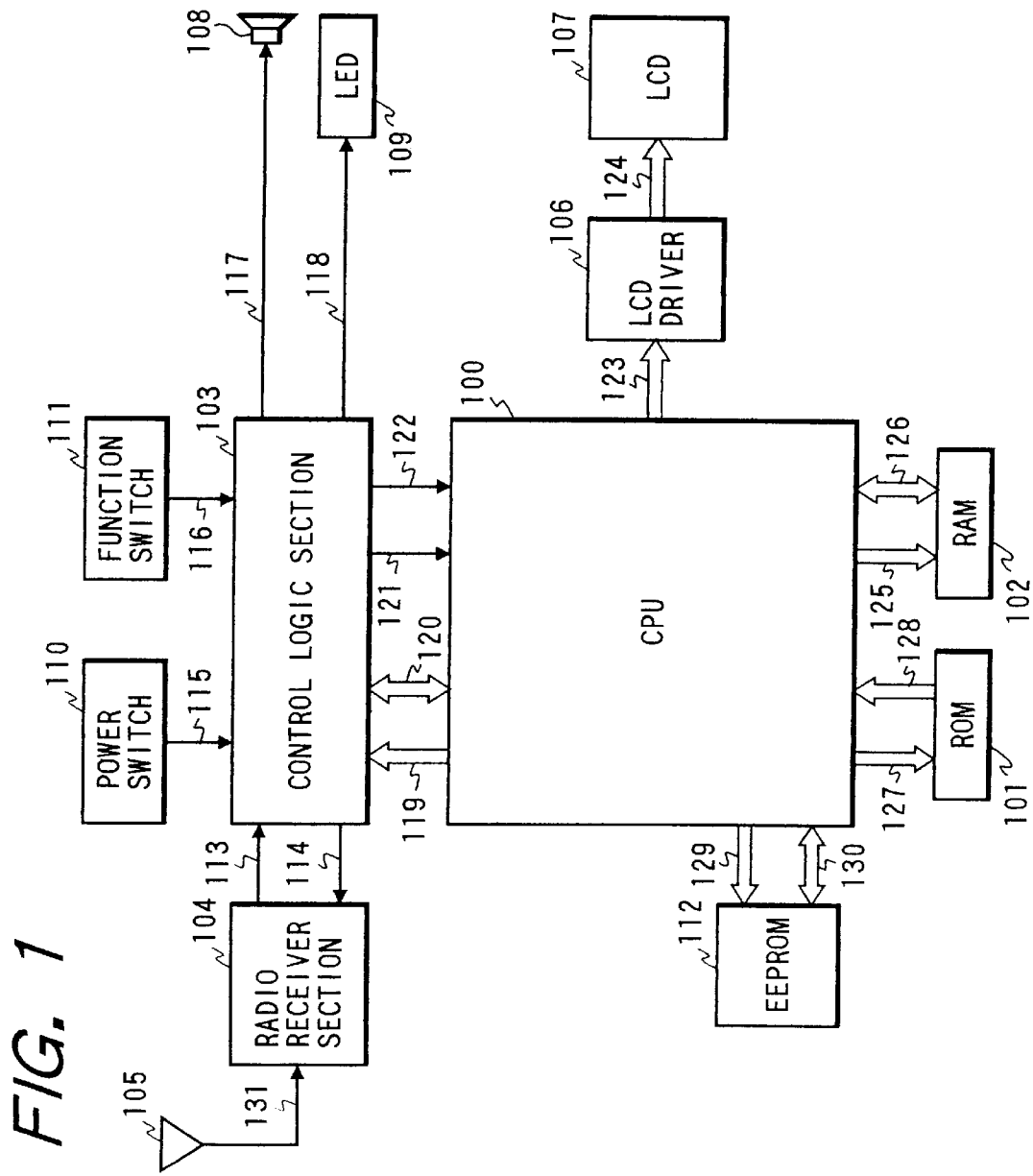
FIG. 1 is a system block diagram showing the general configuration of a preferred embodiment of a paging receiver according to the present invention.

FIG. 1 is a general system block diagram of an embodiment of a paging receiver for a radio paging system, according to the present invention. In FIG. 1, a ROM 101 has stored therein a program which is executed by a CPU (central processing unit) 100. A RAM 102 stores received digital data, and the CPU 100 processes the received digital data in accordance with the program stored in the ROM 101. A radio receiving section 104 demodulates the signal obtained by an antenna 105 to obtain a digital signal 113, and supplies this to a control logic section 103, which uses the digital signal to recover the transmitted digital data and supplies the digital data to the CPU 100, 32 bits at a time. It should be understood that the term "digital signal" as applied here to signal 113 signifies a signal which has been derived by demodulating the received radio signal and which can be sampled to recover the transmitted digital data, i.e. in general, signal 113 is a demodulated baseband signal.

In addition, when a message is received by the paging receiver, the control logic section 103 drives a loudspeaker 108 and a LED 109 to provide indications to a user. The control logic section 103 also generates processing interrupt requests to the CPU 100, in response to actuations of a power ON/OFF switch 110 or a function switch 111. An EEPROM (Electronic Erasable Programmable Read-only Memory) 112 stores the information for identifying those (periodically occurring) parts of a stream of transmitted data which are to be received by this paging receiver. A LCD driver 106 drives a LCD 107 to display received messages, in response to signals supplied by the CPU 100. The power ON/OFF switch 110 is used to switch power on and off to the paging receiver, while the function switch 111 is actuated to re-display on the LCD 107 a message which has been previously received by the paging receiver, i.e. provides a display recall function. Numerals 113 to 131 denote respective electrical signals which pass between the units 100 to 112, with these signals being transferred via respectively corresponding signal lines.

The antenna signal 131 is supplied to the radio receiving section 104, which demodulates that signal to obtain a digital signal 113, and supplies that signal to the control logic section 103. The digital signal 113 is of a form which must be subjected to bit synchronization processing (i.e. by sampling at appropriate clock timings) to recover the transmitted data conveyed by that signal. A receiving section control signal 114 is supplied from the control logic section 103 to the radio receiving section 104, for controlling the operation of section 104. A control signal 115, generated in response to actuation of the power ON/OFF switch 110, is also supplied to the control logic section 103, as is a control signal 116 which is generated in response to actuation of the function switch 111. The control logic section 103 generates an audio signal 117, which drives the loudspeaker 108 to produce an audible indication, and also generates a control signal 118 which drives the LED 109 to produce ON/OFF flashing of the LED. Data signal 120 is generated when internal register reading and writing operations are executed from/to registers of the control logic section 103, as specified by address signal 119 supplied from the CPU 100. An interrupt signal 121 and an interrupt control signal 122 are supplied from the control logic section 103 to the CPU 100. A control signal 123 is supplied from the CPU 100 to the LCD driver 106, which generates a corresponding control signal 124 for driving the LCD 107. An address signal 125 is supplied from the CPU 100 to the RAM 102, to specify addresses for reading/writing from/to the RAM 102, with resultant data signals 126 being transferred between the RAM 102 and CPU 100. An address signal 127 is supplied from the CPU 100 to the ROM 101, to specify addresses for reading from the ROM 101, with a resultant data signal 128 being transferred from the ROM 101 to the CPU 100. An address signal 129 is supplied from the CPU 100 to the EEPROM 112, to specify addresses for reading/writing from/to the EEPROM 112, with resultant data signals 130 being transferred between the EEPROM 112 and CPU 100.

This embodiment is a paging receiver of a paging system which provides service within a specific area. Radio waves transmitted from the base station of the radio paging system are received by the antenna 105, and converted to an analog-modulated radio-frequency signal 131, which is demodulated and converted to the aforementioned digital signal 113 by the radio receiver section 104, with that digital signal 113 being supplied to the control logic section 103 to recover the transmitted digital data. These digital data are then supplied to the CPU 100. The CPU 100 analyzes the received digital data in accordance with the program which is stored in the ROM 101. If the received digital data constitute a message which has as its destination this paging receiver, then the message data are stored in the RAM 102 and are then transferred to the LCD driver 106 as a display signal 123, and thereby supplied to the LCD 107 for displaying the received message. In addition, an internal register of the control logic section 103 is accessed, whereby the loudspeaker 108 is driven to generate an audible indication, while the LED 109 is driven to execute sequential ON/OFF flashing. The user is thereby notified that a message has been received.

When the power ON/OFF switch 110 is actuated, to switch off the supply of power to the paging receiver, an interrupt signal is supplied by the control logic section 103 to the CPU 100. This causes the CPU 100 to execute power-off processing in accordance with the program which is stored in the ROM 101, and the paging receiver then enters the "power off" status. In that condition, if the power ON/OFF switch 110 is actuated to thereby switch on the supply of power to the paging receiver, then the control logic section 103 supplies an interrupt signal to the CPU 100, whereby the CPU 100 executes intializing processing of the paging receiver in accordance with the program which is stored in the ROM 101, and the paging receiver then enters the "power on" status, i.e. the operating condition in which messages can be received. In that condition, if the function switch 111 is actuated to thereby initiate a "display recall" operation, then the control logic section 103 sends an interrupt signal to the CPU 100 whereby the CPU 100 executes processing in accordance with the program stored in the ROM 101, to cause the message which is held in the RAM 102 to be displayed by the LCD 107.

Figure 2:
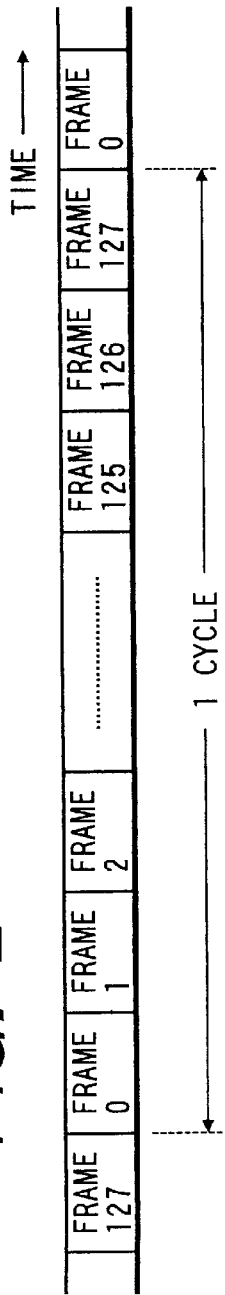
FIG. 2 is a conceptual timing diagram, for illustrating frames constituting one cycle of a stream of transmitted data of a radio paging system.

Before providing a detailed description of the operation of this paging receiver embodiment, the transmission data format used by the paging system within which this paging receiver operates will be described. That transmission data format is illustrated in FIGS. 2 to 7. Each paging receiver of the paging system is allocated periodically occurring time slots, referred to in the following as frames, with each frame having for example a duration of 1875 msec. Data which are to be transmitted to a paging receiver are transmitted within each of the frames which have been allocated to that paging receiver. As shown in FIG. 2, the frames are assigned respective numbers, from frame 0 to frame 127, within a periodic frame sequence which will be referred to as a cycle. That is to say, a set of 128 successive frames, from frame 0 to frame 127, constitute one cycle (i.e. 240 seconds, if the frame length is 1875 msec). Data are transmitted by a base station as a sequence of such cycles. Each of the frame intervals (frame 0 to frame 127) is allocated to a plurality of paging receivers. This is made possible by assigning a unique address to each of the paging receivers, and including address data within each frame to specify the paging receiver which is the destination of the corresponding message. That is to say, each paging receiver is allocated both a frame number and an address, by the paging system. With this embodiment of the present invention, frame numbers N (0<N<127) and addresses A (0<A<2097151) are allocated to the paging receivers which are serviced by a base station. The frame number N and the address A which have been allocated to the paging receiver of this embodiment are stored, as an ID number, in the EEPROM 112.

Figure 3:
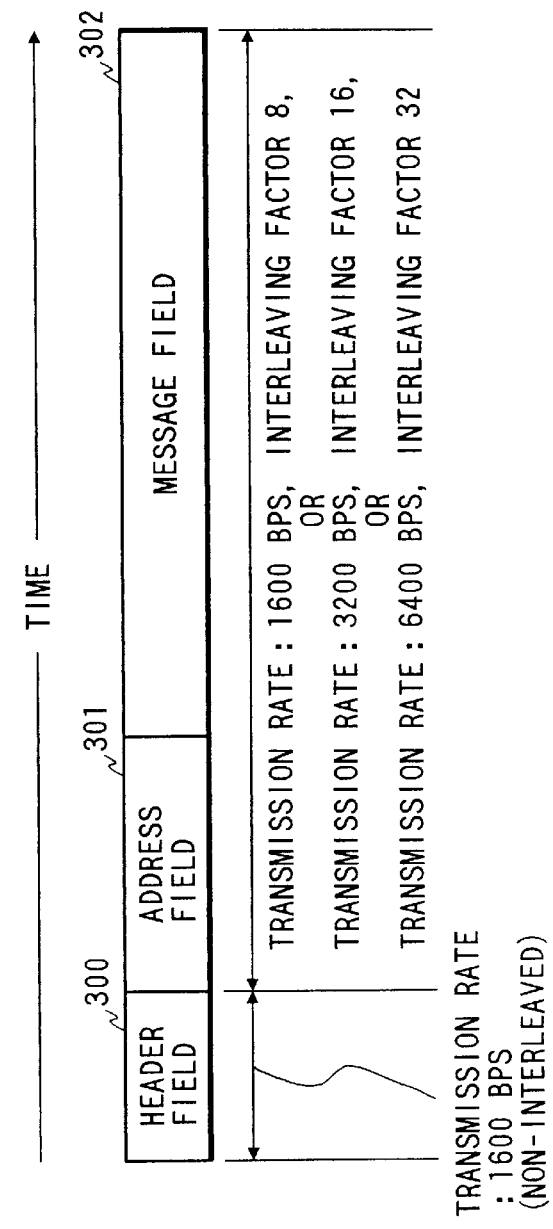
FIG. 3 shows the configuration of one frame of the transmitted data.

As shown in FIG. 3, which shows the configuration of each frame of transmitted data, this consists of a header field 300, an address field 301, and a message field 302. The header field 300 has a duration of 115 msec, and is transmitted at a fixed data rate of 1600 bps, and so contains a fixed amount of data. The sum of the lengths of the address field 301 and the message field 302 is 1760 msec, however the respective durations of the field 301 and field 302 are variable. In addition, the address field 301 and the message field 302 may be transmitted at a bit rate of 1600 bps, 3200 bps, or 6400 bps, in data units of 32 bits, n-order data interleaving. The interleaving factor n will vary in accordance with the data transmission rate. Specifically, n takes the values 8, 16 and 32 for the cases of the data transmission rate being 1600 bps, 3200 bps and 6400 bps respectively. Designating each interleaving unit, i.e. n sets of 32 bits, as a single data block, the address field 301, message field 302 in combination can be used to transmit 11 data blocks.

The header field 300 serves to indicate the data transmission rate at which the address field 301 and subsequent data of the frame are transmitted, and also the frame number of that frame. FIG. 4 shows details of the configuration of the header field 300. In the field 300, a first field which will be referred to as the synchronization field 0, designated by numeral 400, is a synchronization pattern field of the header field. The header field consists of 112 bits, and the synchronization pattern field 400 is transmitted at the 1600 bps data transmission rate of the header field. There are three possible forms of the synchronization pattern, and the data transmission rate which is applied to the address field 301 and subsequent data of the frame is indicated by the type of synchronization pattern of the synchronization field 0. The header field 300 further consists of a frame information field 401 and a second synchronization field, which will be referred to as synchronization field I and is designated by reference numeral 402 in FIG. 4. The frame information field 401 is a 32 bit field which includes information expressing the frame number. The synchronization field 1 is a synchronization pattern field which is transmitted at the data transmission rate of the address field 301 and subsequent data of that frame, i.e. 1600 bps, 3200 bps or 6400 bps. Depending upon whether the data transmission rate of the address field is 1600 bps, 3200 bps or 6400 bps, the number of bits constituting the frame synchronization field 402 will be either 40 bits, 80 bits or 160 bits, respectively.

The data format of the frame information field 401 is as shown in FIG. 5. The bits 0 to 30 constitute BCH encoded data, i.e. using BCH (31, 21) encoding. The set of bits 0 to 20, designated by numeral 500, constitute the data bits, while bits 21 to 30 are checksum bits. Bit 31 is a parity bit, for the set of bits 0 to 30. By decoding the received BCH code, it is possible to correct errors in a maximum of two bits, while in addition by executing the parity check, up to three error bits can be detected. In the following, the 32 bit code data of this format will be referred to as a code word. However only the 31 bits other than the parity bit are subsequently subjected to BCH code decoding, so that from the aspect of BCH code error detection, the code word length is 31 bits. This error detection (i.e. BCH code decoding) is performed by dividing these 31 bits of a code word by a predetermined set of code-generating polynomial coefficients (e.g. 11 bits), using modulo-2 division, to obtain a 21-bit quotient. If the division does not result in a remainder, then this indicates that no errors are detected while if there is a remainder (referred to as the error syndrome), then that can be utilized to correct up to the aforementioned maximum of two bit errors in the code word, as described in detail hereinafter. The invention is of course not limited to use of (31, 21) BCH encoding.

The message field 302 of FIG. 3 is a field which contains the contents of respective messages which are transmitted within that frame. The address field 301 expresses the starting position of the message field 302, and the respective destinations of the messages which are conveyed in the message field 302 (i.e. the respective addresses which have been allocated to the paging receivers which are to be recipients of the messages), and also the respective positions of these messages within the frame.

FIG. 6 shows an example of the address field and message field, before executing interleaving processing. Word number 0 of the address field expresses the number, designated here as Kms, of the word which begins the message field. Thereafter, each of successive pairs of words of the address field expresses the address of a paging receiver for which a message is conveyed in that frame, and the position of that message within the frame. For example the second word of the address field, i.e. word 1, shows the address of a paging receiver A. The third word, word 2, expresses the number of the word which is the leading word of the message to which has paging receiver A as its destination, and also the number of words constituting that message.

When transmitting the data of the address field and message field, before executing interleaving processing, the data are formed into blocks of code words, as illustrated in FIG. 7. These are formed as shown in diagrams (a), (b) or (c) of FIG. 7, in accordance with whether the interleaving factor is 8, 16 or 32. The bit data of these code words are transmitted by scanning in the sequence shown by the arrows. Thus, when analyzing the received encoded address field and message field data, de-interleaving is first performed, in units of blocks, then BCH decoding is executed in units of code words, to effect error detection and correction. [0051].

The operation of this embodiment will be described in greater detail in the following, assuming that data of the format described above are received. Firstly, the antenna 105 converts the received radio waves to the analog signal 131, which is supplied to the radio receiving section 104. If the control signal 114 is active, i.e. is at the L (low) logic level, then the radio receiving section 104 demodulates the analog signal 131 received from the antenna 105 to obtain the digital signal 113, which is supplied to the control logic section 103. If the control signal 114 is at the H (high) logic level on the other hand, the radio receiving section 104 is set in a condition (i.e. a condition in which that section can be, at least partially, in a power-down condition to thereby reduce power consumption) in which it does not demodulate the modulated RF signal 131, so that the digital signal 113 is not supplied to the control logic section 103, and the output terminal of the radio receiving section 104 is set to a high impedance state. It can thus be understood that receiving operation of the radio receiving section 104 is controlled in accordance with the logic level of the control signal 114, with that control signal defining periodically occurring (as described hereinafter) receiving intervals in which the digital signal 113 is supplied to the control logic section 103.

The level of the control signal 114 is controlled by the control logic section 103. FIG. 8 is a timing diagram for illustrating the operation of this embodiment. As shown in diagram (B) of FIG. 8, the control logic section 103 sets the control signal 114 to the L level during each interval in which a frame (designated in FIG. a as frame N) is received which has been allocated to this paging receiver. Thereafter, the level of the interrupt signal 121 is set to the L level when necessary, with each such occurrence functioning as an interrupt request to the CPU 100. These interrupt requests are generated for successively transferring data from the control logic section 103 to the CPU 100.

Figure 9:
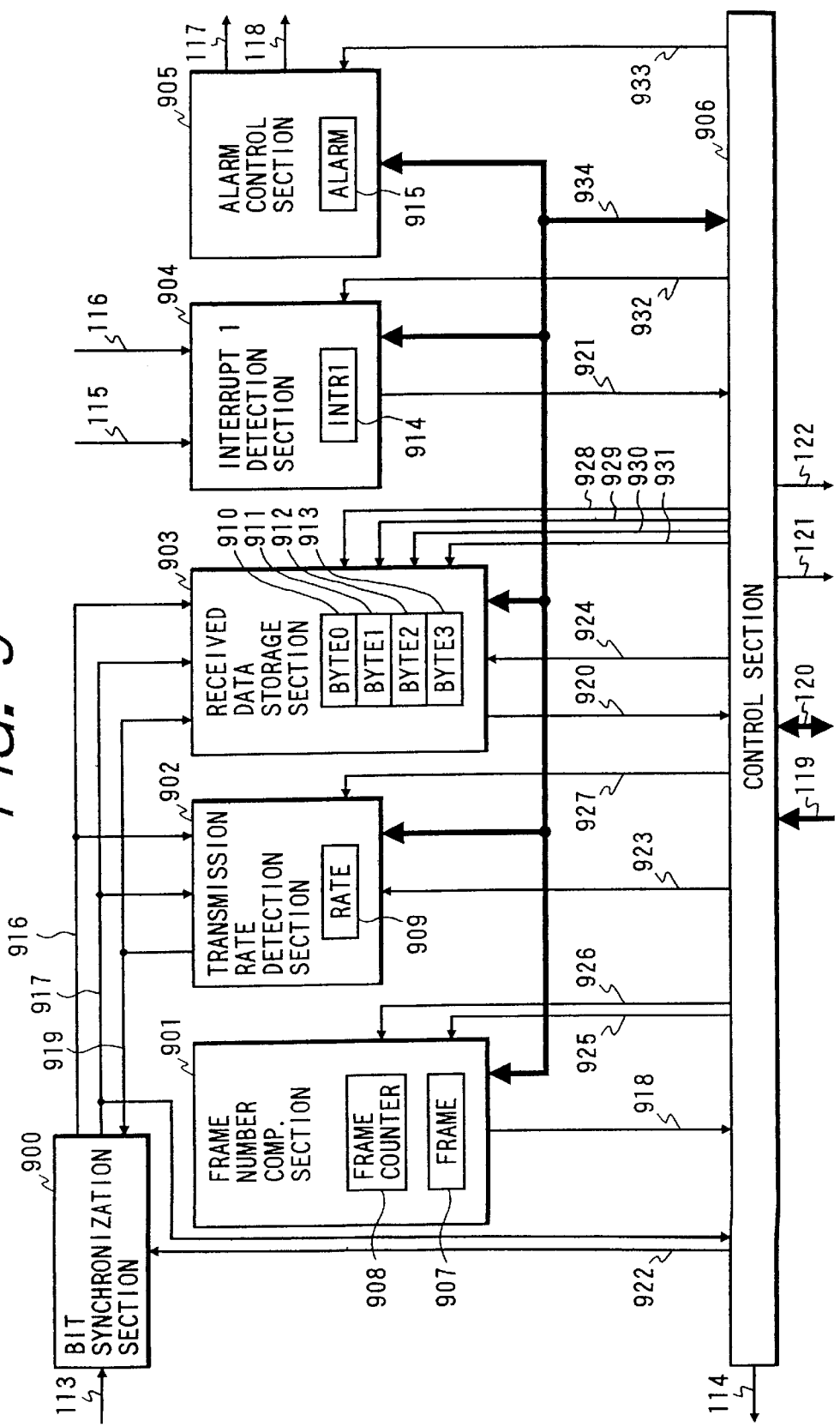
FIG. 9 is a system block diagram showing the configuration of a control logic section of the preferred embodiment.

In order to explain in detail the operation of the control logic section 103, the internal configuration of that section will first be described, referring to the system block diagram of the control logic section 103 which is shown in FIG. 9. As shown in FIG. 9, this is made up of a bit synchronization section 900 which serves to synchronize the received digital signal 113 with a reference clock signal, a frame number comparison section 901 which compares successively counted frame numbers with the frame number that has been assigned to that paging receiver, a transmission rate detection section 902 which detects the aforementioned information describing the data transmission rate of the address field and subsequent data of a frame, a received data storage section 903 which stores received data within a set of internal registers, an Interrupt 1 detection section 904 which detects function switch and power switch actuations that are to result in execution of interrupt processing by the CPU 100, an alarm control section 905, and a control section 906 which functions as an interface between the CPU 100 and the alarm control section 905. The alarm control section 905 generates drive signals for the loudspeaker 108 and LED 109. In addition, the control section 906 controls the operation of the bit synchronization section 900, the transmission rate detection section 902, and the received data storage section 903, and controls interfacing between these sections and the CPU 100.

Internally, the frame number comparison section 901 contains an activation frame number register 908 which holds the number of the frame that is required to be received by this paging receiver in each cycle, and a frame counter 907. The frame counter 907 is a modulo-N counter, where N is the number of frames in each cycle, i.e. assuming the example of FIG. 2, N is 128 so that the frame counter 907 is a 7-bit counter. This is incremented once in each frame interval (i.e. once in each 1875 msec, assuming the time values specified hereinabove) by a count increment signal generated by the CPU 100, at a time point which is close to the start of the frame interval.

The transmission rate detection section 902 contains a transmission rate register 909, whose contents express the data transmission rate of the address field and subsequent data of a frame. The received data storage section 903 contains four received data registers, 910, 911, 912 and 913, each of which stores one 8-bit byte of received data, i.e. the set of received data registers 910 to 913 can store 32 bits (one long word) of received digital data. The four bytes which are set into the received data registers 910, 911, 912 and 913 will be referred to as byte 0, byte 1, byte 2 and byte 3, respectively.

The Interrupt 1 detection section 904 contains an interrupt source register 914, in which the respective states of four bits indicate the contents of processing that is to be executed by the CPU 100. in response to an interrupt request (referred to in the following as an Interrupt 1 processing request) that is supplied to the CPU when the function switch 111 is actuated. The alarm control section 905 contains an alarm register 915, whose contents control the operation of the loudspeaker 108 and LED 109.

The received data signal 916 is derived, in the bit synchronization section 900, by sampling the digital signal 113 at timings synchronized with a clock signal, as described above. The bit synchronization section 900 also generates a synchronization pulse signal 917, which is utilized for latching the data conveyed by the received data signal 916 (e.g. which is synchronized with the sampling timings used in deriving the received data signal 916). The received data signal 916 is supplied to the transmission rate detection section 902 and received data storage section 903 The synchronization pulse signal 917 is supplied to the transmission rate detection section 902, received data storage section 903 and control section 906, and is used for data latching purposes by the transmission rate detection section 902 and the received data storage section 903.

The coincidence detection control signal 918 is a "low active" control signal, which is supplied to the control section 906 from the frame number comparison section 901, and is asserted to indicate coincidence between the frame number being generated by the frame counter 907 and the frame number which is held in the. activation frame number register 908, i.e. the frame number which has been assigned to this paging receiver. The control signal 919, which indicates the data transmission rate for the address field and subsequent data of a frame, is input to the bit synchronization section 900 and to the received data storage section 903. Control signal 920, which is a "low active" signal, goes active to indicate that 32 bits of received data have been set into the registers 910 to 913 of the received data storage section 903, and is supplied to the control section 906. Control signal 921, which is a "low active" signal, goes active to indicate that a switch actuation requires that interrupt processing be initiated by the CPU 100. That signal 921, generated by the Interrupt 1 detection section 904, is supplied to the control section 906.

The control signals 922, 923 and 924 which control the bit synchronization section 900, transmission rate detection section 902 and received data storage section 903 respectively are generated and supplied by the control section 906. The control signal 922 executes changeover of synchronization operation of the bit synchronization section 900 in accordance with the data transmission rate of the header field of a frame and the data transmission rate of the address field and subsequent data of that frame. specifically, when the control signal 922 is at the high level, the bit synchronization section 900 operates at the data transmission rate of the header field (1600 bps), while when the control signal 922 is at the low level, the bit synchronization section 900 operates at the data transmission rate of the address field and subsequent data of the frame. The control signal 923 is an "active low" signal, which goes to the active level at times when the transmission rate detection section 902 detects that the data transmission rate for the address field and subsequent data of a frame is currently applicable. The control signal 924 is an "active low" signal, and controls storage of received data in the received data storage section 903. Specifically, when the control signal 924 is at the low level, the received data storage section 903 acts to store received data in its internal registers, whereas when the control signal 924 is at the high level, that storage operation is stopped.

The selector signals 925 to 933, when at the low level, respectively select the activation frame number register 908, the frame counter 907, the transmission rate register 909, the set of data registers 910 to 913, the interrupt source register 914, and the alarm register 915. All accesses from the CPU 100 to the internal registers or counters of the control logic section 103 are executed via the control section 906. When such an access is executed, the selector signal of the specific internal register or counter that is to be accessed is set to the low level, whereupon the CPU 100 can perform a read, write, or set value operation with respect to that internal register or counter, via the data bus 934.

The operation of the control logic section 103 will be described in the following. As an initial condition, the number of the frame which has been allocated to this paging receiver (that frame number being referred to in the following as the activation frame number) is written into the activation frame number register 908 by the CPU 100. In addition, the control signal 114 is asserted, to enable the digital signal 113 to be supplied from the receiving section 104 to the bit synchronization section 900. Thereafter, the frame counter 907 is incremented periodically by a signal which is sent from CPU 100 (via the data bus 934), with a period which is predetermined as being identical to the value of frame interval (i.e. 1875 msec).

It will be apparent that initial synchronization of such a count increment signal with the successive frames of the received data stream can readily be performed based on detection, by the bit synchronization section 900, of the bit synchronization field 400 of the first frame which is received when operation of the radio receiver is started, so that detailed description will be omitted.

The frame number comparator section 901 includes a data comparator (not shown in the drawings) for detecting coincidence between the count value of the frame counter 907 and the value held in the activation frame number register 908. Each time it is detected the count value of the frame counter 907 coincides with the activation frame number that is held in the frame number register 908, (thereby indicating the starting time point of a received data frame which contains message data addressed to this paging receiver) the frame number comparison section 901 asserts the control signal 918, and the control section 906 sets the control signal 114 to the low level, as shown in diagram (a) of FIG. 8. When this occurs, the bit synchronization section 900 receives as input the digital signal 113 from the radio receiving section 104, and begins operations synchronized with the data transmission rate (1600 bps) of the header field, for thereby outputting the received data signal 916 and the synchronization pulse signal 917. At that time, the control signal 922 is at the high level.

The control section 906 asserts the control signal 923 during the synchronization field 0 portion of the header field. When that occurs, the transmission rate detection section 902 uses the synchronization pulse signal 917 to latch in the synchronization pattern, and thereby detects the type of data transmission rate (i.e. 1600 bps, 3200 bps or 6400 bps) which will be applicable for the address field and subsequent data of that frame. That detection is based upon the type of synchronization pattern, as described hereinabove. The transmission rate detection section 902 then sets into the transmission rate register 909 the type of data transmission rate that has been detected, and outputs the control signal 919.

Next, the control section 906 asserts the control signal 924, during the part of the frame information field 401 portion of the header field. When that occurs, the received data storage section 903 uses the synchronization pulse signal 917 to latch the received data signal 916 during that frame information field 401 portion of the header field, and set the latched 32 bits of data into the received data registers 910, 911, 912 and 913. The received data storage section 903 then asserts the control signal 920. The control section 906 then sets the interrupt signal 121 from the high to the low level, as shown in diagram (b) of FIG. 8, to request execution of an interrupt processing routine which will be referred to in the following as the "Interrupt 0 processing". In this case, the interrupt processing consists of reading the contents of the received data registers 910, 911, 912 and 913. When the received data registers 910, 911, 912 and 913 are read, the received data storage section 903 negates the control signal 920. In addition, the control section 906 resets the interrupt signal 121 from the low to the high level. While this is occurring, the control section 906 changes over the control signal 922 from the high to the low level, at a point coinciding with the start of the synchronization field 1 portion of the header field of the frame. When this occurs, the bit synchronization section is subject to the value of the control signal 919, and executes synchronization operation at the data transmission rate which is appropriate for the address field and subsequent data of that frame. As a result, the bit synchronization section 900 then begins to output the received data of the address field and subsequent data of that frame, and the synchronization pulse signal 917, at the designated data transmission rate.

Next, the control section 906 asserts the control signal 924, during the address field and message field portions of the frame. The received data storage section 903 uses the synchronization pulse signal 917 to latch the received data signal 916. Thereafter, in the address field and message field of that frame, each time the received data storage section 903 has latched 32 bits of the message data, the received data storage section 903 sets the data into the received data registers 910, 911, 912 and 913, and then asserts the control signal 920. When this occurs, the control section 906 sets the interrupt signal 121 from the high to the low level, as shown in diagram (C) of FIG. 8, to request interrupt processing by the CPU 100. The interrupt processing which is thus executed consists a data transfer unit, i.e. the contents of the received data registers 910, 911, 912 and 913, being read out and transferred to the CPU 100. Thus with this embodiment, a data transfer unit consists of 4 bytes, i.e. 32 bits, with these bytes being transferred consecutively from the respective data registers 910, 911, 912 and 913. Each time this is completed, the received data storage section 903 negates the control signal 920, and the control section 906 resets the control signal 121 from the low to the high level.

In that way, the control logic section 103 supplies the data of a received frame, 32 bits at a time, to the CPU 100, by means of periodic executions of the Interrupt 0 processing by the CPU, until the end of the message (to be received by the paging receiver) contained in that frame is reached, as indicated by the activation frame number being again written into the activation frame number register 908.

When the final 4-byte set of data of the message are transferred to the CPU 100, the CPU 100 detects that fact, and then writes the activation frame number into the activation frame number register 908. When this occurs, the control section 906 negates the control signal 924, and changes the control signal 114 and control signal 922 from the low to the high level, while the frame number comparison section 901 negates the coincidence detection control signal 918. As a result, the control logic section 103 halts the supplying of received data to the CPU 100. That is to say, until the CPU 100 again sets the activation frame number time into the activation frame number register 908, the control logic section 103 repetitively issues interrupt processing requests and thereby supplies received data to the CPU 100.

In addition, after the coincidence detection control signal 918 is asserted as described above and the CPU 100 executes the Interrupt 0 process, the CPU 100 analyzes the frame information field 401 portion of the received data of this frame. If it is found that the frame number indicated by that frame information field 401 portion is different from the activation frame number which has been been allocated to this paging receiver, then it is judged that the count value attained by the frame counter 907 is in error. In that case, the frame number which is indicated by the frame information field 401 portion of the received data is set as the count value of the frame counter 907, and the CPU 100 again writes into the activation frame number register 908 the activation frame number, i.e. the aforementioned frame number which is assigned to this paging receiver and is held in the ESPROM 112. Furthermore, the control section 906 negates the control signal 924 and sets the control signal signals 114 and 922 to the high level, while the frame number comparison section 901 negates the control signal 918. As a result, the control logic section 103 halts the supply of received data to the CPU 100, and execution of the receiving process is terminated.

When a power ON/OFF operation is executed by using the power ON/OFF switch 110, or a "display recall" operation is executed by actuation of the function switch 111, the control logic section 103 changes the level of the interrupt signal 122 from the high to the low level, to thereby request execution of an interrupt processing routine by the CPU 100. In this routine, the CPU 100 reads the contents of the interrupt source register 914, then sets the states of respective status bits (as described hereinafter) in accordance with these contents. In the following, that interrupt processing routine will be referred to as the Interrupt I processing. The interrupt source register 914 is a register which holds the contents of processing which is to be executed by the CPU 100. Diagram (A) in FIG. 11 shows the respective significances of the bits which are held in the interrupt source register 914.

Bit 7 of the interrupt source register 914 corresponds to a "power ON" processing request, i.e. when that bit is set to the 1 state, this indicates that there has been a request for the "power ON" processing to be executed. Bit 5 of the interrupt source register 914 corresponds to a "display recall" processing request, i.e. when that bit is set to the 1 state, this indicates that there has been a request for the "display recall" processing to be executed. Bit 4 of the interrupt source register 914 corresponds to a "power OFF" processing request, i.e. when that bit is set to the 1 state, this indicates that there has been a request for the "power OFF" processing to be executed. Bit 3 of the interrupt source register 914 indicates the state of the power switch 110, i.e. when that bit is set to the 1 state, this indicates that the power switch is in the "power ON" status, while when that bit is in the 0 state, this this indicates that the power switch is in the "power OFF" status.

No significances are attached to the bits 6, 2, 1, and 0 of the interrupt source register 914, and these bits are held in the 0 state.

Diagram (B) in FIG. 11 shows the respective significances which are attached to the bits of a status byte, which is held in a region that is reserved in the RAM 106 when execution of the control program begins. Each time the CPU 100 executes Interrupt 1 processing, the bits 7, 5, 4 and 3 of the interrupt source register 914 are copied into bits 7, 5, 4 and 3 of the status byte. The status bit 7 is the "power ON" processing request bit, i.e. when that bit is in the 1 state, this shows that "power ON" processing has been requested through setting of bit 7 of the interrupt source register 914 to the 1 state. The status bit 6 is the "new message display"

processing request bit, i.e when that bit is in the 1 state, this shows that processing to display a newly received message has been requested. The status bit 5 is the "display recall" processing request bit, i.e. when that bit is in the 1 state, this shows that the "display recall" processing is being requested, through setting bit 5 of the interrupt source register 914 to the 1 state. Status bit 4 is the "power OFF" processing request bit, i.e. when that bit is in the 1 state, this shows that "power OFF" processing has been requested, through setting bit 4 of the interrupt source register 914 to the 1 state. The status bit 3 is the "power ON/OFF" condition indication bit, i.e. when that bit is in the 1 state, this shows that the power switch 110 has been actuated to the "power ON" condition (as indicated by bit 3 of the interrupt source register 914 being set to the 1 state), whereas when status bit 3 is in the 0 state, this shows that the power switch 110 has been actuated to the "power OFF" condition (as indicated by bit 3 of the interrupt source register 914 being set to the 0 state). Status bit 2 has no significance attached to it, and is left in the 0 state.

Status bit 1 is used as a current process indication bit, to indicate the process (i.e. main process or receiving process) which is currently being executed by the CPU 100. When the status bit 1 is in the 0 state, this indicates that the CPU 100 is currently executing the main process 1100, while when that bit is in the I state this indicates that the CPU 100 is currently executing the receiving process 1111.

The status bit 0 is a receiving process indication bit, i.e. when the status bit 0 is in the I state, this indicates that execution of the series of operations constituting the receiving process 1111 has been started and is not yet completed. In that condition, the status bit 0 remains in the 1 state until the sequence of receiving process operations has been completed. However as described hereinafter, the operation of the CPU 100 is periodically switched from executing the receiving process to executing the main process, each time it is detected that the system must wait until a complete set of 4 bytes is accumulated in the registers of the received data storage section 903 and is ready to be transferred to a receiving buffer formed in the RAM 102.

When the Interrupt 1 detection section 904 detects that a switch actuation has been performed which is to result in interrupt processing being executed by the CPU 100 (with that detection being based on a change in the level of the control signal 115 from the power switch 110, or the level of the control signal 116 from the function switch 1111, the Interrupt 1 detection section 904 sets the contents of the interrupt source register 914 appropriately, to indicate the processing which is being requested to the CPU 100, and asserts the control signal 921.

For example, in the case of a "power ON" operation being initiated by the power switch 110, the Interrupt 1 detection section 904 sets the bits 7 and 3 of the interrupt source register 914 to the 1 state, whereas if a "power OFF" operation is initiated, the 904 sets the bits 4 and 3 of the interrupt source register 914 to the 1 and 0 states respectively. If a "display recall" operation is initiated, by actuation of the function switch 111, the Interrupt 1 detection section 904 sets bit 5 of the, interrupt source register 914 to the 1 state. When it is detected that the power switch 110 is in the "power OFF" status, actuations of the function switch 111 become non-valid. That is to say, in the "power OFF" condition, even if a "display recall" operation is requested, by actuation of the function switch 111, bit 5 of the interrupt source register 914 will not be set to the 1 state.

When the control signal 921 is asserted, the control section 906 changes the interrupt signal 122 from the high to the low level, to thereby request Interrupt 1 processing by the CPU 100. The CPU 100 then reads the interrupt source register 914, whereupon the Interrupt 1 detection section 904 clears each of the bits 7 through 4 of the interrupt source register 914 to the 0 state, and negates the control signal 921. In addition, the control section 906 resets the interrupt signal 122 from the low to the high level. In that way, the control logic section 103 conveys the contents of interrupt processing (to be executed by the CPU 100) which are requested through switch actuations, by means of the Interrupt 1 processing.

Thus in this way, the control logic section 103 changes the interrupt signal 121 from the high to the low level to request Interrupt 0 processing by the CPU 100, and also changes the interrupt signal 122 from the high to low level, to request Interrupt 1 processing by the CPU 100. The control section 906 controls the timings of changes in level of the interrupt signal 121 and 122 from the high to low levels, such that there is an interval of at least 2.5 msec between each of these changes in level of the interrupt signals 121 and 122. In addition, the control section 906 assigns priority to the control signal 920, over the control signal 921. If the control signals 920 and 921 are asserted simultaneously, then the control section 906 first sets the interrupt signal 121 from the high to the low level, then after 2.5 msec, changes interrupt signal 122 from the high to the low level. This is illustrated by (d) in diagram (D) of FIG. 8. Thus, the CPU 100 executes interrupt processing in the sequence {Interrupt 0 processing, Interrupt 1 processing}, in response to interrupt processing requests from the control logic section 103. In that way, even if the sources of the Interrupt 0 processing and Interrupt 1 processing occur simultaneously, the control logic section 103 will first transfer 4 bytes of data of the received frame to the CPU 100, then will notify the CPU 100 the interrupt processing which is to be executed in response to the power switch or function switch actuation (i.e. as indicated by the contents of the interrupt source register 914).

Figure 10A:
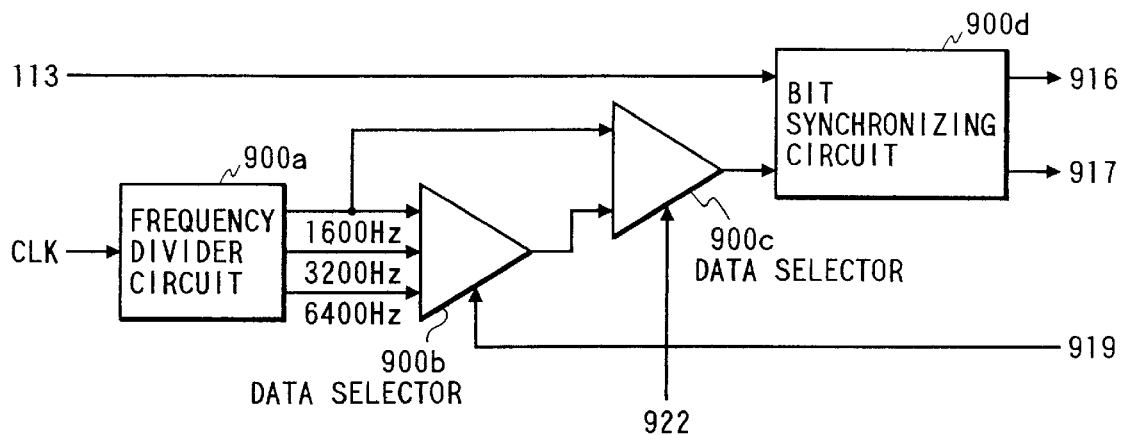
FIGS. 10A, 10B, 10C and 10D are block diagrams showing details of the internal configuration of a control section within the control logic section of FIG. 9.

FIG. 10A is a block circuit diagram showing the internal configuration of the bit synchronization section 900 of this embodiment, whereby the signals 916, 917 and 919 are generated. As shown, a frequency divider circuit 900a operates on a high-frequency clock signal, designated as CLK, to obtain three output clock signals, of frequencies 1600 Hz, 3200 Hz and 6400 Hz respectively. One of these is selected by a data selector 900b, under the control of the signal 919. The selected clock signal, or the 1600 Hz clock signal, is selected by a data selector 900c under the control of the signal 922. The clock signal thus selected is supplied to control the operation of a bit synchronizing circuit 900d, which operates on the signal 113 to obtain the output signal 916 (i.e. conveying the received digital data), together with the corresponding clock signal 917. Since ways of implementing such a bit synchronizing circuit and of deriving a suitable signal for use as the above-mentioned signal CLK are well known, detailed description will be omitted.

Figure 10B:
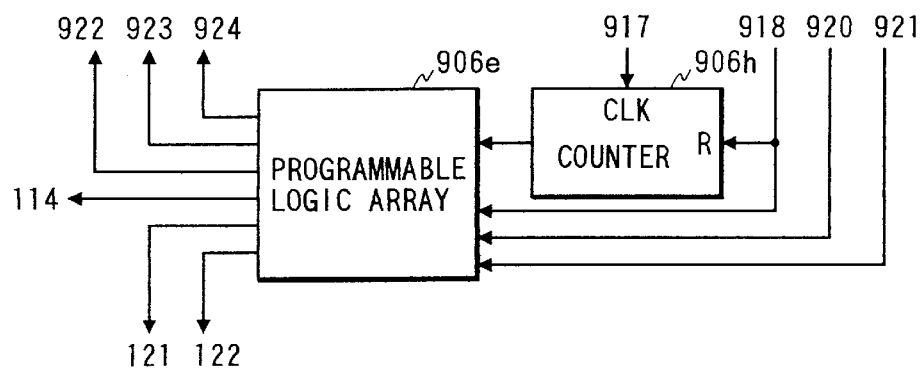
Figure 10C:
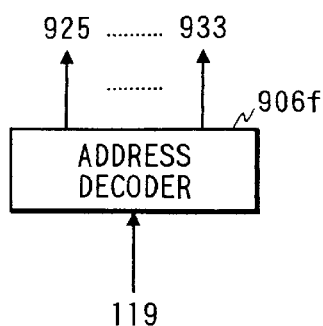
Figure 10D:
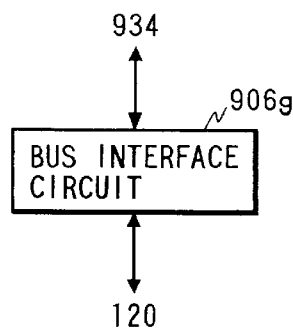

FIGS. 10B to 10D are respective block circuit diagrams showing the internal configuration of the control section 906 of this embodiment. FIG. 10B shows a programmable logic array 906e which has been configured to generate the respective signals 114, 121, 122, 922, 923 and 924 in response to combinations of the signals 918, 920 and 921 in conjunction with a count output signal which is produced by a counter circuit 906h. The counter circuit 906h counts pulses of the signal 917. The control signal 918 is applied as a reset signal to the counter circuit 906h, which is of edge-reset type, and is reset on each falling edge of a pulse of the control signal 918.

As shown in FIG. 10C, the set of signals 933 to 925 are generated by an address decoder 906f, in response to the signal 119. As shown in FIG. 10D, the bus 934 is connected by a bus interface circuit 906g to the bus 120.

The operation of the CPU 100 will now be described. The CPU 100 executes processing in accordance with a program which is stored in the ROM 101. The flow of this processing is shown in FIG. 12. The program consists of respective portions for executing a main process 1100, a receiving process 1111, the Interrupt 0 processing routine, and the Interrupt 1 processing routine. The term "process" as used herein signifies a program portion for which an individual stack region is reserved in the RAM 102 at the start of executing the control program, so that execution of the process can be interrupted by saving information necessary to continue execution of the process (in particular, the current value of the program counter of the CPU 100) in the stack region of that process, executing a specified routine, then reading out the counter value from that stack region and setting it as the program counter value for the CPU 100, to thereby return to execution of the process. In addition to the two stack regions which are respectively reserved for the main process and receiving process in RAM 102, two locations in RAM 102 are similarly reserved in RAM 102 for the respective stack pointers of the stacks of the main process and receiving process,. i.e. to hold the addresses of the respective tops of these stacks. A "process", in that sense, is thereby distinguished from a "routine".

In the main process 1100, processing is executed for servicing "power ON" and "power OFF" power switch actuations, displaying of newly arrived messages, and executing a display recall operation. The receiving process 1111 performs processing for verifying that the contents of the frame counter 907 are correct and for correcting these contents if necessary, and for executing protocol analysis, i.e. for successively storing received (interleaved) address data and message data in regions reserved in the RAM 102 as receiving buffers, for de-interleaving the data thus stored by reading out the receiving buffer contents in a predetermined sequence, and for executing error correction processing of the de-interleaved data.

Figure 12A:
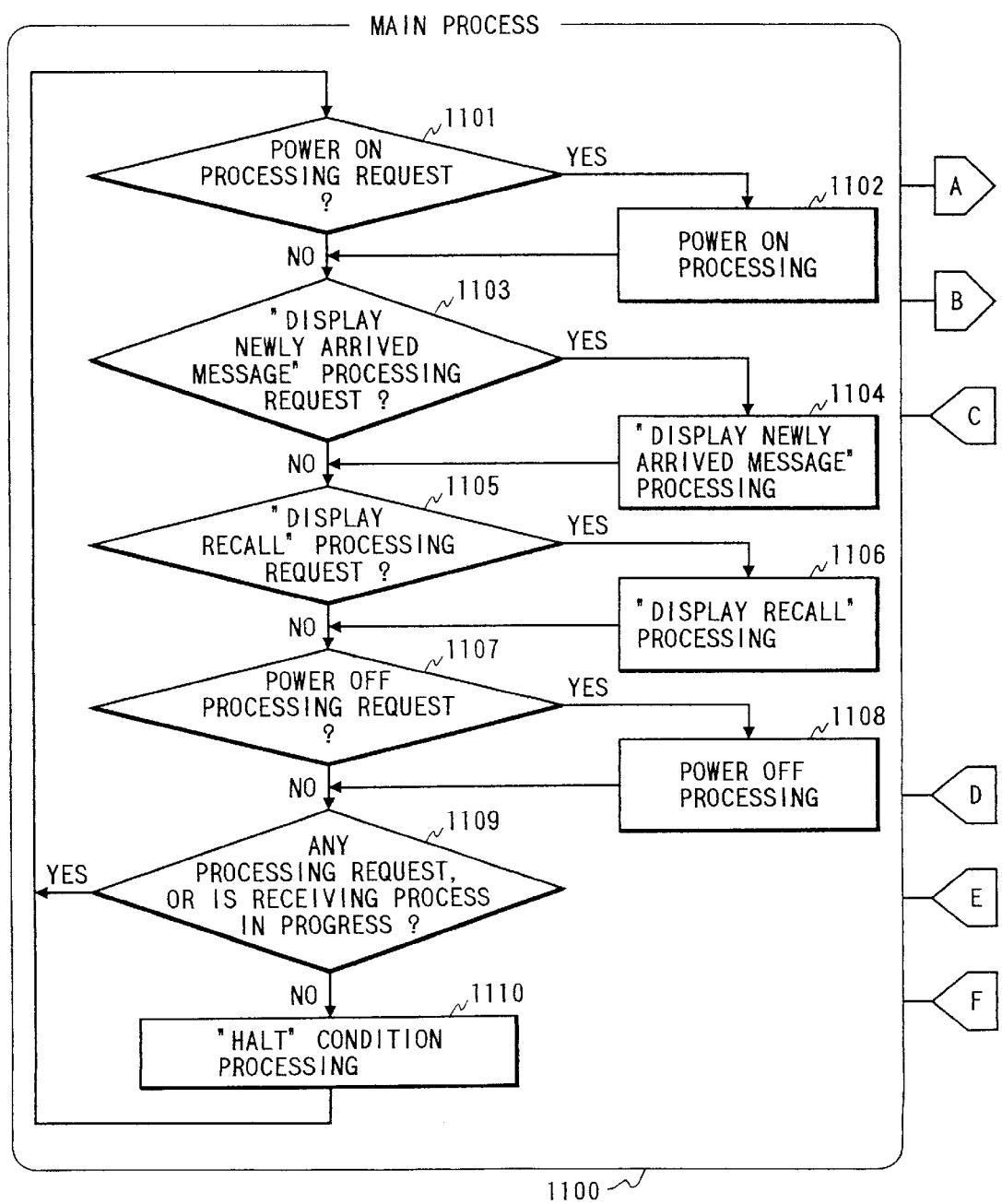
FIGS. 12A and 12B constitute a flow diagram showing the basic operating flow of a main process and a receiving process which are each executed by a CPU of the preferred embodiment.

The contents of the main process 1100, as shown in FIG. 12A, are as follows. Each of the decision steps 1101, 1103, 1105, 1109 of the main process 1100 is executed based on the states of respective bits of the status byte, described hereinabove.

First, in step 1101 a decision is made as to whether a "power ON" processing request has been issued. If that request has not been issued, then operation advances to step 1103, while if such a request has been issued, step 1102 is executed to implement the "power ON" processing, then operation advances to step 1103. In step 1103, a decision is made as to whether a request has been issued for display processing of a newly arrived message. If such a request has not been issued, then operation advances to step 1105, while if such a request has been issued, then display processing of a newly arrived message is executed as step 1104, and operation advances to step 1105.

In step 1105, a decision is made as to whether a "display recall" processing request has been issued. If that request has not been issued, then operation advances to step 1107, while if such a request has been issued, step 1106 is executed to implement "display recall" processing, and operation advances to step 1107.

In step 1107, a decision is made as to whether a "power OFF" processing request has been issued. If that request has not been issued, then operation advances to step 1109, while if such a request has been issued, step 1108 is executed to implement "power OFF" processing, and operation advances to step 1109.

In step 1109, a decision is made as to whether a request for Interrupt 1 processing has been generated, (i.e. constituting a request for "power ON" processing, for display processing of a newly arrived message, for display recall processing, or for power OFF processing), has been issued and has not yet been serviced, or the receiving process has been started but is temporarily interrupted (while waiting to receive new data, as described hereinafter). If the decision is "no", then operation advances to step 1110, while if the decision is "yes", then operation returns to step 1101, and the sequence of steps 1101 to 1109 is again executed.

In step 1110 processing is executed whereby the CPU 100 enters the "halt" mode. In the "halt" mode, the CPU 100 halts program execution until the interrupt signal 121 changes from the high to the low level, thereby indicating that Interrupt 0 processing 1117 has been requested, or the interrupt signal 122 changes from the high to the low level, indicating that the Interrupt 1 processing 1118 has been requested.

During execution of the main process, i.e. during the sequence of steps 1101 to 1109 or in the "halt" mode step 1110, if a request for Interrupt 0 processing 1117 occurs, then the address of the next instruction to be executed is stored on the stack of the main process, and the Interrupt 0 processing routine is then executed, whereby the four bytes which are held at that time in the registers 910 to 913 of the received data storage section 903 are transferred to the RAM 102 and written into a region reserved therein (as described hereinafter). At that time, a decision is made as to the state of the status bit 0. If that bit is in the 0 state at that time, then this signifies that the receiving process is to be started, i.e. that the four bytes which have been transferred to the RAM 102 constitute the contents of the frame information field 401 (shown in FIG. 4 above) of a frame containing a message which is addressed to this paging receiver. In that case, initialization processing of the receiving process is started. However if the status bit 0 is in the 1 state when the Interrupt 0 request is received by CPU 100, then this indicates that execution of the receiving process has already been started, and that operation had been temporarily switched to the main process while waiting to accumulate a new set of 4 bytes in the registers of the received data storage section 103, i.e. data which are to be transferred to a receiving buffer. In that case, the Interrupt 0 processing routine is executed as described above, then the instruction address value held on the stack of the receiving process is fetched and set in the program counter of CPU 100, and execution of the receiving process is resumed.

The Interrupt 1 processing 1118 is executed to service a request for "power ON" processing, for "display recall" processing, or for "power OFF" processing, i.e. to service any switch actuation, which is indicated by the corresponding one of the bits of the interrupt source register 914 having been set to the 1 state. To initiate the Interrupt 1 processing 1118, the control logic section 103 asserts the interrupt signal 122 by changing that signal from the high to the low level, thereby requesting Interrupt 1 processing by the CPU 100. If the CPU 100 is executing the main process at that time (i.e. the status bit 1 is in the 0 state), then when the interrupt signal 122 is asserted, the CPU 100 stores the value of its program counter on the stack of the main process, then executes the Interrupt 1 processing, and on completion of this, restores that program counter from the main process stack to the program counter of the CPU, and restarts the main process (starting from step 1101 of the main process, shown in the flow diagram of FIG. 12A, as described hereinabove). If the CPU 100 is executing the receiving process (i.e. the status bit 1 is in the 1 state) when the interrupt signal 122 is asserted, then the CPU 100 stores the value of its program counter on the receiving process stack, executes the Interrupt 1 processing, then restores the value held in the receiving process stack to the program counter of the CPU, and restarts the receiving process.

Figure 13:
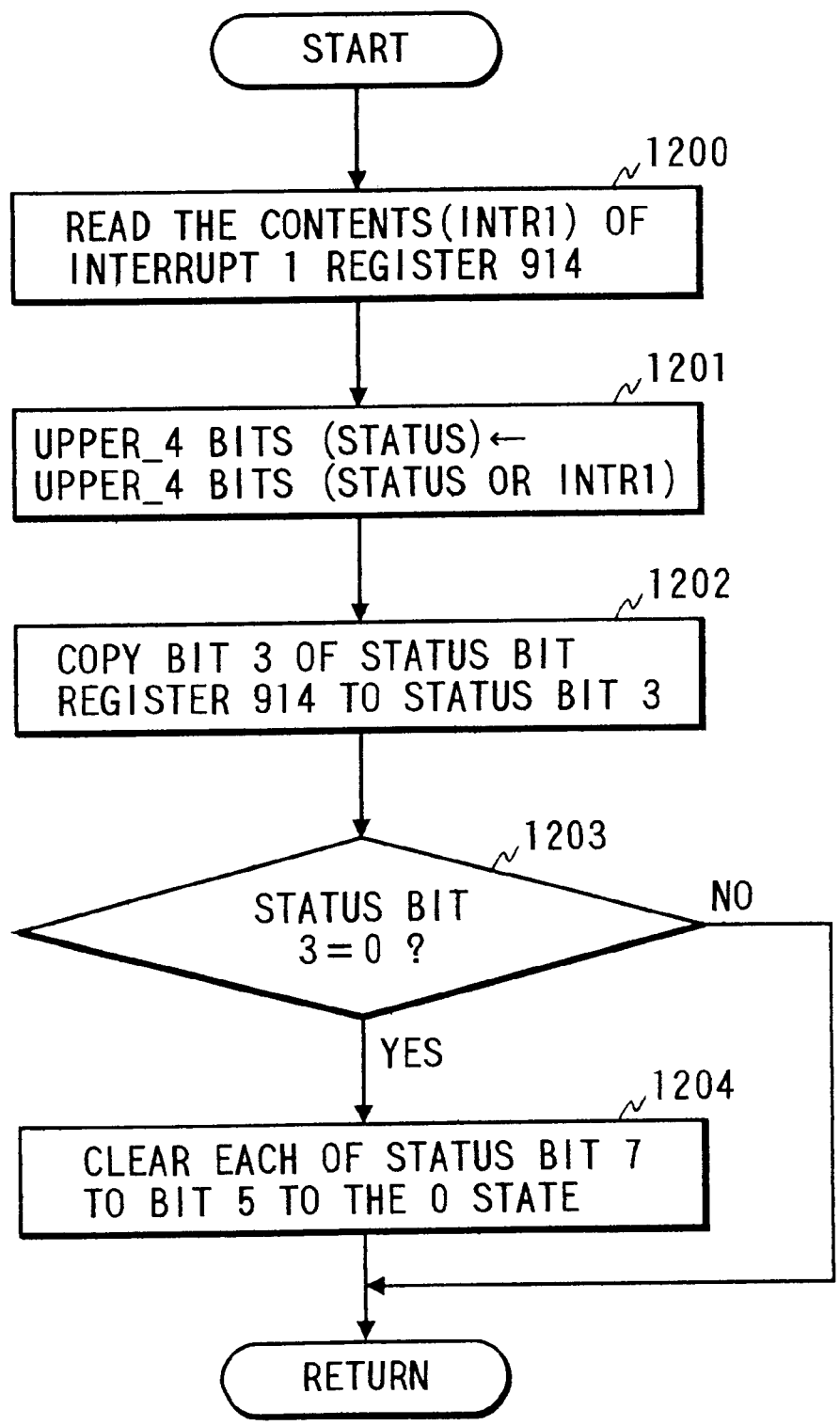
FIG. 13 is a flow diagram showing the operating sequence of Interrupt 1 processing which is executed by the CPU of the preferred embodiment.

The sequence of the Interrupt 1 processing is shown in the flow diagram of FIG. 13.

First, in step 1200, the state of the interrupt source register 914 within the control logic section 103 is read. In step 1201, the logic OR product of the value which is read from the interrupt source register 914 and the value of status (i.e. as represented by the aforementioned set of status bits) is obtained, and the most significant four bits of the result (i.e. bit 7 to bit 4) are then stored as the high-order status bits, bit 7 to bit 4. Next, in step 1202, the value of bit 3 of the value held in the interrupt source register 914 (whose contents have been read out as described above) is set as the value of status bit 3. In step 1203, the condition of the status bit 3 is judged. If the result is 0, i.e. the "power OFF" condition is found, then operation advances to step 1204, in which the status bits 7 to 5 are each reset to the 0 state. The CPU 100 then executes a return command, to return from the Interrupt 1 processing, and restart the main process or receiving process. That is, the instruction address stored in the stack of the main process (or the receiving process) is fetched and set on the program counter of the CPU 100, and execution of the main process (or the receiving process) is then resumed.

In that way, if Interrupt 1 processing is requested as a result of a function switch actuation while the CPU 100 is executing the receiving process, then the CPU 100 stores the address of the next program instruction that is to be executed, on the receiving process stack, executes steps 1200 to 1204 of the Interrupt 1 processing described above to thereby set the appropriate one of the status bits in accordance with the function switch actuation, then fetches the stored instruction value from the receiving process stack, sets that on the program counter of CPU 100, and resumes the receiving process.

For example, when the power switch 110 is actuated to the ON state, then the control logic section 103 sets the bits 7 and 3 of the interrupt source register 914 to the 1 state, and changes the interrupt signal 122 from the high to the low level. When that occurs, the CPU 100 executes the Interrupt 1 processing 1118 shown in FIG. 12, and as a result, the status bits 7 and 3 are each set to the 1 state.

If on the other hand the power switch 110 is actuated to the OFF state, then the control logic section 103 sets bits 4 and 3 of the interrupt source register 914 to the 1 and 0 states respectively, and changes the interrupt signal 122 from the high to the low level. When that occurs, the CPU 100 executes the Interrupt 1 processing 1118, and as a result, the status bits 4 and 3 are set to the 1 and 0 states respectively, while in addition the status bits 7 to 5 are each reset to the 0 state.

If "display recall" operation is requested, by actuation of the function switch 111, while the receiver is in the "power ON" condition, then the control logic section 103 sets the bit 5 of the interrupt source register 914 to the 1 state and changes the interrupt signal 122 from the high to the low level. When that occurs, the CPU 100 executes the Interrupt 1 processing 1118, sets the status bit 5 to the 1 state, and sets the status bit 3 to the same state as that of bit 3 of the interrupt source register 914. If at that time the status bit 3 is 0 (i.e. which will be the condition if the power switch 110 has been actuated to the OFF condition after execution of the "display recall" operation but before the CPU 100 executes the Interrupt 1 processing) then the CPU 100 clears each of the status bits 7 to 5 to the 0 state.

Specific contents for the "power ON" processing 1102, the "newly arrived message display" processing 1104, the "display recall" processing 1106 the "power OFF" processing 1108 will each be described in the following.

In the "power ON" processing 1102, firstly the status bit 7 (indicative of a "power ON" processing request) is cleared to the 0 state. Next, the frame number N and the address A which have been allocated to this paging receiver are read out from the EEPROM 112, and are respectively set into the frame number storage region and the address storage region which have been reserved in the RAM 102. In addition, the frame number N is set into the activation frame number register 908 of the control logic section 103.

With the "newly arrived message display" processing 1104, firstly the status bit 6 (used to indicate a request to display a newly arrived message) is reset to 0. Next, the newly arrived message, which has been stored in the message region reserved in the RAM 102, is output to the LCD driver 106, as a display signal 123. The LCD driver 106 thereby sends a corresponding display signal 124 to the LCD 107, to produce display of the message by the LCD 107. Next, the alarm register 915 of the control logic section 103 is accessed, causing signals to be generated whereby the loudspeaker 108 produces an audible indication and the LED 109 is caused to flash on and off, to thereby indicate to the user that a message has been received.

The "display recall" processing is as follows. First, the status bit 5 (which indicates a "display recall" processing request) is reset to 0. The data constituting the message, stored in the message region of the RAM 102, are then output to the LCD driver 106 as display signal 123. The LCD driver 106 thereby sends a corresponding display signal 124 to the LCD 107, to produce display of the message by the LCD 107.

The "power OFF" processing 1108 is as follows. First, if the status bit 0 (which is used to indicate that the receiving process is currently being executed) has the value 1, then the activation frame number is set into the activation frame number register 908 of the control logic section 103. In addition, the current address (i.e. expressed by the stack pointer) of the top of the receiving process stack is set into the receiving process stack pointer region which is reserved in the RAM 102, and the status bit 0 is cleared to 0. Next, the status bit 4 (used to indicate a "power OFF" processing request) is reset to 0, and the contents which are being displayed by the LCD 107 are deleted. The alarm register 915 of the control logic section 103 is accessed, to inactivate each of the loudspeaker 108 and the LCD 107. The value of the status bit 3 (used to indicate the "power ON/OFF" status) is then checked, and if status bit 3 is in the 0 state, indicating the "power OFF" status, then all of the status bits are cleared to the 0 state, whereas if status bit 3 is in the 1 state, then status bit 7 (used for "power ON" processing request indication) is set to 1.

The receiving process 1111 is as follows. First, in step 1112, receiving process initialization processing is executed, to initialize the variables which will be used in executing the receiving process. Next, in step 1113, header field analysis processing is executed, to perform activation frame number verification, and to set the interleaving factor. If the number of the activated frame is correct (i.e. the received frame number is identical to the activation frame number), then operation advances to step 1114, while if incorrect, then operation advances to step 1116.

In step 1114, address field analysis processing is executed, to compare the addresses contained in the address field with the address of this paging receiver. When address coincidence is detected, operation goes to step 1115, and if not detected, operation advances to step 1116.

In step 1115, message field analysis processing is executed, to store (in a region which has been reserved in the RAM 102 as a message region) that part of the message field data which corresponds to the address for which coincidence was obtained. Next, in step 1116, the frame number of the frame which will be activated next is set into a register in the control logic section 103, and receiving process termination processing is executed, to thereby end the receiving process operations. Operation then returns to the main process.

Figure 14:
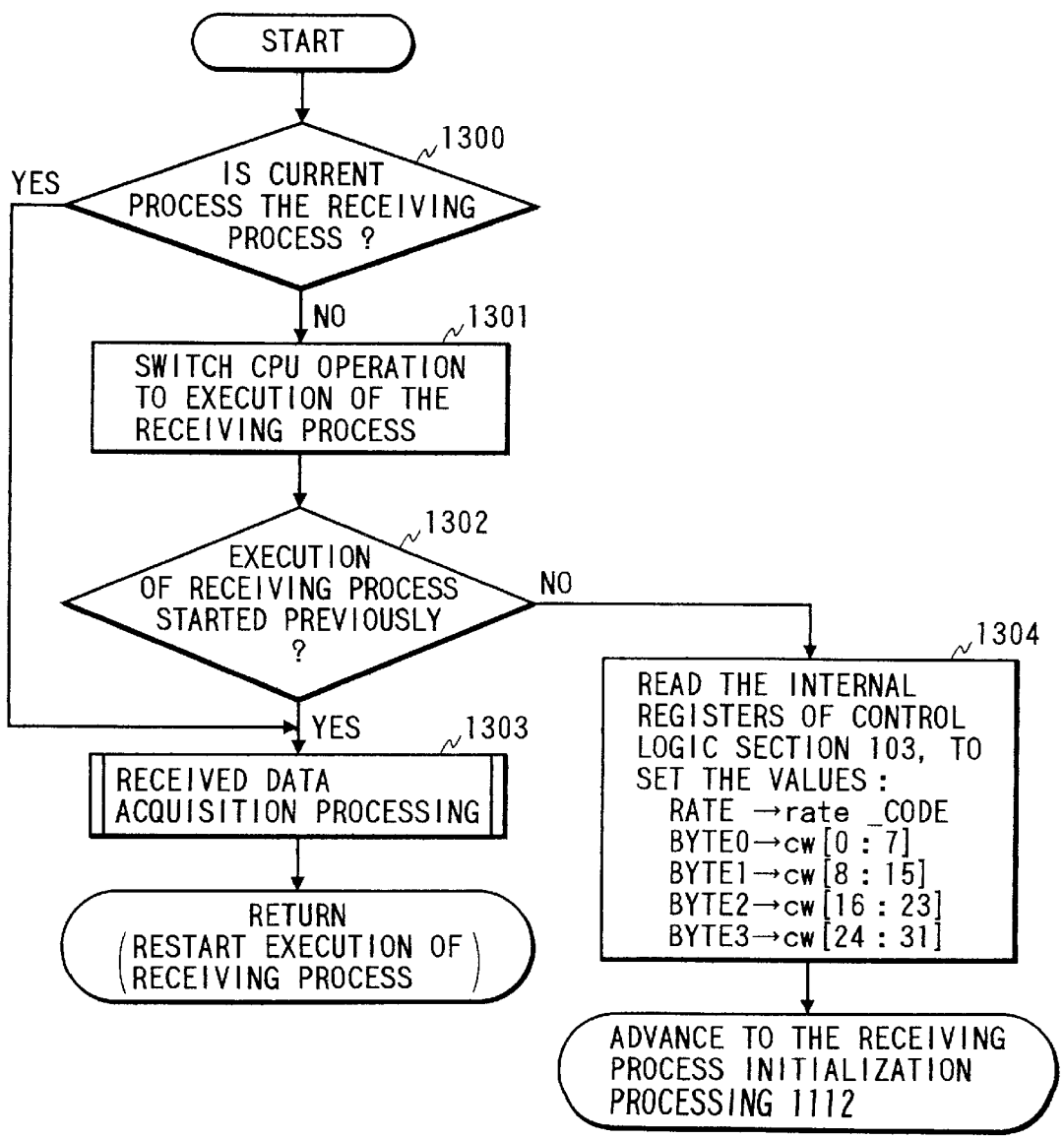
FIG. 14 is a flow diagram showing the operating sequence of Interrupt 0 processing which is executed by the CPU of the preferred embodiment.

A changeover from the main process 1100 to the receiving process 1111 is performed by means of the Interrupt 0 processing 1117. To do this, the control logic section 103 sends to the CPU 100 a request for Interrupt 0 processing. If the CPU 100 is executing the main process when such an Interrupt 0 request is received, the CPU 100 stores the value of its program counter on the main process stack, then begins to execute the Interrupt 0 processing 1117. Similarly, if the CPU 100 is executing the receiving process when an Interrupt 0 processing is received, it stores the current value of the program counter on the receiving process stack, then starts to execute the Interrupt 0 processing 1117. The operation flow of the Interrupt 0 processing is as shown in FIG. 14.

First, in step 1300, the value of the status bit 1 (which indicates the current process status) is checked, to judge whether or not the current process is the receiving process. If it is found that the current process is the receiving process (i.e. the status bit 1 is in the 1 state), then operation advances to step 1303, to execute the received data acquisition processing, while if it is found that the main process is currently being executed (i.e. the status bit 1 is in the 0 state) then operation advances to step 1301. In step 1301, the address that is held as the stack pointer at that time is copied into the location in the RAM 102 which has been reserved for the stack pointer of the main process, while the address which is being held in the location reserved for the stack pointer of the receiving process is read out and set as the stack pointer for CPU 100. In addition, the status bit 1 is set to the 1 state, and operation then switches to execution of the receiving process. Next, in step 1302, the condition of status bit 0 (the receiving process execution indication bit) is checked, to determine whether or not execution of the receiving process is actually in progress at that time. If the receiving process is actually being executed at that time (i.e. status bit 0 is 1), then operation advances to step 1303, in which received data acquisition processing is executed. Conversely, if the status bit 0 is found to be 0, indicating that execution of the receiving process is not currently in progress, then operation advances to step 1304, and thereafter, operation advances to the receiving process initialization processing step 1112. The reason for advancing to step 1304 in accordance with the judgement made in step 1302 is as follows. Advancement to the step 1304 occurs in the case of the first execution of the Interrupt 0 processing for a frame, i.e. the Interrupt 0 processing which is executed when the frame information field 401 is received, as indicated by designation (b) in FIG. B. In step 1304, the contents of the transmission rate register (RATE) 909 of the control logic section 103 are read out and stored, as a byte rate__ code, in a region which has been reserved in the RAM 102 for that purpose. The contents of the received data registers 910, 911, 912 and 913 are then read out, and these contents are respectively stored in regions of the RAM 102 which have been reserved for that purpose, as respective bytes which will be designated in the following as cw[0:7], cw[8:15], cw[16:23], and cw[24:31]. At that time, the code which is stored as rate__code indicates the type of transmission rate (i.e. with this embodiment, one of three possible types of data transmission rates, as described above), while the frame information field portion 401 of the received data is stored as byte cw[0:31].

In step 1303 (received data acquisition processing), 32 bits of received data of the address field, or 32 bits of received data data of the message field, after being temporarily set into the received data storage section 903 of the control logic section 103, are read out and stored in receiving buffers which are defined in a region of the RAM 102 that is reserved for that purpose. The received data acquisition processing 1303 will be described in greater detail hereinafter. After completion of the received data acquisition processing, the CPU 100 executes a return command, to return from the interrupt processing. At that time, the value which is held at the top of the receiving process stack is set into the program counter, and the CPU 100 restarts execution of the receiving process program.

The switch from the receiving process 1111 to the main process 1100 is executed by the receiving process termination processing 1116. There are cases in which operation may shift from the receiving process to the main process while execution of the address field analysis processing 1114 is in progress, or while execution of the message field analysis processing 1115 is in progress. The operations which occur in such a case will be described in detail hereinafter.

In the following, the receiving process initialization processing 1112 of the receiving process 1111, the header file analysis processing 1115, the address field initialization processing 1114, message field analysis processing 1115, and the receiving process termination processing 1116, will each be described in detail.

The receiving process initialization processing 1112 will first be described. In this processing, the variables which will be used in the receiving process program are initialized. FIG. 15 is a flow diagram of this initialization processing.

In step 1400, the status bit 0 (receiving process indication bit) is set to 1, to indicate that execution of the receiving process is currently in progress. Next, in step 1401, the value of the variable k, which is held in a region reserved in the RAM 102, is initialized to 0. The variable k is an integer, not less than zero, which expresses the word number of the next code word which is required in the receiving process. In step 1402, the variable bn, which is held in a region reserved in the RAM 102, is initialized to 0. The variable bn is an integer, not less than zero, which expresses the interleaving block number of the data which are stored in the current receiving buffer. In step 1404 the variable wp, which expresses the value of the receiving buffer write pointer, is initialized to buf0 (where buf0 the address of the top byte of receiving buffer 0). In step 1405, the variable buf__bottom which expresses the address of the base byte of the receiving buffer, is set to buf0+127. This ends the receiving process initialization processing.

As mentioned above, the receiving buffers are regions which are reserved in the RAM 102, for temporarily storing received data during received data acquisition processing 1303. Data are written into these buffers by execution of the Interrupt 0 processing 1117. There are two of these buffers, referred to in the following as receiving buffer 0 and receiving buffer 1. The respective byte addresses of the receiving buffer 0 and receiving buffer 1 in the RAM 102 are shown in diagrams (A) and (B) of FIG. 16. The receiving buffer 0 is a continuously extending region, made up of 128 bytes, having addresses which extend from buf0 to buf0+127. The receiving buffer 1 is a continuously extending region, made up of 128 bytes, having addresses which extend from buf1 to buf1+127. In the receiving process initialization processing 1112, the receiving buffer 0 is established first.

Figure 17:
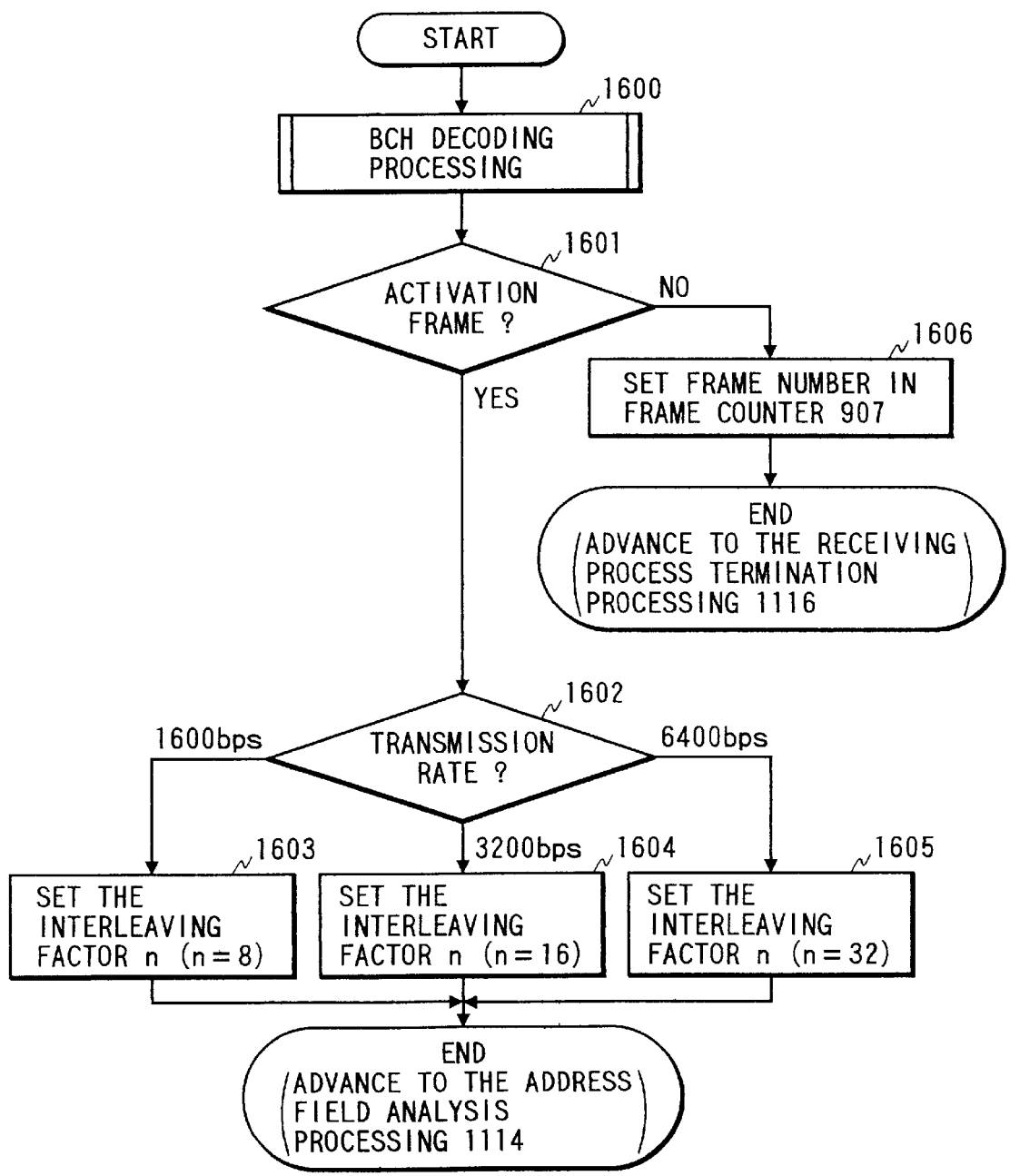
FIG. 17 is a flow diagram showing the operating sequence of header field analysis processing, executed by the CPU of the preferred embodiment.

The header field analysis processing 1113 is executed as follows. In this processing, frame number verification is performed, and the value of the variable n (which expresses the interleaving factor) is set. The variable n is a 1-byte value which is stored in a location reserved in the RAM 102. FIG. 17 is a flow diagram of the header field analysis processing 1113.

In this processing, in the first step 1600, BCH decoding processing is executed for the frame information field 401 portion of the received data, which has been stored in cw[0;31]. The procedure for BCH decoding processing will be described in detail hereinafter. Next, in step 1601, the frame number contained in the decoded frame information field 401 is compared with the frame number which has been set into the activation frame number register 908, to thereby judge if the frame which is currently being received is an activation frame. If it is found to be an activation frame, then operation advances to step 1602, otherwise, operation advances to step 1606.

In step 1606, since it has been found that the count value of the frame counter 907 of the control logic section 103 is incorrect, the frame number contained in the frame data field 401 is set as the count value of the frame counter 907. This completes the header field analysis processing, and operation advances to the receiving process termination processing 1116.

In step 1602, the value which has been stored as rate\_code is judged, and if it is found that the data transmission rate is 1600 bps then operation advances to step 1603, while if it is found that the data transmission rate is 3200 bps then operation advances to step 1604, and if it is found that the data transmission rate is 6400 bps then operation advances to step 1605. In steps 1603, 1604, 1605, the value of the variable n (which expresses the interleaving factor) is set to 8, 16 or 32, respectively. This ends the the header field analysis processing, and operation advances to the address field analysis processing 1114.

Before describing the address field analysis processing 1114, the received data acquisition processing 1303 in the Interrupt 0 processing 1117 will be described.

Since the address field and message field portions of a frame are transmitted as interleaved code word data, it is necessary to first de-interleave the received data. With this embodiment of the present invention, the received data are stored as interleaved block units in the receiving buffers, in a form which facilitates de-interleaving. In the address field analysis processing 1114 and in the message field analysis processing 1116, only the de-interleaved data which are actually required are subjected to BCH code decoding processing. That is a basic feature of the present invention, which can be understood by the following example. Referring to the address field of FIG. 6, and considering for example the code words designated as word 1 and word 2 of the address field, and assuming that the local paging receiver is "paging receiver A", a point in the de-interleaving processing of the address field will occur at which the de-interleaved data of word 1 will be obtained and BCH-decoded, and will then be verified as being the address of the local paging receiver. In that case, this indicates that the de-interleaved data BCH-decoded data of word 2 specify the position of the message data which are addressed to that paging receiver. BCH decoding processing is then halted, when these data of word 2 have been obtained. Thus, only the minimum necessary amount of BCH decoding processing is executed, to obtain the position information for the message data that are addressed to the local paging receiver.

Similarly, considering the message field shown in FIG. 6, if for example the aforementioned position information specifies that the message data addressed to the local paging receiver begin with word 1 of the message field (ie. word $(k_{Ms}+1)$, and that the number of words of the message data is 2, de-interleaving is applied to the successive bits of the message field data until it is found that word 1 of the message field has been reached. When that occurs, the BCH decoding processing is applied to that word, and also word 2, to thereby obtain the desired message data, and the BCH decoding processing is then ended. Thus in this case, BCH code decoding processing is applied only to that part of the received interleaved data stream which contains the desired message.

Figure 18:
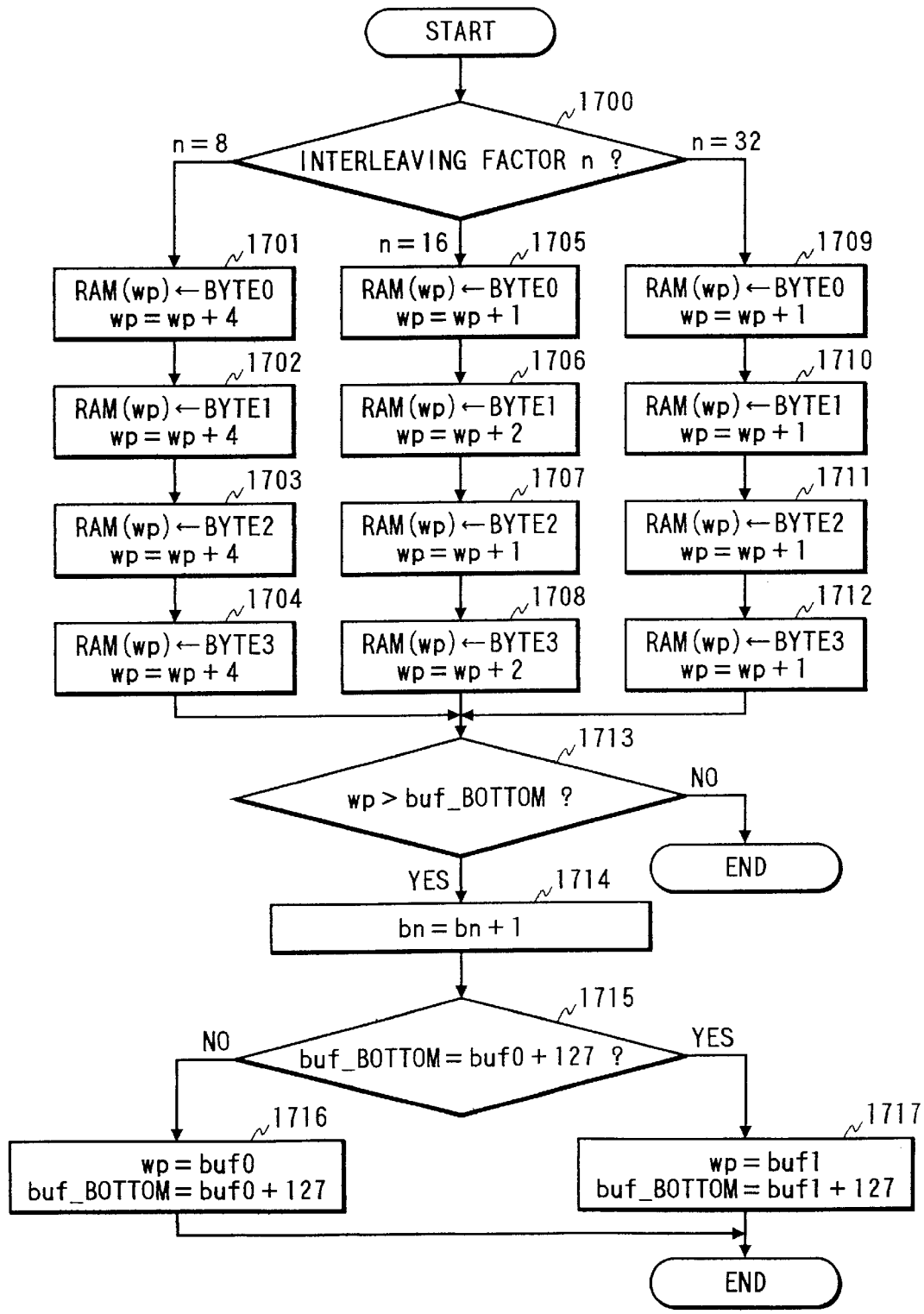
FIG. 18 is a flow diagram showing the operating sequence of received data acquisition processing, executed by the CPU of the preferred embodiment.

In the received data acquisition processing 1303, operations are performed for storing the data which are being received at that time, in the receiving buffers. Each time that the received data acquisition processing 1303 in the Interrupt 0 processing 1117 is executed, 32 bits (i.e. 4 successive bytes) of received data are supplied from the control logic section 103 and stored in a receiving buffer. During the received data acquisition processing 1303, the CPU 100 stores the data of even-numbered ones of the interleaved blocks (i.e. numbers 0, 2, 4, 6, 8, 10) in receiving buffer 0, and stores the odd-numbered blocks (i.e. numbers 1, 3, 5, 7, 9) in receiving buffer 1. FIG. 18 is a flow diagram of the received data acquisition processing 1303.

The processing is as follows. First, in step 1700, the value of the variable n (which expresses the interleaving factor) is judged. If it is found that n is 8, then operation advances to step 1701, while if n is found to be 16 then operation advances to step 1705, and if n is found to be 32 then operation advances to step 1709.

If it is found that the interleaving factor is 8, then the sequence of steps 1701 to 1704 is executed, whereby 32 bits of received data are stored in the receiving buffers. In step 1701, the control logic section 103 copies the byte value held in the received data register 910 of the control logic section 103 (i.e. byte 0) into a byte (in a receiving buffer) which is designated by the write pointer wp, then adds 4 to the value of wp, and advances to step 1702. In step 1702, the value held in the received data register 911 (i.e. byte 1) is copied into the byte which is designated by the pointer wp, and wp is again incremented by 4, then operation advances to step 1703. The value held in the received data register 912 (i.e. byte 2) is then copied into the byte which is designated by the pointer wp, and wp is again incremented by 4, whereupon operation advances to step 1704. The value held in the received data register 913 (i.e. byte 3) is then copied into the byte which is designated by the pointer wp, wp is incremented by 4, and operation advances to step 1713.

If the interleaving factor is found to be 16, then the 32 bits of received data are stored in the receiving buffers in the sequence of steps 1705 to 1708. In step 1705, the value which is held in the received data register 910 is copied into the byte that is designated by the pointer wp, then wp is incremented by 1, and operation advances to step 1706. In step 1706, the value held in received data register 911 is copied into the byte that is designated by the pointer wp, then wp is incremented by 2, and operation advances to step 1707. In step 1707, the value held in received data register 912 (i.e. byte 2)is copied into the byte that is designated by the pointer wp, then wp is incremented by 1, and operation advances to step 1708. In step 1708, the value held in received data register 913 (i.e. byte 3) is copied into the byte that is designated by the pointer wp, then wp is incremented by 2, and operation advances to step 1713.

If the interleaving factor is 32, then the 32 bytes of received data are stored in the receiving buffers in the sequence of steps 1709 to 1712. In step 1709, the value which is held in the received data register 910 is copied into the byte that is designated by the pointer wp, then wp is incremented by 1, and operation advances to step 1710. In step 1710, the value held in received data register 911 is copied into the byte that is designated by the pointer wp, then wp is incremented by 1, and operation advances to step 1711. In step 1711, the value held in received data register 912 is copied into the byte that is designated by the pointer wp, then wp is incremented by 1, and operation advances to step 1712. In step 1712, the value held in received data register 913 is copied into the byte that is designated by the pointer wp, then wp is incremented by 1, and operation advances to step 1713.

Next, in step 1713 a decision is made as to whether one complete interleaved block of data has been stored in the receiving buffers. If the value of the pointer wp is greater than buf_bottom, then it is judged that one complete interleaved block of data has been stored whereupon operation advances to step 1714. However if it is judged that storing of one block of data is still in progress, then processing is ended, in that condition.

In the sequence of steps 1714 to 1717, the values of the variables bn, wp, and buf_bottom are respectively again set, and operation changes over to storing the received data in the other one of the receiving buffers. First, in step 1714, the block number bn is incremented by 1. Next, in step 1715 a judgement is made as to the next receiving buffer into which data will be stored. If it is found that buf_bottom is equal to buf0+127, then since this indicates that the receiving buffer 1 is to be used next, operation advances to step 1717. In step 1717, buf1 is set as the value of the pointer wp, while buf1+127 is set as the value of buf_bottom, and the received data acquisition processing then ends. If it is found that buf_bottom is not equal to buf0+127, then since this indicates that the receiving buffer 0 will be used next, operation advances to step 1716 in which buf0 is set as the value of the pointer wp, and buf0+127 is set as the value of buf_bottom. The received data acquisition processing then ends.

Figure 19:
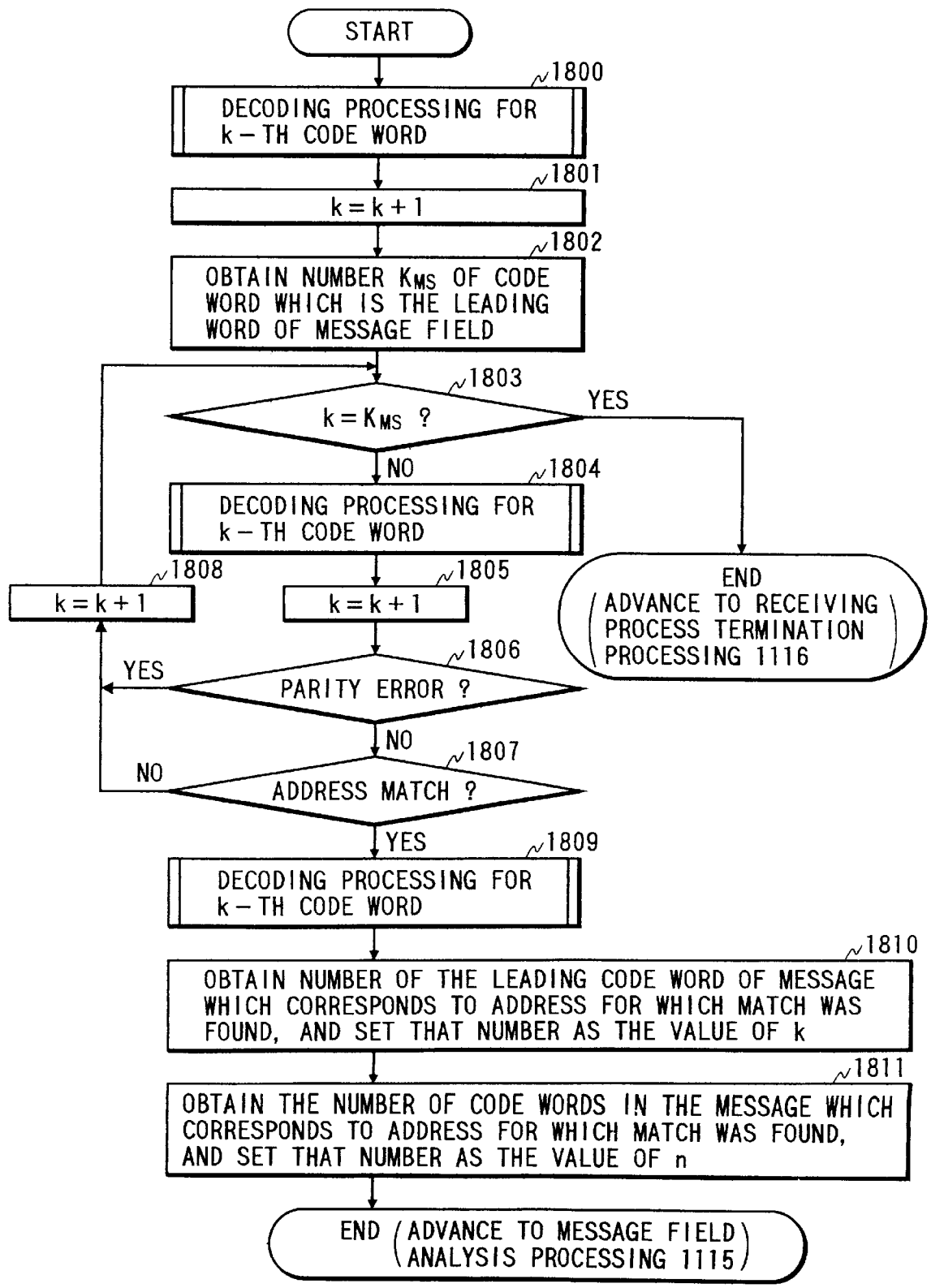
FIG. 19. is a flow diagram showing the operating sequence of address field analysis processing, executed by the CPU of the preferred embodiment.

The address field analysis processing 1114 will now be described. In this processing, the address which is expressed in the address field of a received frame is checked against the local address, i.e. the address A which has been assigned to this paging receiver. The address field analysis processing 1114 is shown in the flow diagram of FIG. 19.

First, in step 1800, decoding processing for the k-th code word is executed, In this processing, de-interleaving of the k-th code word is performed, and BCH decoding is executed. The decoding processing for the k-th code word is performed by exactly the same sequence of operations within each of the steps 1800, 1804, and 1809 of FIG. 19, and in the step 2400 of decoding processing for the k-th code word (shown in the flow diagram of FIG. 25). However in step 1800 of FIG. 19, since k=0, decoding of the 0-th code word (which is the leading code word of the address field) is performed. The decoding procedure for the k-th code word will be described in detail hereinafter.

In step 1801, k is incremented by 1, and in step 1802, the word number $K_{MS}$ (illustrated in FIG. 6) is obtained from the 0-th code word, as the number of the leading code word of the message field. Next, in step 1803, a decision is made as to whether the address field analysis processing 1114 has ended. If it is found that k is not equal to $K_{MS}$ then it is judged that address verification is in progress, and operation advances to step 1804. If it is found that k=$K_{MS}$ then it is judged that the address field does not contain an address which matches the local address A, and so the address field analysis processing is ended and operation advances to the receiving process termination processing 1116.

In step 1804, processing for decoding the k-th code word is executed. In step 1805, k is incremented by 1, and operation advances to step 1806. In step 1806, parity checking is performed for the code word which has been decoded in step 1804. If an error is found, then operation advances to step 1806, while if no error is found, operation advances to step 1807, in which address verification is performed. If it is found in step 1807 as a result of address verification that the received address matches the local address, then operation advances to step 1809, while if address matching is not found, operation advances to step 1808. In step 1808, k is incremented by 1, then operation advances to step 1803. The sequence of steps 1803 to 1808 is executed repetitively until it is found that the address contained in the address field matches the local address, or until the value of k becomes identical to $K_{MS}$. If an error is detected in the parity check step 1806, then there is a high probability that there is an error within the code word which has been decoded in step 1804. If address verification is executed in step 1807 using an address which contains an error, then this will result in erroneous reception operation. For that reason, with this embodiment, if an error is detected then address verification is not executed.

In step 1809, decoding processing is executed for the k-th code word, while in step 1810 the word number is calculated for the leading code word of the message which corresponds to the address for which address matching has been found, and that word number is set as the value of the variable k. In step 1611, the number of code words which are contained in that message is obtained from the code word that was decoded in step 1809. The value thus obtained is then set as the value of a variable m, which is held in a location reserved in the RAM 102, and which expresses the number of code words of the message. The address field analysis processing then ends, and operation advances to the message field analysis processing 1115.

The decoding processing which is executed for the k-th code word in each of the above steps 1800, 1804 and 1809 will be described in the following. In this processing, de-interleaving of the k-th code word is performed, then the BCH code of that code word is decoded, error correction is performed, and the resultant word, designated in the following as cw[0:31], is stored in the RAM 102. In the de-interleaving processing of the k-th code word, the data constituting that code word are read out from the received data which are held in the receiving buffers, by the received data acquisition processing 1303 of the Interrupt 0 processing 1117, with the data being obtained as a 32-bit word.

However since the received data acquisition processing 1303 is executed by means of interrupt processing, executing of the receiving process and storing of the received data in the receiving buffers are not performed in synchronism. On the other hand, the CPU 100 is designated to have more than sufficient processing speed to execute the receiving processing. For that reason, when de-interleaving of the k-th code word is to be performed by the CPU 100, all of the received data which contain the k-th code word may not yet have been stored in the receiving buffers. In such a case, the receiving process must wait until all the received data containing the k-th code word becomes stored in the receiving buffers. In that case, the execution of the receiving process will be temporarily stopped, while operation is switched to the main process, and the main process will then be executed. In that condition, each time the Interrupt 0 processing 1117 is executed, the CPU 100 executes the received data acquisition processing 1303, then returns to the receiving process. If all of the received data containing the k-th code word are not yet held in the receiving buffers when this occurs, then the CPU 100 again executes a return to the main process.

Figure 20:
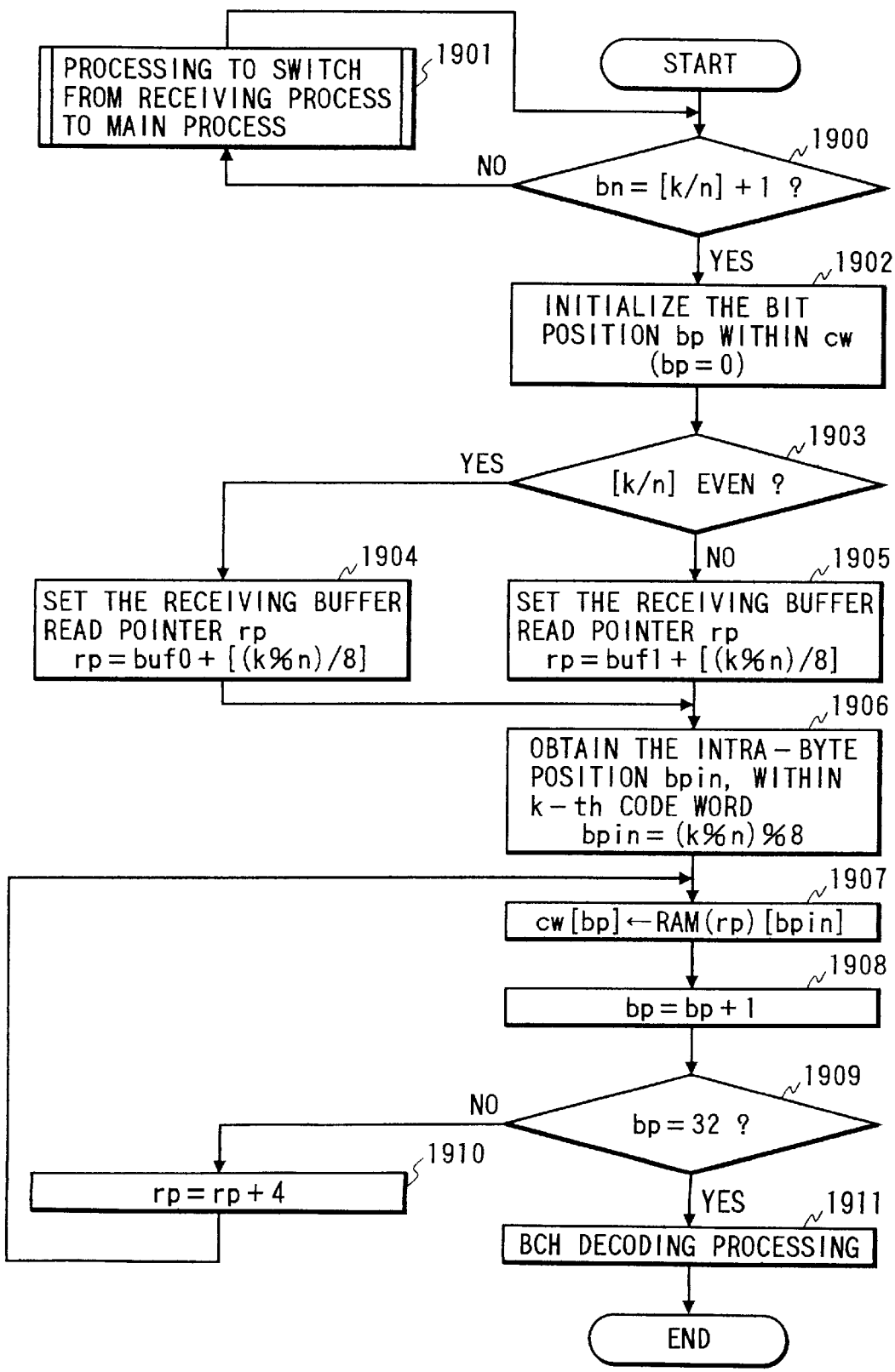
FIG. 20 is a flow diagram showing the operating sequence of decoding processing which is executed for a k-th code word of a received data frame, by the CPU of the preferred embodiment.

These operations are successively repeated until all of the received data containing the k-th code word have been stored in the receiving buffers. The decoding processing for the k-th code word is shown in detail in the flow diagram of FIG. 20.

First, in step 1900, a decision is made as to whether the variable bn (which expresses the interleaved block number) is equal to [k/n]+1, to thereby determine whether all of the data of the interleaved block which contains the k-th code word, i.e. the [k/n]-th block have been stored in the receiving buffers. Here, n denotes the aforementioned value of interleaving factor, which takes one of the values 8, 16 or 32 as described hereinabove. It should be noted that [ ] are used herein to indicate the Gaussian operator, i.e. [a] applied to a value "a" signifies the largest integer which does exceed the value "a". If bn=[k/n]+1, then this signifies that all of the data of the [k/n]-th block have been stored in the receiving buffers, and in that case, operation advances to step 1902. If bn is not equal to [k/n], indicating that storing of the data of the [k/n]-th block into the receiving buffers has not yet been completed, then operation advances to step 1901. In step 1901, processing is switched from the receiving process to the main process. Subsequently the Interrupt 0 processing 1117 is executed, and when that interrupt processing is completed, operation switches back to execution of the receiving process, i.e. to return to step 1900.

It can thus be understood that during execution of the receiving process, steps 1900 and 1901 are repetitively performed, until all of the received data containing the k-th code word become stored in the receiving buffers.

Figure 21:
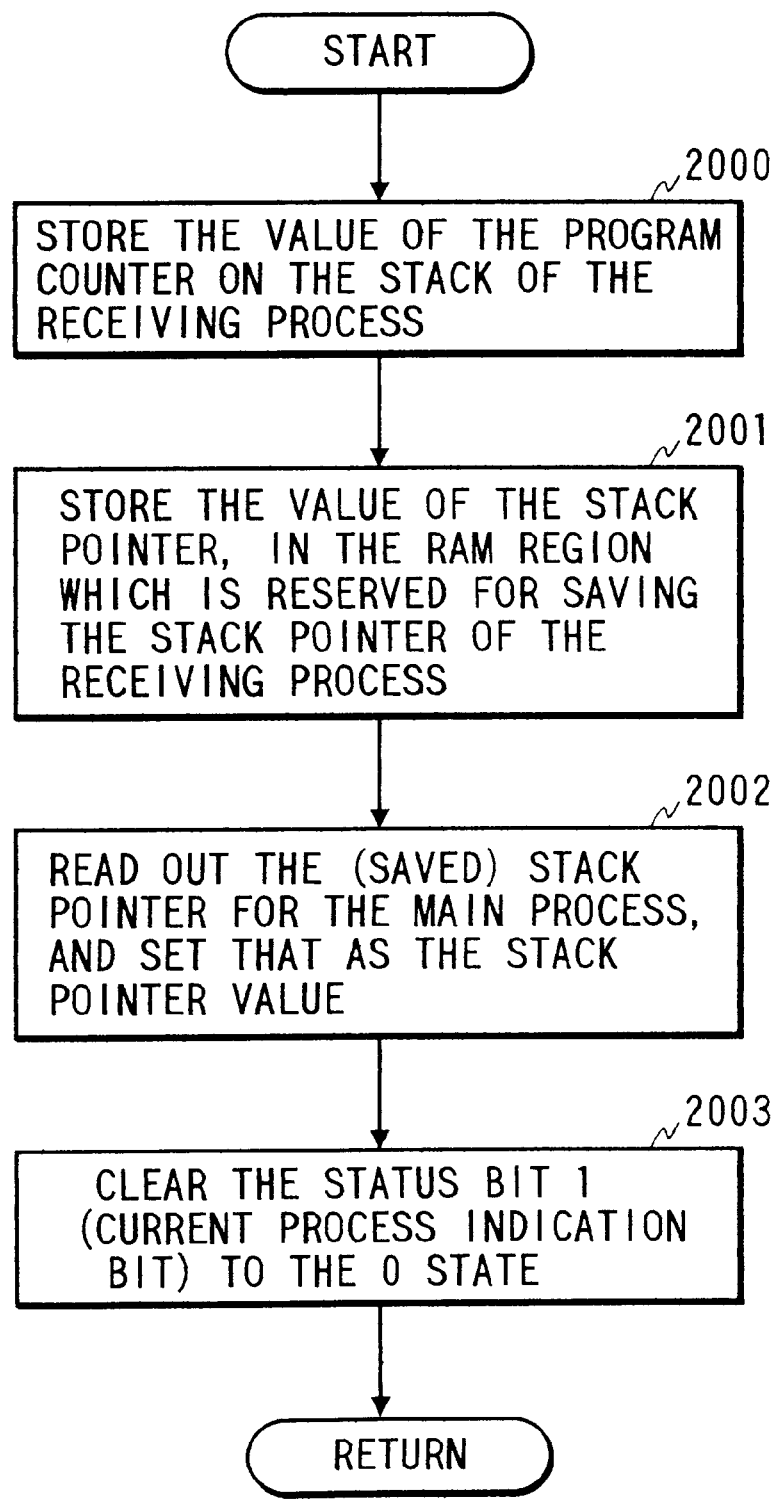
FIG. 21 is a flow diagram showing the operating sequence which is executed to switch from the receiving process to the main process, by the CPU of the preferred embodiment.

The processing sequence for switching from the receiving process to the main process will be described referring to the flow diagram of FIG. 21. First, in step 2000, the value of the program counter of the CPU 100 is stored on the stack of the receiving process. In step 2001, the value of the stack pointer at that time is copied into the region which has been reserved in the RAM 102 for the stack pointer of the receiving process. In step 2002, the value which is held in the region of the RAM 102 reserved for saving the stack pointer of the main process is set as the new value of the stack pointer, and in step 2003, the status bit 1 which indicates the current process is set to 0.

The CPU 100 then executes a return command, the contents of the address in RAM 102 that is specified by the stack pointer are then read out, and set as the value of the program counter of the CPU 100. Execution of the main process is then restarted.

Referring again to FIG. 20, in step 1902, the variable bp (which is stored in a reserved region of the RAM 102 and indicates a bit position within the code word cw) is initialized to the value 0. In step 1903, a decision is made as to whether the receiving buffer which holds the data of the [k/n]-th code word is receiving buffer 0 or receiving buffer 1. If the value of [k/n] is an even number, then this indicates that the data concerned are stored in receiving buffer 0, and in that case operation advances to step 1904. If the value of [k/n] is an odd number, then this indicates that the data concerned are stored in receiving buffer 1, and in that case operation advances to step 1095. In step 1904, the value of a variable rp (which is a read pointer for the receiving buffers, and is stored in a reserved region of the RAM 102) is calculated as:

$$buf0+[(k\%n)/8]$$

Figure 22:
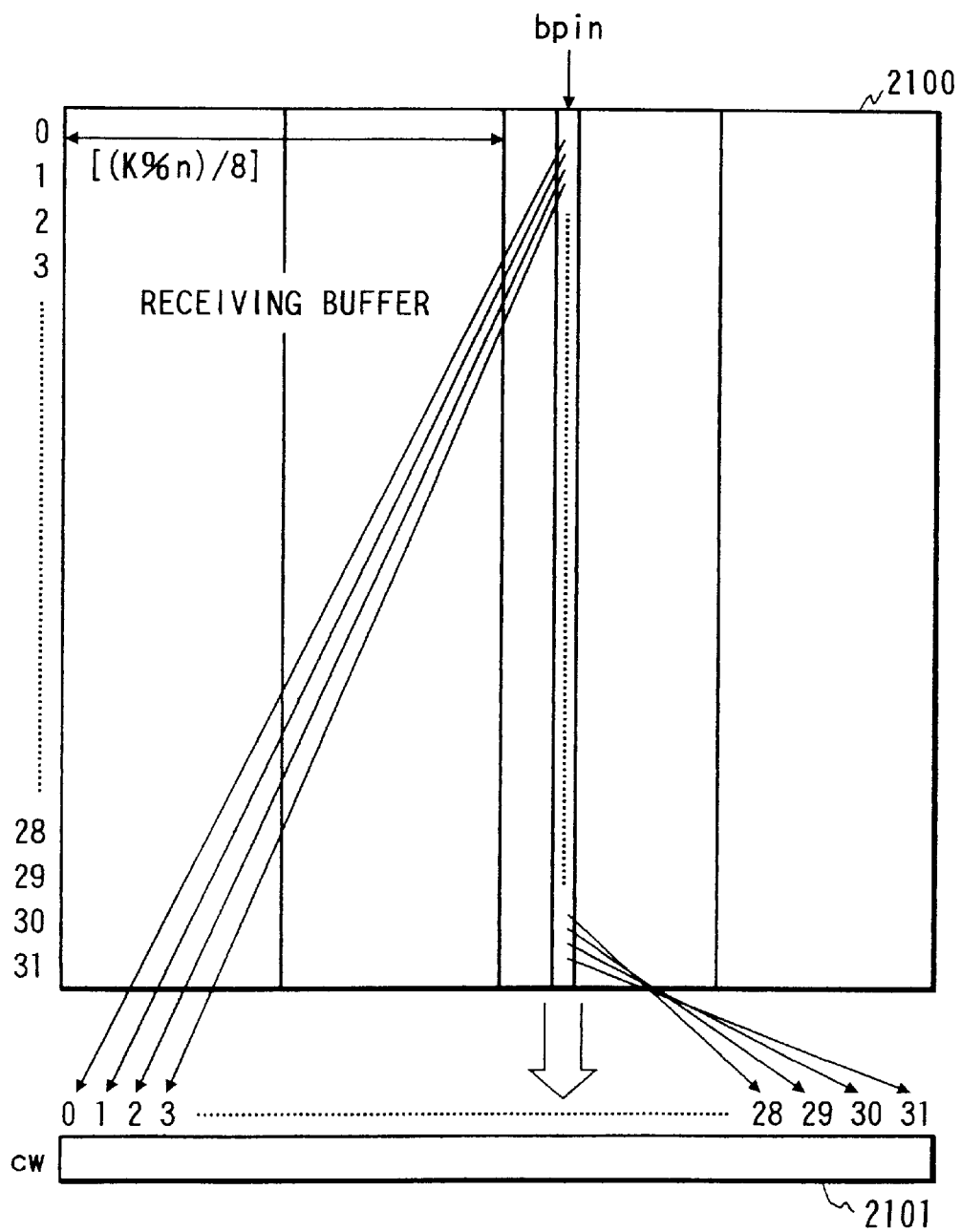
FIG. 22 is a conceptual diagram for describing the manner in which de-interleaving processing of a code word of a received frame is executed by the CPU of the preferred embodiment.

Here, "k%/n" signifies the remainder which results from dividing k by n. As shown in FIG. 22, the quantity buf0+[(k%n)/8] expresses the address, within the RAM 102 of the byte which contains the bit 0 of the k-th code word. Similarly, in step 1905, rp is set to a value which is calculated as:

$$buf1+[(k\%n)/8]$$

Next, in step 1906, the variable bpin (stored in a region reserved in the RAM 102) is set to a value which is calculated as (k%n)%8. The variable bpin expresses a bit position within a byte of data of the k-th code word, stored in a receiving buffer. In step 1907, the value of the bit which is designated by the variable bpin, of the byte which is designated by the variable rp, is copied as the value of the bit whose position in the code word cw is designated by the value of the variable bp. In step 1907, cw[bp] signifies the bit bp of the code word cw, while RAM(rp) [bpin] signifies the bit bpin of the byte which is designated by rp. In step 1908, bp is incremented by 1, and in step 1909 a decision is made as to whether de-interleaving of the k-th code word has been completed. If bp is not equal to 32 then this indicates that the de-interleaving is not yet completed, in which case operation advances to step 1910, and the variable rp is incremented by 4, then operation returns to step 1907. The CPU 100 repetitively executes the sequence of steps 1907 to 1910 until the value of bp becomes equal to 32. When bp reaches 32, then as shown in the conceptual diagram of FIG. 22, the complete de-interleaved k-th code word has become stored as the code word cw. In FIG. 22, 2100 denotes the receiving buffer which contains the interleaved code word that is to be operated on, while 2101 denotes the de-interleaved code word cw. The above can be more clearly understood by referring also to FIGS. 7 and 18.

When it is judged that de-interleaving has been completed, operation advances to step 1911. In step 1911, BCH code decoding processing is executed on the de-interleaved code word cw, to perform error detection and correction. This completes the decoding processing of that code word.

The BCH code decoding processing will be described in detail in the following. The BCH code decoding processing is executed in exactly the same way in both the step 1600 of the header file analysis processing and in the step 1911 of decoding processing for the k-th code word. In the BCH code decoding, modulo-2 division of the number expressed by bits 0 to 30 of the de-interleaved code word cw is performed, using the BCH (31, 21) code-generating polynomial G which was utilized in BCH encoding prior to transmission of the data. An error syndrome S is obtained as the remainder of this division operation, and an error pattern E which corresponds to that error syndrome S is then obtained. The exclusive-OR of the set of bits 0 to 30 of the code word and that error pattern E is then derived, to thereby obtain (if the code word contains no more than two error bits, as described hereinafter) the error-corrected code word.

With this embodiment, a table which relates respective error patterns to corresponding values of error syndrome is stored beforehand in the ROM 101, to be used in conjunction with the program for executing BCH code decoding.

With this embodiment also, the modulo-2 division which is required in the BCH code decoding is performed based on table look-up operations, using a table whose contents have been stored beforehand in the ROM 101. The contents of this table are generated beforehand, by multiplying each of the possible 7-bit numbers by the (11-bit) BCH (31, 21) code-generating polynomial G. using modulo-2 multiplication, to obtain respective multiplication results, each of which is a 17-bit number. For each of these result values, the low-order 10 bits are set in the table as a table value, with the high-order 7 bits being established as the address of of that corresponding 10-bit table value. In the following, this table will be referred to as the division table.

Although a specific example of the division table has been given above, such a table could of course be generated for various other combinations of parameter values. Specifically, designating the number of bits of the generator polynomial coefficients G as g, the number of bits of the quotient Q that is to be obtained by modulo-2 division of a code word by G as q, and the number of bits of the code word as c, (where g, q and c have the values 11, 21 and 31 respectively, with the preferred embodiment), the value q must be an integral multiple of a factor f (where f is 3, with the preferred embodiment), i.e. q/f is an integer n, (where n is 7, with the preferred embodiment). Since modulo-2 division is performed, there is the relationship:

$$(g+q-1)=c$$

The division table is generated by obtaining respective result values of executing modulo-2 multiplication of G by each of the possible n-bit numbers, with each result value having (g+n-1) bits. The low-order (g-1) bits of each multiplication result value is set as a table value, while the high-order n bits of that result value are used as the corresponding table address.

Figure 23:
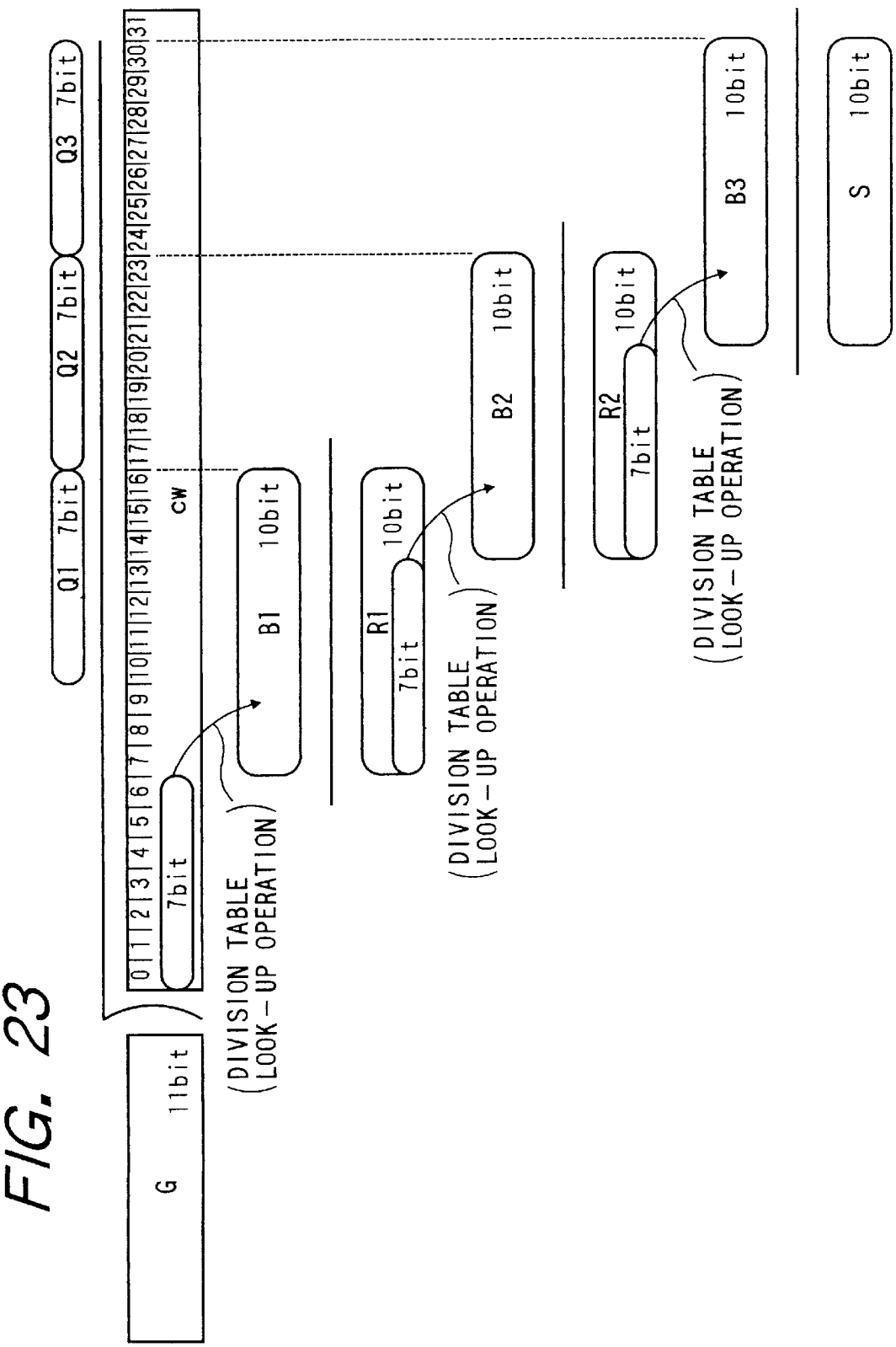
FIG. 23 is a conceptual diagram for illustrating a sequence of processing which is executed to perform modulo-2 division of a de-interleaved code word through table look-up operations, to effect BCH code error-correction, by the CPU of the preferred embodiment.

FIG. 23 is a conceptual diagram showing the processing sequence whereby modulo-2 division is performed using this division table, to execute BCH code decoding processing with the preferred embodiment. In FIG. 23, the three sets of 7 bits Q1, Q2 and Q3 constitute the 21-bit quotient of the division operation. B1 is the low-order 10 bits of the result that would be obtained by multiplying Q1 by the polynomial G. and is obtained as a table value from the division table. R1 is the result of obtaining the exclusive-OR of the set of ten bits (bit 7 to bit 16) of the code word cw with B1. Similarly, B2 is the low-order 10 bits of the result that would be obtained by multiplying Q2 by the polynomial G. and is obtained as a table value from the division table. R2 is the result of obtaining the exclusive-OR of B2 with respect to the 10-bit pattern formed of the low-order 3 bits of R1 followed by the bits 17 to 23 of code word cw. B3 is the low-order 10 bits of the result that would be obtained by multiplying Q3 by the polynomial G, and is obtained from the division table. S (i.e. the error syndrome) is the result of obtaining the exclusive-OR of the 10-bit pattern formed of the low-order 3 bits of R1 followed by the bits 24 to 30 of code word cw, with B3.

In the above, B1, B2 and B3 are respectively obtained as table values from the division table, as follows. In the case of the table value B1, this is achieved by using the high-order 7 bits (from bit 0 to bit 6) of code word cw as the table address, while for B2 the 7 high-order bits of R1 are used for that purpose, and in the case of B3, the 7 high-order bits of R2 are used as the table address.

Figure 24:
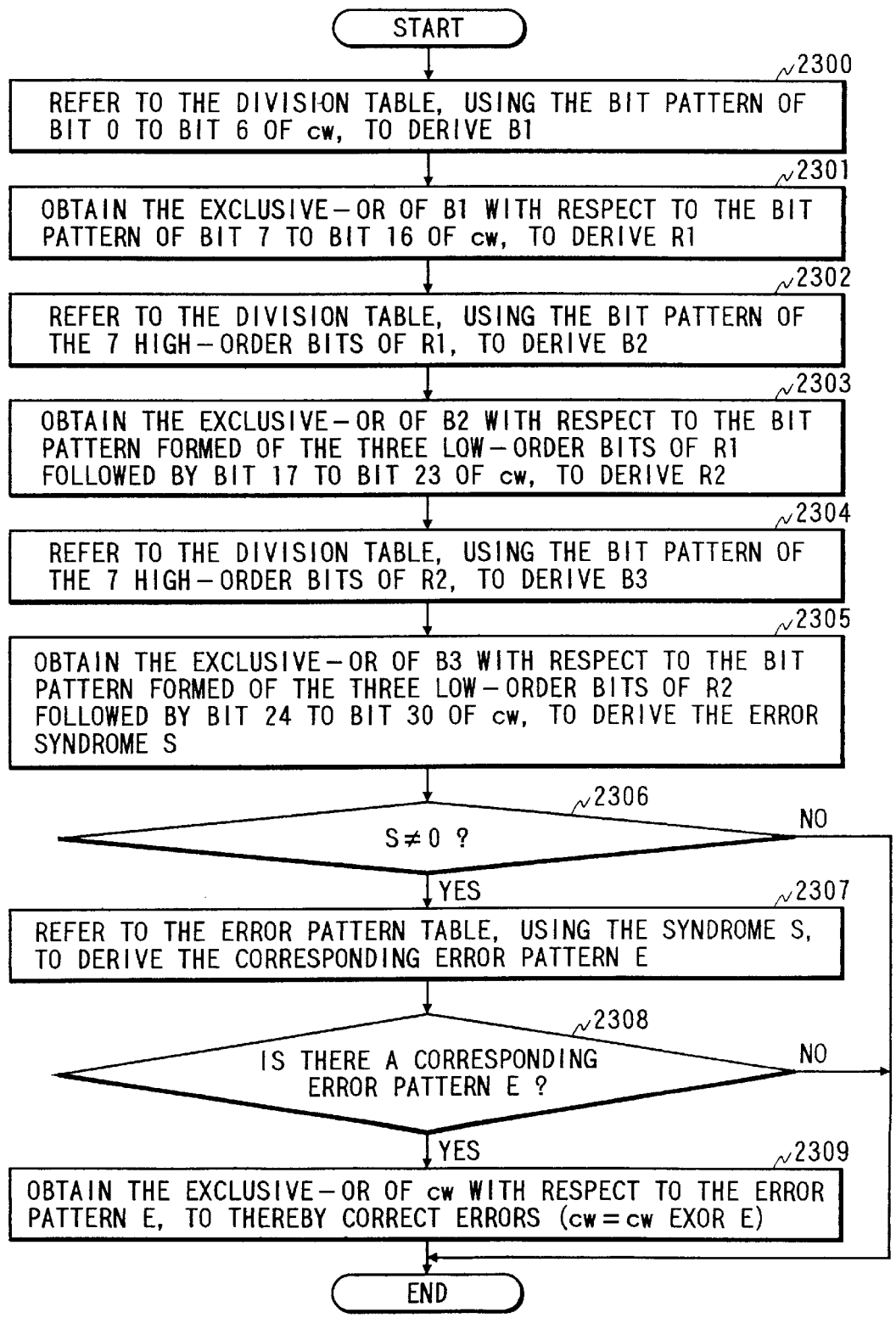
FIG. 24 is an overall flow diagram of the operations executed by the CPU to effect BCH code error-correction of a received de-interleaved code word.

The BCH code decoding processing sequence for this embodiment is as shown in the flow diagram of FIG. 24.

First, in step 2300, the division table is referred to, using the 7-bit pattern consisting of bits 0 to 6 of the code word cw as the table address, to thereby obtain B1. Next in step 2301 the exclusive-OR of the ten bits 7 to 16 of the code word cw with respect to B1 is obtained, to thereby obtain a first intermediate value R1. That sequence of steps whereby the first intermediate value is derived will be referred to in the following as the primary processing sequence of the BCH decoding operation. In step 2302, the division table is looked up, using the bit pattern consisting the high-order 7 bits of R1, to thereby obtain B2. Next, in step 2303 the exclusive-OR is obtained of B2 with respect to the 10-bit pattern formed of the low-order 3 bits of R1 followed by bits 17 to 23 of the code word cw, to thereby obtain a second intermediate value R2.

In step 2304, the division table is looked up, using the bit pattern consisting the high-order 7 bits of R2, to thereby obtain B3. Finally, in step 2305 the exclusive-OR is obtained of B3 with respect the 10-bit pattern formed of the low-order 3 bits of R2 followed by bits 24 to 30 of the code word cw, to thereby obtain the error syndrome S.

In the following, each of the sequences of steps whereby the second intermediate value (R2) and the error syndrome (S) are respectively derived will be referred to as a secondary processing sequence. It can be seen from the above description that the contents of each of the secondary processing sequences are identical, but that the respective secondary processing sequences of the BCH decoding operation utilize respectively different sets of 7 bits of the code word, with these sets of 7 bits being of respectively decreasing order within the code word, and with the error syndrome (S) being obtained in a final one of the secondary processing sequences, which operates on the low-order 7 bits of the code word.

Next, in step 2306, a decision is made as to whether errors have been detected in the code word cw. If the value of the error syndrome S is zero, then this signifies that no error has been detected, so that the BCH code decoding processing is then ended. However if S is not zero, signifying that at least one bit error has been detected, then operation advances to step 2307. In step 2307, the aforementioned error pattern table is looked up, using the error syndrome S as a table address, to obtain the corresponding error pattern E. The error pattern table contains all error patterns which contain two bits or fewer that are in error. When table look-up is executed using the error syndrome S, and a corresponding error pattern E is obtained, the error pattern consists of a 31-bit pattern in which the bits which are in error have each been set to the 1 state, with all other bits being in the 0 state. If the code word cw contains more than three error bits, then there will be no corresponding error pattern, i.e. even when error pattern table look-up is performed in such a case, no error pattern corresponding to the error syndrome S will be obtained. In such a case, error correction is not possible. For that reason, in step 2308, a decision is made as to whether there is any error pattern which corresponds to the error syndrome S. If no corresponding error pattern is found, then the BCH code decoding is ended. If an error pattern E corresponding to the error syndrome S is found, then operation advances to step 2309, in which the exclusive-OR is obtained of the bits 0 to 30 of code word cw with respect to that error pattern E. The result is stored as the corrected code word cw, and the BCH code decoding is then ended.

In the above description, the modulo-2 division operation to perform BCH code error correction has been explained with reference to a specific example. In general, using the aforementioned parameter designations g, q and n, the procedure can be summarized as follows. In a first step, the n high-order bits of the code word are used as a table address of the division table, to obtain the corresponding table value, which has (g−1) bits as described above, i.e. to obtain a first table value (B1). The exclusive-OR of that value Bl with the bit pattern formed of the next-lower order (g−1) bits of the code word is then obtained, to derive a first intermediate result (R1), thereby completing the primary processing sequence.

The n high-order bits of that intermediate result RI are then used as a table address of the division table, to obtain the next table value B2 from the division table. The exclusive-OR of that value B2 is then obtained respect to the (g−1)-bit pattern formed of the low-order (g−n−1) bits of the first intermediate result (R1) followed by the n bits of the code word which are next-lower in order to the above-mentioned (g−1) bits, to thereby derive a second intermediate result R2, which completes the first secondary processing sequence.

Further secondary processing sequences are then executed, each being similar to that used to derive the intermediate value R2 but acting on respectively different sets of n bits of the code word, with these n-bit sets being of increasingly lower order within the code word. A total of (f−1) of these secondary processing sequences are executed (where f is 3 with the present embodiment, as described above), operating on a next-lower order set of n bits of the code word each time, to finally reach the lowest-order n bits of the code word, and thereby obtain the error syndrome S as the remainder of the modulo-2 division operation.

It can be understood from the above description that use of such a division table enables the amount of processing required to obtain the error syndrome S to be very substantially reduced, by comparison with a conventional form of modulo-2 division calculation in which a large number of intermediate values must be derived by successively executing respective exclusive-OR operations in order to finally obtain the division remainder, i.e. the error syndrome.

Figure 25:
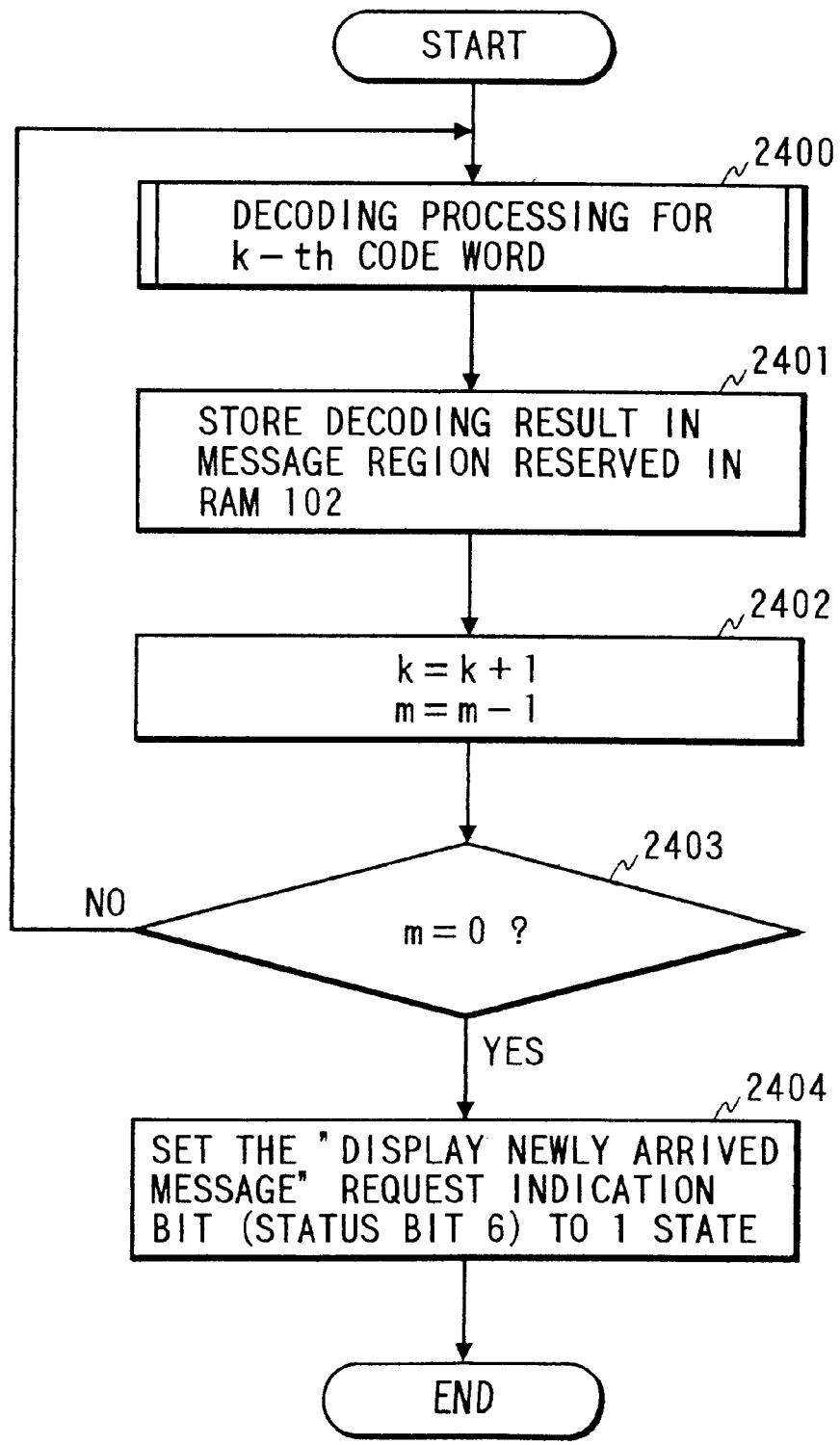
FIG. 25 is a flow diagram of the operating sequence of message field analysis processing, executed by the CPU of the preferred embodiment.

In the message field analysis processing 1115, message data (corresponding to the address for which address matching was achieved in the address field analysis processing 1114) are stored in a message region which is reserved in the RAM 102. FIG. 25 is a flow diagram of the message field analysis processing 1115.

First, in step 2400, decoding processing of the k-th code word is executed. In this case, the value of the variable k is the number of the leading code word of the message which corresponds to the address for which address matching was achieved, obtained as described hereinabove. In step 2401, the decoded code word is stored in the message region which is reserved in the RAM 102. In step 2402, the variable k is incremented by 1, and the aforementioned variable m (i.e. which expresses the number of code words of the message) is decremented by 1, and in step 2403 a decision is made as to whether the message field analysis processing has finished. If the value of the variable m is 0, then this signifies that storing of the message has been completed, and so operation advances to step 2404, in which the status bit 6 (which indicates a request to display a newly arrived message) is set to 1, then the message field analysis processing 1115 ends.

If it is found that m is not 0, in step 2403, then operation returns to step 2400, to begin decoding the next code word of the message. In that way, the sequence of steps 2400 to 2403 is repetitively executed until the value of the variable m becomes 0, to thereby store the entire message in the region reserved in the RAM 102, whereupon the message field analysis processing 1115 ends.

Figure 26:
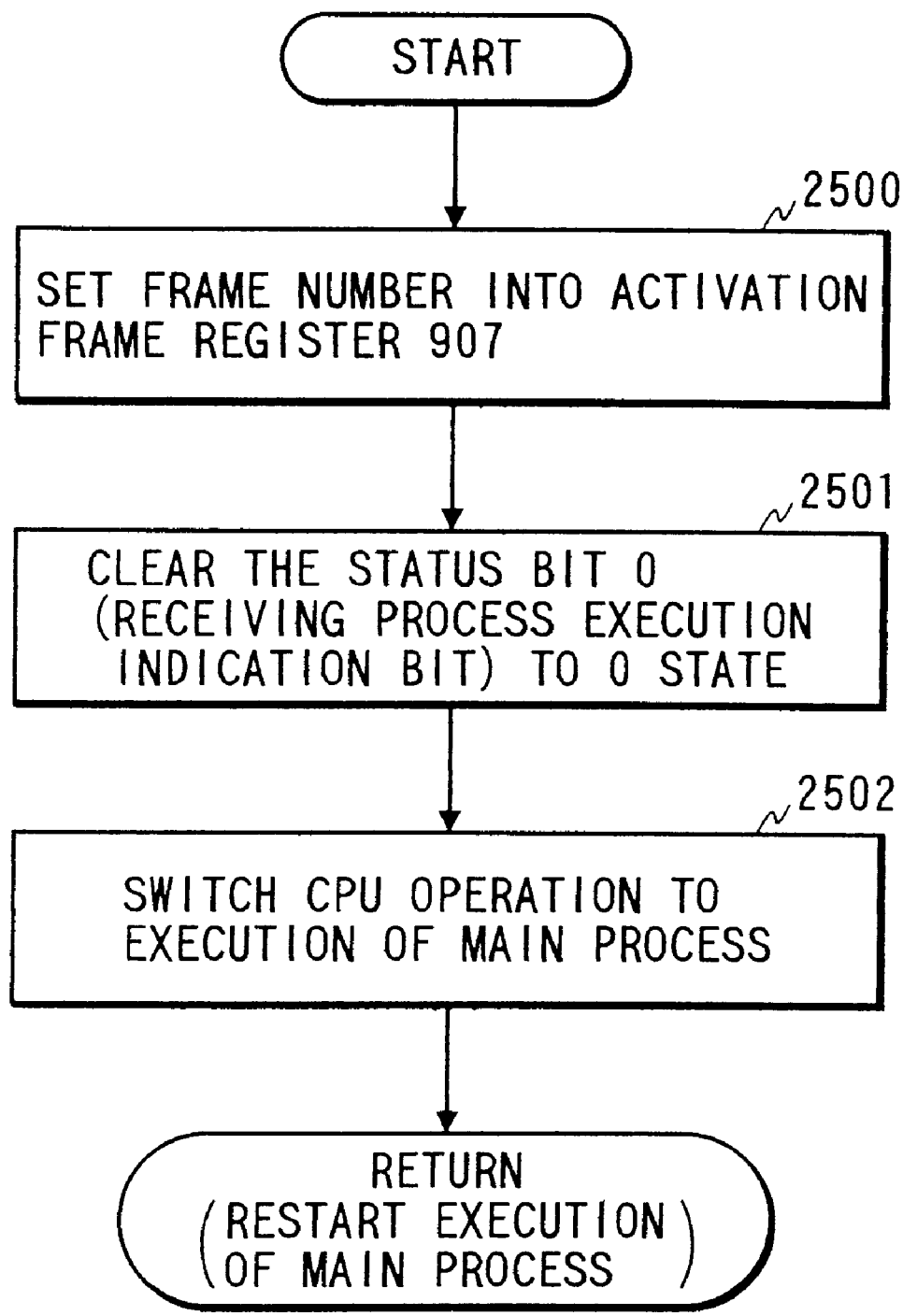
FIG. 26 is a flow diagram of the operating sequence of receiving process termination processing, executed by the CPU of the preferred embodiment.
Figure 27:
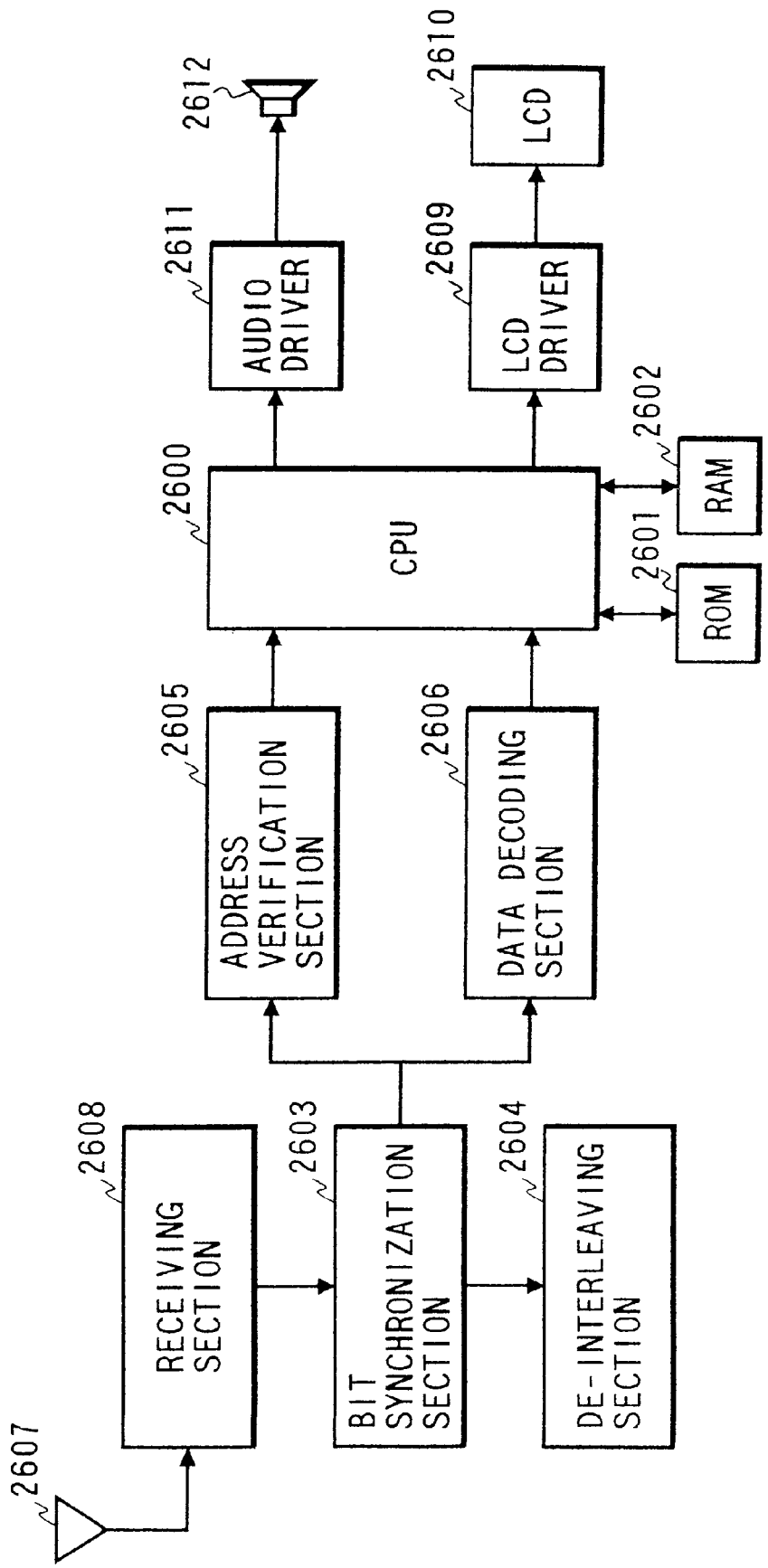
FIG. 27 is a system block diagram showing the general configuration of an example of a prior art paging receiver.

The receiving process termination processing 1116 will now be described. This is processing which is executed in order to switch from the receiving process to the main process, after the receiving process has ended. FIG. 26 is a flow diagram of the receiving process termination processing 1116.

First, in step 2500, the frame number of the frame which will be activated next is set into the activation frame number register 908 of the control logic section 103. As a result, issuing of the Interrupt 0 processing request from the control logic section 103 is halted. Next, in step 2501, the status bit 0 (which indicates whether the receiving process is currently the process that is being executed) is set to 0, to thereby indicate that execution of the receiving process has ended. In step 2502, the value of the stack pointer of the CPU 100 at that time is copied into the region which has been reserved in the RAM 102 for the receiving process stack pointer. The value of the main process stack pointer (which is held in the region reserved in the RAM 102 for saving that stack pointer value) is then read out and set as the new value of stack pointer for the CPU 100. In addition, the status bit 0 (which indicates the current process) is set to 0, and operation then switches to the main process. The CPU 100 executes a return command, whereby the program counter value which has been stored in the main process stack is set in the program counter of the CPU 100, and execution of the main process then is restarted.

In the main process, the CPU 100 executes the "newly arrived message display processing" 1104, whereby the received message is displayed by the LCD 107, an audible indication is generated by the loudspeaker 108, and the LED 109 is set in the flashing condition, thereby notifying the user that a message has been received.

The basic operation of the CPU 100 of this embodiment, with respect to transitions between execution of various parts of the control program, can be summarized as follows. It can be considered that the CPU 100 will, at any point in time, be operating in one of the following conditions:

(a) Executing the main process, i.e. either waiting in the "halt" state (step 1110 in FIG. 12A), or executing the main process sequence (steps 1101 to 1109 in FIG. 12A), with status bit 0=0.

(b) Executing the main process, with status bit 0=1.

Figure 12B:
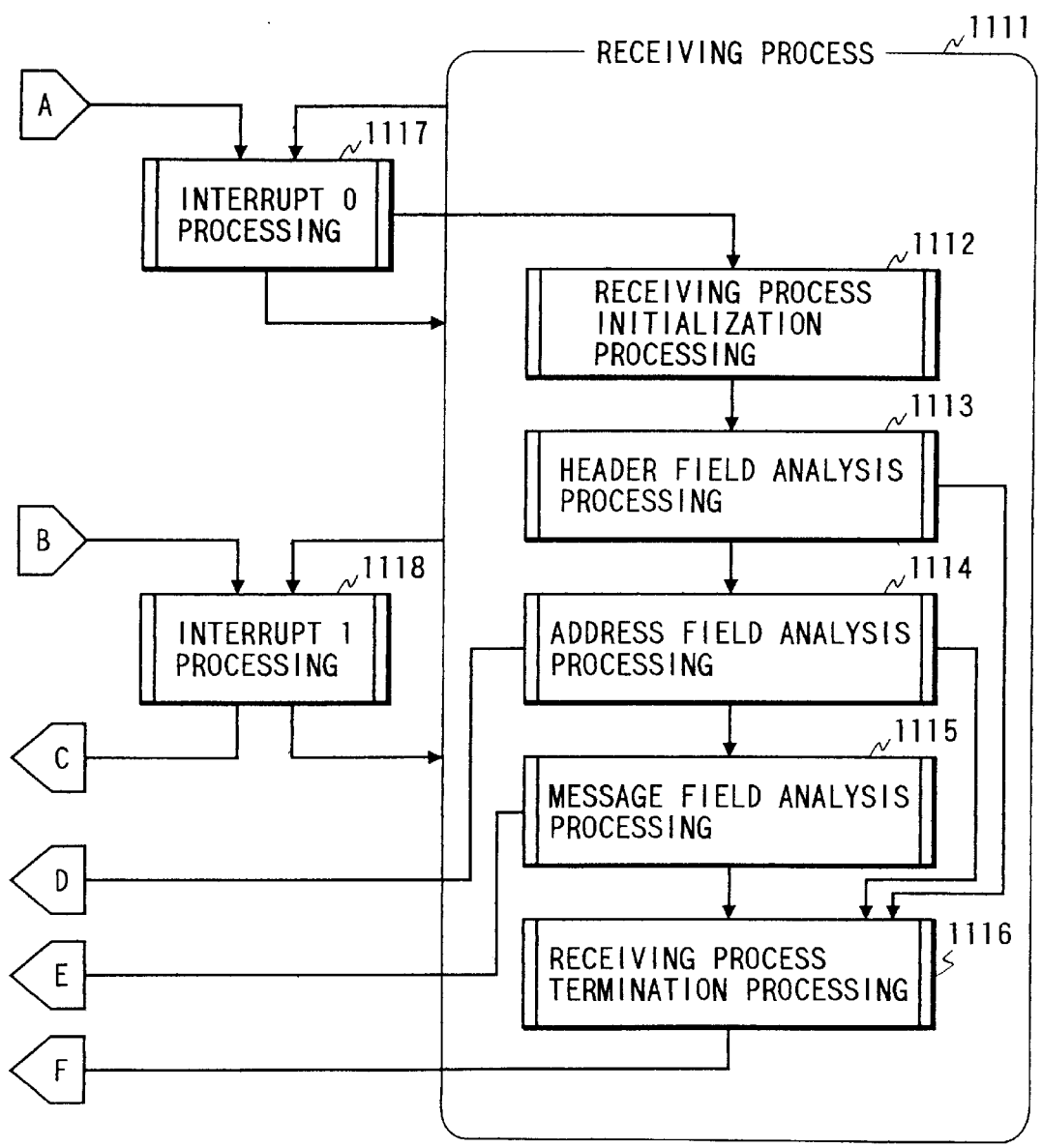

(c) Executing the receiving process (steps 1112 to 1116 in FIG. 12B)

(d) Executing the Interrupt 1 processing routine, (to update the status bits 3, 4, 5, 7)

(e) Executing the Interrupt 0 processing routine, (to transfer four bytes of newly received data into a receiving buffer in RAM 102)

Transitions between these conditions occur as follows:

1. While executing the main process, with status bit 0=0:

(1a) When an Interrupt 0 processing request is generated (control signal 121 goes to L level), execute the Interrupt 0 processing, then set bit 0 to the 1 state, and switch to the start (initialization) of the receiving process.

(1b) When an Interrupt 1 processing request is generated (control signal 122 goes to L level), execute the Interrupt 1 processing, then return to executing the main process.

2. While executing the main process with status bit 0=1:

(2a) When an Interrupt 0 processing request is generated, execute the Interrupt 0 processing, then return to the receiving process (i.e. return to point from which that process had been exited previously)

(2b) When an Interrupt 1 processing request is generated, execute the Interrupt 1 processing, then return to executing the main process.

3. While executing the receiving process:

(3a) When an Interrupt 0 processing request is generated, execute the Interrupt 0 processing routine, then return to executing the receiving process, and judge if it is necessary to wait for the next set of 4 bytes of received data to be transferred to a receiving buffer before the receiving process can proceed (i.e. while executing the address field analysis processing 1114 or the message field analysis processing 1115 shown in FIG. 12B).

(3b) When it is found necessary to wait for the next set of 4 bytes of received data to be transferred to a receiving buffer, return to executing the main process (with status bit 0 set to the 1 state).

(3c) When an Interrupt 1 processing request is generated, execute the Interrupt 1 processing, then return to the receiving process.

(3d) When it is found that the receiving process termination processing (1116) has been completed, return to executing the main process, with status bit 0 set to the 0 state.

The above transitions are respectively indicated by the arrow lines which interconnect the main process 1100, the receiving process 1111, the Interrupt 0 processing 1117 and the Interrupt 1 processing 1118, in FIGS. 12A, 12B.

As described in the above, with this embodiment of the present invention, the CPU 100 operates in accordance with a control program which is stored in the ROM 101, to execute de-interleaving analysis, BCH code decoding, and address verification processing, i.e. all of the protocol analysis processing required for a paging receiver which is used as part of a paging system employing a sophisticated data communication protocol, so that large amounts of data can be transferred to and displayed by the paging receiver.

Also with this embodiment as described above, when performing address field analysis processing and message field analysis processing, only the code words which are actually required in that processing are subjected to de-interleaving and to BCH code decoding. Furthermore in the case of BCH code decoding processing, which is accomplished by modulo-2 division operations using a BCH code generator polynomial, this is achieved by utilizing table look-up referencing of a division table, whereby the number of successive exclusive-OR operations which must be performed to execute such a division operation can be very considerably reduced. In that way it becomes unnecessary to utilize dedicated hardware, a high-performance CPU, or a CPU which operates with a long word length, to execute the division calculations. That is to say, the processing load imposed on the CPU is reduced to such an extent that all of the necessary calculations can be readily performed by a standard (8-bit) type of CPU operating at a relatively low clock frequency, i.e. all of the protocol analysis operations required can be executed by such a CPU alone, operating from a suitable program.

This point can be understood by considering an example in which the modulo-2 division is performed with an 11-bit generator polynomial G. for 31-bit BCH (31, 21) code. The division will be assumed to be performed in the usual manner for modulo-2 long division, i.e. as a succession of exclusive-OR operations. If an 8-bit CPU (i.e. which operates with an 8-bit word length) is used, which does not incorporate a dedicated divider circuit, then a total of 42 exclusive-OR operations will be required to complete such a division operation. Even if a 16-bit CPU were to be used, a total of 21 exclusive-OR operations would be required. With the present invention on the other hand, using the method employed with the above embodiment, the number of repetitions of the exclusive-OR operation which are necessary to execute such a division operation will be only 6 times, in the case of an 8-bit CPU.

Furthermore with the embodiment described above, the overall operation is based upon two separate processes, i.e. the main process 1100 and the receiving process 1111, with the CPU 100 frequently switching between execution of these processes during reception of a frame containing message data which are addressed to that paging receiver. In that way it becomes possible to execute the transmitted data protocol analysis processing and also to execute processing for servicing switch actuations by the user, in an effectively concurrent manner, so that immediate response to such switch actuations is always ensured.

Furthermore, due to the manner in which the activation frame number register 908 and frame counter 907 of the frame number comparator section of the above embodiment are utilized, it is made unnecessary to receive (i. e. by demodulating the received RF signal) and apply protocol analysis to the entire stream of received digital data. That is to say, it is made unnecessary to compare the frame number assigned to the paging receiver with each of the successive frame numbers contained in that data stream. Instead, successive frame numbers are counted by periodically incrementing the frame counter 907, with a period that is identical to the frame interval. When frame number coincidence is detected, then the corresponding frame is subjected to protocol analysis processing. If it is then found (i.e. by comparing the received frame number with the locally stored frame number which is assigned to the paging receiver) that the frame number thus obtained from the received data is incorrect, thereby indicating that the frame counter 907 does not contain the correct count value, then that condition is corrected by setting the frame number obtained from the received data as the frame counter value. Thus the paging receiver can function by receiving and processing only the one frame within each cycle which contains a message addressed to that paging receiver, e.g. one out of every 128 successive frames of the transmitted data. During the remaining part of each cycle, the radio receiving section of the paging receiver (i.e. the receiving section 104 of the above embodiment) can be set in at least a partially inactivated condition (by means of the control signal 114, with the above embodiment), and no protocol analysis processing is executed by the CPU. Hence, the power consumption of the paging receiver can be substantially minimized, by comparison with prior art types of paging receiver. In addition, within each frame which is supplied by the radio receiving section, instead of applying protocol analysis (i.e. de-interleaving and BCH decoding processing) to all of the encoded data of that frame, the protocol analysis is applied to only the minimum necessary amount of data of that frame.

The basic features and advantages of the present invention can be summarized as follows:

Firstly, protocol analysis operations, i.e. the de-interleaving processing and BCH code decoding processing, are only applied to those frames of the received data stream which are actually required, and within each selected frame, are applied only to those parts of the data of that frame which are actually required. In particular, only those code words within the message field which contain message data addressed to the paging receiver are subjected to BCH code decoding processing. Hence, the overall amount of processing which must be performed is greatly reduced, by comparison with prior art methods.

Secondly, most of the exclusive-OR operations which are normally necessary for executing modulo-2 division by the set of BCH code generating polynomial coefficients are eliminated, by obtaining necessary intermediate values from a table of numeric values, i.e. values which have been derived beforehand by using that BCH code generating polynomial. As a result, the processing load on the CPU of the paging receiver can be substantially reduced, by comparison with the conventional method whereby the CPU must execute a large number of successive exclusive-OR operations to perform BCH decoding for error correction of a code word. As a result, it becomes possible to utilize an 8-bit CPU, without it being necessary to use an increased operating speed (i.e. increased clock frequency) for the CPU, to execute the protocol analysis operations that are necessary in a paging receiver which receives large amounts of digital data that are transmitted at a high data rate.

Thirdly, a plurality of CPU stack regions are reserved in the RAM, enabling frequent switching of the CPU stack during reception of a transmitted signal, which permits processing for protocol analysis of the received data and processing such as servicing of switch actuations by the user to be performed, in effect, concurrently. In the described embodiment, two stack regions are reserved, for the main process and the receiving process respectively. Specifically, during each of the relatively long intervals in which the receiving process must be halted in order to wait for a new set of data to be received and set into a receiving buffer for use in protocol analysis processing, operation of the CPU is switched to the main process, in which servicing of function switch actuations is performed. As a result, the paging receiver can achieve rapid response to switch actuations, without deterioration of the data reception performance.

What is claimed is:

1. A radio receiver for receiving a radio signal modulated with an interleaved data stream which has been generated by converting a digital data stream to successive code words encoded in accordance with an error correction protocol and applying interleaving processing to said code words, said digital data stream containing sequential frames each containing an address field and a message field, with cyclically occurring ones of said frames each containing an address field which includes a specific address portion conveying position information and size information for specific message data addressed to said radio receiver, and a message field which includes said specific message data, said radio receiver comprising:

means for storing data expressing an address value which is assigned to said radio receiver, means for recovering said interleaved data stream from said received radio signal;

means for executing de-interleaving, decoding and error correction of said address portions of successive ones of said frames, and comparing said address values of said address portions with said assigned address value to detect address coincidence, for obtaining said position information and said size information from an address portion for which address coincidence is detected, for executing de-interleaving, decoding and error correction of said message field of a frame for which said coincidence is detected, thereby to obtain error-corrected message data, and utilizing said position information and said size information to obtain said specific message data from said error-corrected messagea data of said frame.

2. A radio receiver according to claim 1, comprising first data storage means having reserved therein a plurality of buffer regions, means for transferring said said interleaved address portion of a frame as a first set of successive fixed-size data transfer units which are stored in said buffer regions, and for transferring said interleaved message field of said frame as a second set of said data transfer units which are stored in said buffer regions, such as to successively fill each of said buffer regions with said interleaved data in a cyclically repetitive manner, and means for reading out the contents of each of said buffer regions in a predetermined manner, to obtain de-interleaved data from said interleaved data of said address portions and said message fields.

3. A radio receiver according to claim 2, comprising second data storage means having a control program stored therein, a central processing unit for executing said control program, and at least one switch which is actuatable to generate a switch signal for requesting execution of a processing operation, means for generating a first type of interrupt signal in response to said switch signal, and means for generating a second type of interrupt signal when one of said data transfer units is ready to be transferred to one of said buffer regions, wherein said control program includes first and second portions respectively corresponding to a main process for performing said processing operation and a receiving process for performing said de-interleaving operations, a first location is reserved in said first data storage means as a first status bit, settable to a first condition for indicating that said receiving process has been started and to a second condition for indicating that said receiving process has not yet been started, and a second location is reserved as a second status bit, settable from a first to a second condition for indicating a request for execution of said processing operation, when said first interrupt signal is generated while said main process is being executed, a first type of interrupt processing is performed to set said second status bit to said second condition, operation returns to said main process, the condition of said second status bit is detected, and said processing operation is executed in response to said detection, when said second interrupt signal is generated while said main process is being executed and said first status bit is in said second condition, a second type of interrupt processing is performed to transfer a data transfer unit to said first memory means, said first status bit is set to said second condition, then operation changes to an initial stage of executing said receiving process, when said first interrupt signal is generated while said receiving process is being executed, said first type of interrupt processing is performed and operation then returns to said receiving process, when said second interrupt signal is generated while said receiving process is being executed, said second type of interrupt processing is performed to transfer a data transfer unit to said first memory means, when said second interrupt signal is generated while said main process is being executed and said first status bit is in said first condition, said second type of interrupt processing is performed to transfer a data transfer unit to said first memory means, then operation returns to said receiving process, when a final stage of executing said receiving process has ended, operation returns to said main process.

4. A radio receiver for receiving a radio signal modulated with an encoded data stream which has been generated by subjecting a digital data stream to Bose Chaudhuri Nocquenghem (BCH) encoding to obtain successive fixed-length BCH code words and subjecting said code words to interleaving processing, said digital data stream containing periodically occurring frames each containing an address field and a message field, said address field containing a specific address portion which conveys position information for specific message data addressed to said radio receiver, said specific message data being located in said message field, said radio receiver comprising:

means for demodulating said received radio signal to recover said encoded data stream, means for detecting respective occurrences of said specific address portions of said recovered encoded data stream, and for generating corresponding a signal indicative of each said occurrence, at least one switch which is actuatable for generating a switch signal to specify at least one type of processing request, a central processing unit coupled to receive said recovered encoded data stream, and data storage means having stored therein a a control program which is executed by said central processing unit, and a division table containing a plurality of predetermined table values for use in modulo-2 division operations, wherein said control program includes a first portion corresponding to a main process for performing processing to detect each occurrence of said switch signal and processing in accordance with a processing request indicated by said switch signal, and a second portion corresponding to a receiving process for performing, in succession, de-interleaving processing and BCH decoding processing of selected portions of the recovered encoded data stream, wherein said central processing unit, while executing said main process is responsive to said generation of said signal indicative of the occurrence of an encoded data portion corresponding to a specific address portion for switching to execution of said receiving process, wherein said central processing unit, while executing said receiving process, detects completion of recovering said specific message from said encoded data stream, and responds to said detection by switching to execution of said main process, wherein modulo-2 division operations which are executed in said receiving process to decode respective BCH code words are performed by reading out and utilizing specific ones of said table values as intermediate calculation values, and wherein in said receiving process, when an occurrence of said specific address portion in a frame is detected, said position information is obtained from said specific address portion, thereafter de-interleaving processing of said message field is performed until a position indicated by said position information is reached, and de-interleaving and BCH decoding processing are then applied to a specific portion of of said encoded data stream, which contains said specific message data, to thereby recover said specific message data.

5. A radio receiver for receiving digital data transmitted as a modulated radio frequency signal by a base station of a radio paging system, said digital data being configured as a data stream formed of sequentially numbered frames which occur in fixed-duration frame intervals within each of successive fixed-duration cycle periods, each said frame beginning with a header field containing a corresponding frame number, with a specific frame which occurs at a specific fixed position within said cycle period having an address field which includes specific address data predetermined as corresponding to said radio receiver and having a message field containing specific message data which are destined for said radio receiver, with said specific address data containing a local address value which has been assigned to said radio receiver and information indicating a position of said specific message data within said message field of the specific frame, and with respective data of said address field and said message field of each of said frames having been subjected to Bose Chaudhuri Nocquenghem (BCH) encoding to obtain successive fixed-length BCH code words and said code words subjected to interleaving processing to be converted to interleaved digital data, by interleaving in units of fixed-size data blocks prior to transmission by said base station, using a predetermined interleaving factor, wherein said radio receiver comprises radio signal receiving means (104) for receiving said modulated radio frequency signal as an antenna signal and demodulating said antenna signal to obtain a digital signal (113), bit synchronization means (900) for executing bit synchronization processing of said digital signal to recover said digital data stream, a central processing unit (100), coupled to receive said recovered digital data stream, first data storage means (102) for storing data which are processed by said central processing unit, second data storage means (101) coupled to said central processing unit, having fixedly stored therein a control program which is executed by said central processing unit based on instruction address values supplied from said central processing unit, and a division table containing a plurality of predetermined table values for use in modulo-2 division operations, third data storage means (112) for storing said local address value and the frame number of said specific frame, data display means (106, 107) coupled to said central processing unit, for providing visual display of processing results which are generated by said central processing unit, wherein the start of said interleaved address field data in said specific frame is detected, successive de-interleaving of said interleaved address field data of the specific frame is executed, to recover de-interleaved address field data, and BCH decoding of said de-interleaved address field data is executed by respective modulo-2 division operations which are performed by reading out and utilizing specific ones of said table values as intermediate calculation values, to thereby obtain error-corrected address field data, while comparing the contents of said errror-corrected address field data with said local address value, until a condition of address coincidence is detected, then obtaining from said error-corrected address field data said specific address data corresponding to said radio receiver, obtaining, from said specific address data, said information indicating the position and size of said specific message data within said message field, based on said position information, executing de-interleaving of said message field until said position of the specific message data is reached, the executing de-interleaving and BCH decoding of that part of the message field which contains said specific message data, to thereby recover said specific message data, with respective modulo-2 division operations which are executed in said BCH decoding being performed by reading out and utilizing specific ones of said table values as intermediate calculation values, storing said recovered specific message data in said first data storage means, and supplying said message data to said data display means, for thereby displaying the contents of said message data.

6. A radio receiver according to claim 5, wherein said control program includes a portion whereby said central processing unit, by executing said control program performs de-interleaving of said interleaved address field data of the specific frame by reserving a plurality of regions, each of identical size to said fixed-size data blocks, as respective receiving buffers in said first data storage means, writing the data of said interleaved address field sequentially into said receiving buffers such as to cyclically fill successive ones of said receiving buffers with data, and sequentially reading out said data of the interleaved address field from respective memory addresses of each of said receiving buffers in a predetermined sequence which is determined in accordance with said interleaving factor, to recover corresponding de-interleaved data of said address field, and whereby said central processing unit, by executing said control program, performs de-interleaving of said interleaved message field data of the specific frame by writing the data of said interleaved message field sequentially into said receiving buffers such as to cyclically fill successive ones of said receiving buffers with data, and sequentially read out said data of the interleaved message field from respective memory addresses of each of said receiving buffers in said predetermined sequence which is determined in accordance with said interleaving factor, to recover corresponding de-interleaved message field data.

7. A radio receiver according to claim 5, wherein said radio receiver further comprises an error pattern table which relates respective error patterns in c-bit data words to corresponding (c, q) Bose Chaudhuri Hocquenghem (BCH) code error syndromes, where c and q are fixed integers with q being less than c, said error pattern table being held fixedly stored in said second data storage means (101), wherein data words of said digital data have been converted to respective BCH code words each formed of c bits, using a g-bit set of coefficients of a predetermined generator polynomial G, such that modulo-2 division of each said code word by said set of polynomial coefficients will result in a quotient Q formed of q bits, where q is an integer which is a multiple of an integer f having a value higher than 1, with said conversion to BCH code words being executed before executing said interleaving processing and transmitting said digital data, and wherein said control program includes a portion whereby said central processing unit, through execution of said control program, effects BCH decoding processing of said de-interleaved digital data, by executing a modulo-2 division of each of successive BCH code words of said de-interleaved data by said set of generator polynomial coefficients, to obtain respective values of error syndrome for said data words, as respective remainders of said division operations, refers to said error pattern table, using said values of error syndrome as respective table addresses, to obtain respective error patterns for said data words, and executes correction of errors within said data words, based upon said respective error patterns.

8. A radio receiver according to claim 5, wherein said division table is a table which has been generated by executing modulo-2 multiplication of each of numbers which are respectively formed of all the possible $2^n$ bit patterns, by said g-bit set of polynomial coefficients, where the value n is obtained as the ratio of said values q and f, to thereby obtain $2^n$ multiplication result values each formed of (q+n−1) bits, and for each of said multiplication result values, setting the set of low-order (q−1) bits of said multiplication result value as a table value in said division table, and setting the high-order set of n bits of said multiplication result value as a table address of said table value.

9. A radio receiver according to claim 8 wherein said control program includes a portion whereby each of said modulo-2 division operations for a code word is executed by executing a primary processing sequence for obtaining a first intermediate result (R1), by referring to said division table using the n high-order bits of said code word as a table address to thereby obtain a first table value (B1), then deriving the exclusive-OR of said first table value with respect to the next-lower order set of (q−1) bits of said code word, to thereby obtain said first intermediate result (R1), and executing a plurality of secondary processing sequences, each performing an identical sequence of operations but acting on respectively different sets of n bits of said code word, with said sets being of successively decreasing order, for thereby deriving at least a second intermediate result (R2) and an error syndrome (S) in successive ones of said secondary processing steps, with a first one of said secondary processing sequences comprising referring to said division table using the n high-order bits of said first intermediate result (R1) as a table address to obtain a second table value (B2), then deriving the exclusive-OR of said second table value (B2) with respect to a bit pattern which is formed of the low-order (g−n−1) bits of said first intermediate result (R1) followed by n bits of said code word, to thereby obtain said second intermediate result (R2), with said n bits of the code word being next-lower in order to said set of (q−1) bits of said code word.

10. A radio receiver according to claim 9 wherein said BCH code is a BCH (31, 21) code, with said parameters c and q having respective values 31 and 21 and said parameters g and n having respective values 11 and 7, whereby said division table has stored therein a total of 128 of said table values, and whereby said first and second intermediate values (R1), (R2) and error syndrome (S) are successively derived in said primary processing sequence and in two of said secondary processing sequences, respectively.

11. A radio receiver according to claim 5, comprising control logic circuit means for receiving said recovered digital data stream and periodically supplying said digital data to said central processing unit in successive fixed-size transfer data units and for detecting each occurrence of said specific frame, said control logic circuit means comprising frame number comparator means (901) including a a frame number register (908) for holding the frame number of said specific frame, a frame counter (907), means for periodically incrementing said frame counter with a period which is identical to said frame interval, and means for detecting coincidence between the contents of said frame counter and said frame number register and for starting to assert a receiving control signal (114) for enabling transfer of said digital signal from said radio signal receiving means (104) to said bit synchronization means (900) when said coincidence is detected, and received data storage means (903) comprising data register means (910, 911, 912, 913) having a data storage capacity identical to said data transfer unit size, said received data storage means being coupled via data bus means (934, 120) to said central processing unit, and including means for sending to said central processing unit a first type of interrupt signal to request a transfer of the contents of said data register means to said central processing unit through execution of a data acquisition operation by said central processing unit, said received data storage means including means for repetitively executing a sequence of operations for successively storing data of said recovered digital data stream in said data register means until said data register means is filled, then generating said first type of interrupt signal and supplying the contents of said data register means via said data bus means to said central processing unit during said data acquisition operation.

12. A radio receiver according to claim 11, wherein said data register means comprises a plurality of data registers each having an identical value of storage capacity which is an integral number of 8-bit bytes, and where respective contents of said plurality of data registers are successively transferred to said central processing unit by each said data acquisition operation.

13. A radio receiver according to claim 11, further comprising at least one switch which is actuatable for generating a switch signal indicating a processing request, wherein each of said frames begins with a header field containing non-interleaved data expressing said frame number, wherein said control logic circuit means includes means for extracting said frame number data from said header field, storing said frame number data in said data register means, then executing an initial production of said first type of interrupt signal, and includes means for generating a second type of interrupt signal in response to said switch signal, wherein said central processing unit includes a program counter which holds the address in said second data storage means of a next instruction of said control program which is to be executed, and said control program comprises respective portions which correspond to a main process (1100) which includes processing relating to said switch signal and a receiving process (1111) which includes processing relating to said de-interleaving of received data, a first interrupt processing routine (1117) for servicing said first type of interrupt signal by transferring the contents of said data register means to be stored in said first data storage means, and a second interrupt processing routine (1118) for servicing said second type of interrupt signal, wherein said central processing unit, through execution of said control program, reserves a first region of said first data storage means as a first stack region for use by said main process, and a second region of said first data storage means as a second stack region for use by said receiving process, and reserves at least one bit within said first data storage means as a status bit, and while executing said main process, is responsive to each production of said second type of interrupt signal for storing the current value of said program counter of the central processing unit in said first stack region, executing said second processing routine to set said status bit in accordance with said switch signal, then reading out said program counter value stored in said first stack region and setting said value in said program counter of the central processing unit, returning to said main process; subsequently checking the condition of said status bit, and executing predetermined processing in accordance with said condition, while executing said main process, is responsive to said initial production of said first interrupt signal in each said specific frame for storing the current value of said program counter of the central processing unit in said first stack region, executing said first interrupt processing routine to store said frame number data from said data register means into said first data storage means (102), setting said program counter of the central processing unit to a predetermined initial value and commencing execution of said receiving process, during execution of said receiving process is responsive to each production of said second type of interrupt signal for storing the current value of said program counter of the central processing unit in said second stack region, executing said second interrupt processing routine, reading out said program counter value stored in said second stack region, setting said program counter value in said program counter of the central processing unit, and returning to execution of said receiving process, during execution of said receiving process is responsive to each production of said first type of interrupt signal, subsequent to said first production, for storing the current value of said program counter of the central processing unit in said second stack region, executing said first interrupt processing routine to thereby store the contents of said data register means in said second data storage means, reading out said program counter value stored in said second stack region, setting said program counter value in said program counter of the central processing unit, and returning to execution of said receiving process, and judging whether a predetermined amount of data, required in performing de-interleaving processing, has been stored in said second data storage means by successive executions of said first interrupt processing routine, and if said predetermined amount has not yet been stored, reading out said program counter value stored in said first stack region, setting said program counter value in said program counter of the central processing unit, and returning to execution of said main process.

14. A radio receiver according to claim 13, wherein said control program contains a portion whereby said central processing unit, after storing said frame number data in said first data storage means, executes processing to compare the frame number expressed by said frame number data with said frame number which is stored in said third data storage means, and when frame number non-coincidence is detected by said comparison processing, sets the frame number expressed by said frame number data as the count value of said frame counter (907), and terminates said receiving process by reading out said program counter value stored in said first stack region, setting said value in said program counter of the central processing unit, and starting continuous execution of said main process.

15. A radio receiver according to claim 5, wherein the total duration of said address field and message field within each of said frames is a fixed value, wherein a data rate of said address field and message field within each of said frames has a value predetermined from among a plurality of possible values, wherein each said frame includes a header field containing a synchronization field having a data rate which is identical to said data rate of the address field and message field, wherein said radio receiver comprises transmission rate detection means (902) for detecting said data rate of said synchronization field of each said frame and for supplying information indicative of the value of said detected data rate to said central processing unit, and wherein said control program includes a portion whereby said central processing unit, through execution of said control program, calculates a value of said interleaving factor of said data of the address and message fields of each said frame, based upon the value of said detected data rate.

16. A radio receiver for receiving digital data transmitted as a modulated radio frequency signal by a base station of a radio paging system, said digital data being configured as a data stream formed of sequentially numbered frames which occur in fixed-duration frame intervals within a predetermined cycle period, said cycle period having a value which is N times said frame interval where N is a fixed integer, each said frame beginning with a header field containing a frame number which has been encoded as Bose Chaudhuri Mocquenghem (BCH) code prior to being transmitted, with an activation frame which occurs at a specific fixed position within said cycle period having an address field which includes specific address data predetermined as corresponding to said radio receiver and having a message field containing specific message data which are destined for said radio receiver, with said specific address data containing a local address value which has been assigned to said radio receiver and information indicating a position of said specific message data within said message field of the activation frame, and with respective data of said address field and said message field of each of said frames having been converted to said BCH code form and resultant BCH code data converted to interleaved digital data by interleaving in units of fixed-size data blocks prior to transmission by said base station, using a predetermined interleaving factor, wherein said radio receiver comprises
radio signal receiving means (104) for receiving said modulated radio frequency signal as an antenna signal, and controlled by a receiving control signal (114) to demodulate said antenna signal in respective periodically occurring receiving intervals which substantially correspond with respective frame intervals of received digital data conveyed by said antenna signal, to obtain a digital signal (113) during each of said receiving intervals, bit synchronization means (900) for executing bit synchronization processing of said digital signal during each of said receiving intervals, to recover digital data from said digital signal, and for extracting said encoded frame number of a frame corresponding to said receiving interval, a central processing unit (100), coupled to receive said recovered digital data stream, frame counter means (907) formed of a modulo-N counter, where N is said fixed integer, frame number register means (908), and means for detecting coincidence between respective contents of said frame counter means and said frame register means, first data storage means (102) for storing data which are processed by said central processing unit, second data storage means (101) coupled to said central processing unit, having fixedly stored therein a control program which is executed by said central processing unit based on instruction address values supplied from said central processing unit, third data storage means (112) for storing said local address value and the frame number of said activation frame, received data storage means (903) including register means for accumulating successive fixed-size portions of said recovered digital data stream from said bit synchronization means, as respective data transfer units each identical in size to said encoded frame number, data display means (106, 107) coupled to said central processing unit, for providing visual display of processing results which are generated by said central processing unit;

wherein, by execution of said control program, said central processing unit acts to:

set said activation frame number into said frame number register means, and periodically increment said frame counter means, using a period which is equal to said frame interval, at respective time points which substantially concide with starting time points of respective frames in said received digital data stream, each time that said frame counter means has been incremented, compare the contents of said frame counter means with the contents of said frame register means, and when non-coincidence is detected thereby, set said receiving control signal (114) in a condition whereby transfer of said digital signal to said bit synchronization means is inhibited, and, when coincidence is detected thereby, perform:

setting of said receiving control signal (114) in a condition whereby transfer of said digital signal to said bit synchronization means (900) is enabled, transfer of said encoded frame number from said received data storage means, and execution of BCH decoding processing of said encoded frame number to recover an error-corrected frame number, comparison of said error-corrected frame number with said activation frame number which is stored in said third data storage means, and when non-coincidence is detected thereby, set said error corrected-frame number as the count value of said frame counter and set said receiving control signal (114) in said condition whereby transfer of said digital signal to said bit synchronization means (900) is inhibited, while when coincidence is detected thereby, transfer to said first memory means, as successive ones of said data transfer units from said received data storage means, the interleaved BCH-encoded data of an address field which occurs following said encoded frame number in said received digital data, execute de-interleaving of said interleaved BCH-encoded data of the address field to recover de-interleaved BCH-encoded data of the address field, and execute BCH decoding of said BCH-encoded data to recover error-corrected address field data, while successively comparing the contents of said error-corrected address field data with said local address value until address coincidence is detected, obtain from said error-corrected address field data said specific address data corresponding to said radio receiver, obtain, from said specific address data, said information indicating the position of said specific message data which corresponds to error-corrected address field data, using said position information, transfer to said first memory means, as successive ones of said data transfer units from said received data storage means, the interleaved BCH-encoded data of said specific message data, from within a message field which occurs following said interleaved BCH-encoded data of the address field in said received digital data, execute de-interleaving of said interleaved BCH-encoded data of the message field to recover de-interleaved BCH-encoded data of the message field, and execute BCH decoding of said BCH-encoded data until said specific message data are recovered, store said recovered specific message data in said first data storage means, and supply said specific message data to said data display means to be displayed thereby.

17. A radio receiver according to claim 16, wherein said control program includes a portion whereby said central processing unit, by executing said control program performs de-interleaving of said interleaved address field data of the activation frame by reserving a plurality of regions, each of identical size to said fixed-size data blocks, as respective receiving buffers in said first data storage means, each of said receiving buffers having a capacity which is an integral multiple of said data transfer units, writing the data of said interleaved address field sequentially into said receiving buffers such as to cyclically fill successive ones of said receiving buffers with data, and sequentially read out said data of the interleaved address field from respective memory addresses of each of said receiving buffers in a predetermined sequence which is determined in accordance with said interleaving factor, to recover corresponding de-interleaved data of said address field, and whereby said central processing unit, by executing said control program, performs de-interleaving of said interleaved message field data of the specific frame by writing the data of said interleaved message field sequentially into said receiving buffers such as to cyclically fill successive ones of said receiving buffers with data, and sequentially reading out said data of the interleaved message field from respective memory addresses of each of said receiving buffers in said predetermined sequence which is determined in accordance with said interleaving factor, to recover corresponding de-interleaved message field data.

18. A radio receiver for receiving a radio signal modulated with a digital data stream formed as successive interleaved data words, said digital data stream containing periodically occurring message portions which are addressed to said radio receiver, said radio receiver comprising:

means for demodulating said received radio signal to recover said digital data stream, means for detecting respective starting time points of portions of said recovered digital data stream which correspond to said message portions addressed to said radio receiver, and for generating a corresponding signal indicative of each said starting time point, a central processing unit coupled to receive said recovered digital data stream, and data storage means having stored therein a control program which is executed by said central processing unit to perform at least de-interleaving processing of said recovered digital data stream;

wherein said central processing unit, through execution of said control program, periodically derives from said recovered digital data stream information indicative of the starting position within said recovered digital data stream of a portion of said digital data stream which constitutes a message portion that is addressed to said radio receiver, thereafter begins de-interleaving processing of said message portion at said starting time point, subsequently detects completion of said message portion, and terminates said de-interleaving processing when said completion is detected.

19. A radio receiver according to claim 18, wherein said digital data stream contains periodically occurring combinations of an address field and a corresponding message field, said address field containing a plurality of address data portions each comprising an address value and a data position portion expressing a position, within said corresponding message field, of a message data portion associated with said corresponding address value, wherein said central processing unit, through execution of said control program:

executes de-interleaving of each said address field of said recovered digital data stream to obtain de-interleaved address field data, compares successive parts of said de-interleaved address field data with a predetermined address value which has been assigned to said radio receiver, when coincidence is detected between an address value in said de-interleaved address field data and said predetermined address value, obtains message data position information from a data position portion that is associated with said address value for which coincidence is detected, and uses said message data position information to determine said starting position of a message portion which is addressed to said radio receiver.

20. A radio receiver according to claim 19, wherein prior to being interleaved and transmitted, each said address field and message field has been converted to a sequence of Bose Chaudhuri Hocquenghem (BCH) code words which have been generated using a code generator polynomial having g binary coefficients, where g is a fixed integer, wherein said radio receiver comprises memory means having fixedly stored therein a division table of predetermined table values for use in modulo-2 division operations by a g-bit divisor and an error pattern table for relating respective error syndromes to corresponding code word error patterns, and wherein said central processing unit, through execution of said control program, further performs a procedure for error correction of said BCH code words following said de-interleaving processing. comprising, for each of said BCH code words:

executing division of said code word by said code generator polynomial by performing a succession of exclusive-OR operations on sequentially selected sets of bits of said code word in conjunction with respective table values read out from said division table, to thereby obtain an error syndrome as a remainder of said division;

using said error syndrome to obtain from said error pattern table a corresponding error pattern, and executing an exclusive-OR operation between said corresponding error pattern and said code word, to thereby invert the state of each error bit contained in said code word, and obtain an error-corrected code word.

21. A radio receiver according to claim 19, wherein prior to being interleaved and transmitted, which said address field and message field has been converted to a sequence of Bose Chaudhuri Hocquenghem (BCH) (31, 21) code words, said code words having 31 bits and code words, said code words each having 31 bits and having been generated by using a predetermined 11-bit code generating polynomial, wherein said radio receiver comprises memory means having fixedly stored therein a division table of predetermined table values for use in modulo-2 division operations by an 11-bit divisor and an error pattern table for relating respective error syndromes to corresponding code word error patterns, and wherein said central processing unit through execution of said control program further performs a procedure for error correction of said code words of said received digital data following said de-interleaving processing, comprising, for each of said BCH code words:

using a predetermined high-order set of bits extracted form said code word as a table address for reading out, from said division table, a corresponding first table value, executing an exclusive-OR operation between said first table value and a second set of bits extracted from said code word, to obtain a first intermediate calculation result (R1), using a specific set of bits extracted from said first intermediate calculation result as a table address for reading out, from said division table, a corresponding second table value (B2), using a specific set of bits extracted from said second intermediate result as a table address for reading out, from said division table, a corresponding third table value (B3), executing an exclusive-OR operation between said third table value and a predetermined low-order set of bits extracted from said code word, to obtain an error syndrome (S), using said error syndrome to obtain from said error pattern table a corresponding error patter, and executing an exclusive-OR operation between said corresponding error pattern and said code word, to thereby invert the state of each error bit contain in said code word and obtain an error-corrected code word.

22. A method of receiving digital data, for application to digital data which have been transmitted by radio, received as a radio signal, and demodulated to obtain a stream of received digital data, said received digital data containing periodically occurring combinations of an address field and a corresponding message field, said address field containing a plurality of address data portions each comprising an address value and a data position portion, with said data position portion expressing a position, within said corresponding message field, of a message data portion associated with said address value, each said address field and message field having being transmitted as interleaved data, the method comprising:

executing de-interleaving of an address field to obtain de-interleaved address field data, comparing successive parts of said de-interleaved address field data with a predetermined address value, when coincidence is detected between an address value in said de-interleaved address field data and said predetermined address value, obtaining message data position information from a message data portion that is associated with said address value for which coincidence is detected, using said obtained message data position information to locate a position where a specific message portion occurs within said corresponding message field, and executing de-interleaving of only said specific message portion of the corresponding de-interleaved message data.

23. A method of receiving digital data according to claim 22, wherein each said address field and message field has been transmitted as a sequence of Bose Chaudhuri Hocquenghem (BCH) code words which have been generated using a code generator polynomial having g binary coefficients, where g is a fixed integer, the method further including a procedure for error correction of said code words of said received digital data, comprising:

preparing a division table of predetermined table values for use in modulo-2 division operations by a g-bit divisor, preparing an error pattern table for relating respective error syndromes to corresponding code word error patterns, and for each of said BCH code words, executing division of said code words by said code generator polynomial by performing a succession of exclusive-OR operations on sequentially selected sets of bits of said code word in conjunction with respective table values read out from said division table, to thereby obtain an error syndrome as a remainder of said division, using said error syndrome to obtain from said error pattern table a corresponding error pattern, and executing an exclusive-OR operation between said corresponding error pattern and said code word, to thereby invert the state of each error bit contained in said code word, and obtain an error-corrected code word.

24. A method of receiving digital data according to claim 23, wherein each said address field and message field has been transmitted as a sequence of Bose Chaudhuri Hocquenghem (BCH) (31, 21) code words, said code words each having 31 bits and having been generated by using a predetermined 11-bit code generating polynomial, the method further including a procedure for error correction of said code words of said received digital data, comprising:

preparing a division table of predetermined table values for use in modulo-2 division operations by an 11-bit divisor, preparing an error pattern table for relating respective error syndromes to corresponding code word error patterns, and for each of said BCH code words, using a predetermined high-order set of bits extracted from said code word as a table address for reading out, from said division table, a corresponding first table value, executing an exclusive-OR operation betweens aid first table value and a second set of bits extracted from said code word, to obtain a first intermediate calculation result (R1), using a specific set of bits extracted form said first intermediate calculation result as a table address for reading out, from said division table, a corresponding second table value (B2), executing an exclusive-OR operation between said second table value and a third set of bits extracted from said code word, to obtain a second intermediate calculation result (R2), using a specific set of bits extracted from said second intermediate result as a table address for reading out, from said division table, a corresponding third table value (B3), executing an exclusive-OR operation between said third table value and a predetermined low-order set of bits extracted from said code word, to obtain an error syndrome (S), using said error syndrome to obtain from said error pattern table a corresponding error pattern, and executing an exclusive-OR operation between said corresponding error pattern and said code word, to thereby invert the state of each error bit contained in said code word and obtain an error-corrected code word.

25. A method according to claim 24, wherein said division table is prepared by, obtaining each of the 17-bit product values which result from multiplying the 128 7-bit numbers by said generator polynomial, and setting the low-order 10 bits of each said product value as a table value in said division table, and establishing the high-order 7 bits of said product value as an address of said table value in said division table.

* * * * *

UNITED STATES PATENT AND TRADEMARK OFFICE
CERTIFICATE OF CORRECTION

PATENT NO. : 5,982,294
DATED : November 9, 1999
INVENTOR(S) : Hisashi Takayama, et al.

It is certified that error appears in the above-identified patent and that said Letters Patent is hereby corrected as shown below:

Column 10, line 51, delete "FIG. 7 shows" and insert --FIGS. 7(A) - 7(C) show--.

Column 10, line 54, delete "FIG. 8 is" and insert --FIGS. 8(A) - 8(D) are--.

Column 10, line 64, delete "FIG. 11 shows" and insert --FIGS. 11(A) and 11(B) show--.

Figure 16A:
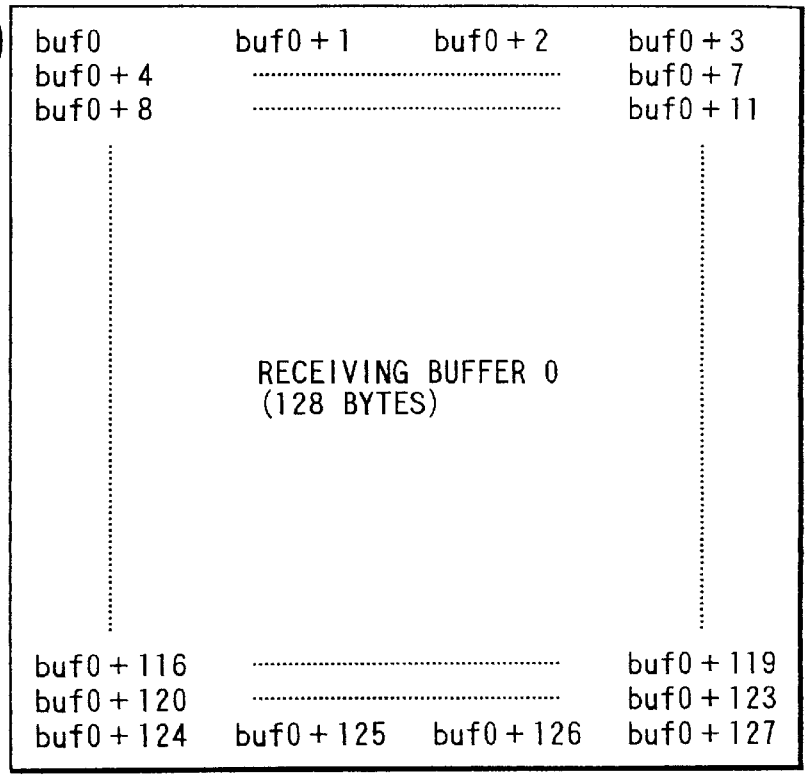
FIG. 16 shows conceptual diagrams of respective arrangements of buffer addresses within two receiving buffers which are established in regions of a RAM of the preferred embodiment.
Figure 16B:
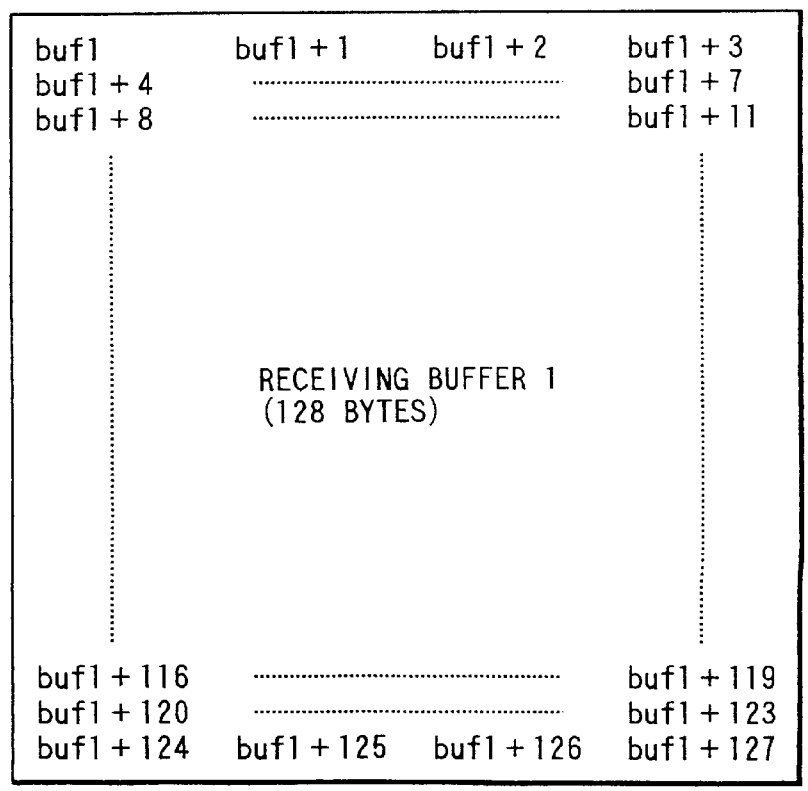

Column 11, line 15, delete "FIG. 16 shows" and insert --FIGS. 16(A) and 16(B) show--.

Signed and Sealed this

Nineteenth Day of September, 2000

Attest:

Q. TODD DICKINSON

*Attesting Officer*      *Director of Patents and Trademarks*